United States Patent
Collingwood et al.

(10) Patent No.: US 12,545,658 B2
(45) Date of Patent: Feb. 10, 2026

(54) PYRIDINE DERIVATIVES AS CALCIUM-ACTIVATED CHLORIDE CHANNEL MODULATORS

(71) Applicant: TMEM16A LIMITED, Welwyn Garden City (GB)

(72) Inventors: Stephen Collingwood, Brighton (GB); Craig Buxton, Abingdon (GB); Matthew Habgood, Abingdon (GB); Jonathan David Hargrave, Abingdon (GB); Thomas Beauregard Schofield, Abingdon (GB); Matthew Smith, Abingdon (GB); Christopher Stimson, Abingdon (GB)

(73) Assignee: TMEM16A LIMITED, Welwyn Garden City (GB)

( * ) Notice: Subject to any disclaimer, the term of this patent is extended or adjusted under 35 U.S.C. 154(b) by 903 days.

(21) Appl. No.: 17/581,520

(22) Filed: Jan. 21, 2022

(65) Prior Publication Data
US 2022/0144803 A1    May 12, 2022

Related U.S. Application Data

(63) Continuation of application No. PCT/GB2020/051785, filed on Jul. 24, 2020.

(30) Foreign Application Priority Data

Jul. 24, 2019 (GB) ..................................... 1910608

(51) Int. Cl.
C07D 401/12 (2006.01)
C07D 405/14 (2006.01)
A61K 45/06 (2006.01)

(52) U.S. Cl.
CPC ......... *C07D 401/12* (2013.01); *C07D 405/14* (2013.01); *A61K 45/06* (2013.01)

(58) Field of Classification Search
None
See application file for complete search history.

(56) References Cited

U.S. PATENT DOCUMENTS 6,262,040 B1 * 7/2001 Marfat ...................... A61P 3/00
548/362.5
7,642,277 B2 * 1/2010 Simoneau .......... A61K 31/4192
548/251
2014/0309427 A1   10/2014 Dutta

FOREIGN PATENT DOCUMENTS

| FR | 2291749 A1 | 6/1976 | |
| WO | 0222600 A2 | 3/2002 | |
| WO | 2017/181177 A1 | 10/2017 | |
| WO | WO-2017221008 A1 | 12/2017 | |
| WO | WO-2018096325 A1 | 5/2018 | |
| WO | 2018/138362 A1 | 8/2018 | |
| WO | 2018/195127 A1 | 10/2018 | |
| WO | WO-2019145726 A1 * | 8/2019 | ........... C07C 237/42 |

OTHER PUBLICATIONS

Namkung, et al., "Small-molecule Activators of TMEM16A, a Calcium activated Chloride Channel, Stimulate Epithelial Chloride Secretion and Intestinal Contraction," The FASEB Journal, vol. 25, No. 11, pp. 4048-4062 (Nov. 15, 2011).
4-amino-N-(1-azabicyclo[2.2.2]octan-3-yl)pyridine-2-carboxamide, *Pub Chem CID 55043632*, Jan. 24, 2012, 8 pages.
International Search Report and Written Opinion received for PCT Application No. PCT/GB2020/051785, mailed on Oct. 21, 2020, 11 pages.
Namkung et al. "TMEM16A Inhibitors Reveal TMEM16A as a Minor Component of Calcium-activated Chloride Channel Conductance in Airway and Intestinal Epithelial Cells", *J. Biol. Chem*, 2011, 286,2365-2374.

* cited by examiner

*Primary Examiner* — Clinton A Brooks
*Assistant Examiner* — Nicola Maria Bauer
(74) *Attorney, Agent, or Firm* — Robert C. Hall

(57) ABSTRACT

Compounds of general formula (I), wherein $R^1$, $R^2$, $R^3$, $R^4$, $R^5$, $X^1$, $X^2$ and $X^3$ are as defined herein are useful for treating respiratory disease and other diseases and conditions modulated by TMEM16A.

(I)

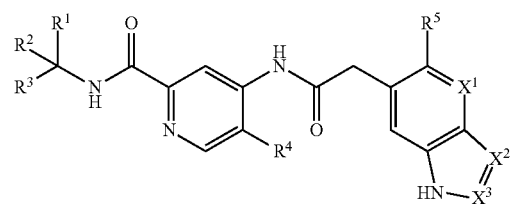

1 Claim, 1 Drawing Sheet

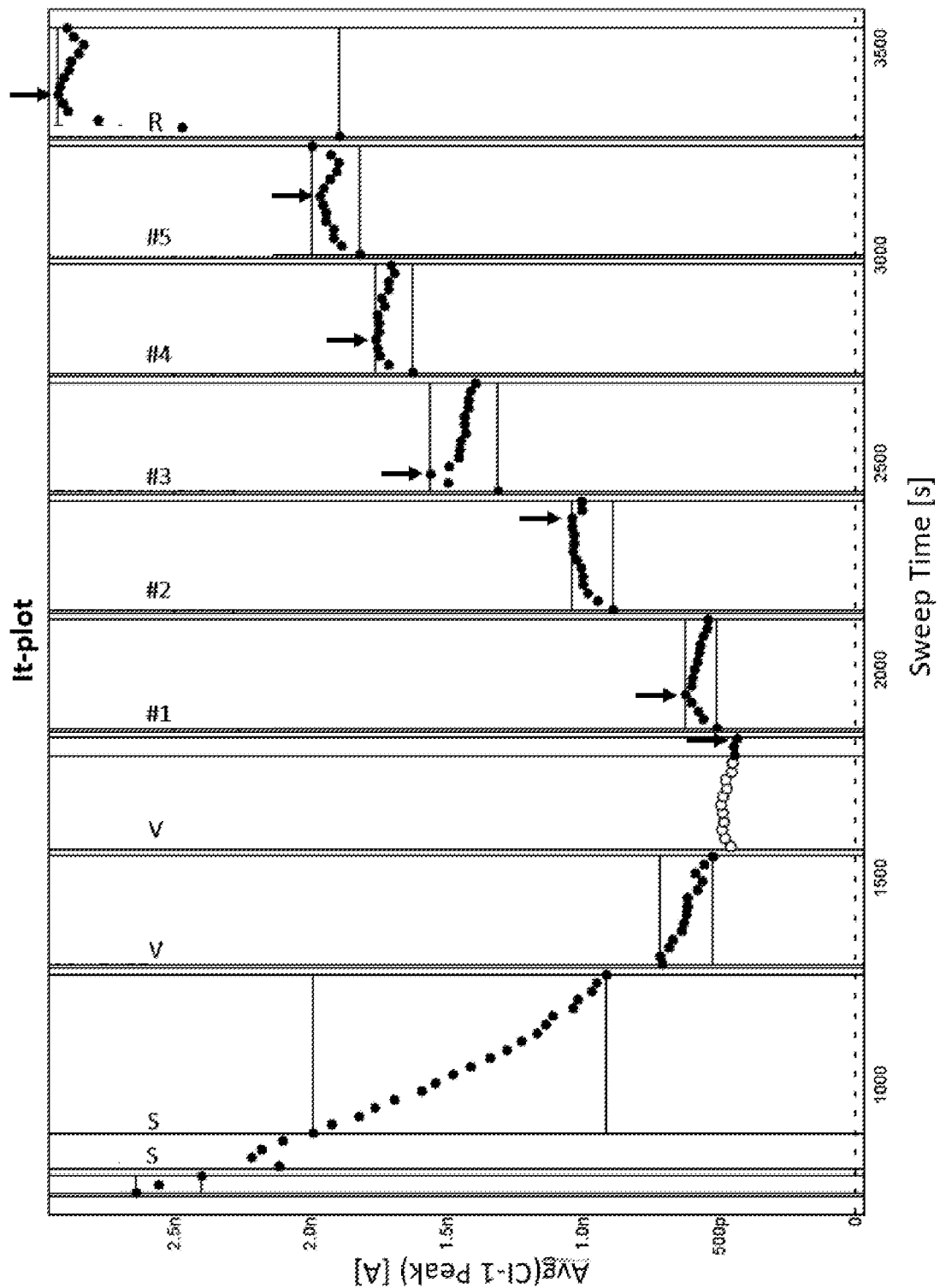

PYRIDINE DERIVATIVES AS CALCIUM-ACTIVATED CHLORIDE CHANNEL MODULATORS

This application is a continuation of the International Application No. PCT/GB2020/051785, filed Jul. 24, 2020, which claims the benefit of GB Application No. 1910608.7, filed Jul. 24, 2019, which is hereby incorporated by reference in their entirety for all purposes.

The present invention relates to novel compounds which have activity as positive modulators of the calcium-activated chloride channel (CaCC), TMEM16A. The invention also relates to methods of preparing the compounds and pharmaceutical compositions containing them as well as to the use of these compounds in treating diseases and conditions in which TMEM16A plays a role, particularly respiratory diseases and conditions.

BACKGROUND

Humans can inhale up to 12,000 L of air each day and with it comes the potential for airborne pathogens (such as bacteria, viruses and fungal spores) to enter the airways. To protect against these airborne pathogens, the lung has evolved innate defence mechanisms to minimise the potential for infection and colonisation of the airways. One such mechanism is the mucus clearance system, whereby secreted mucus is propelled up and out of the airways by the coordinated beating of cilia together with cough clearance. This ongoing 'cleansing' of the lung constantly removes inhaled particles and microbes thereby reducing the risk of infection.

In recent years it has become clear that the hydration of the mucus gel is critical to enable mucus clearance (Boucher 2007; Matsui et al, 1998). In a normal, healthy airway, the mucus gel is typically 97% water and 3% w/v solids under which conditions the mucus is cleared by mucociliary action. The hydration of the airway mucosa is regulated by the coordinated activity of a number of ion channels and transporters. The balance of anion ($Cl^-/HCO_3^-$) secretion mediated via the Cystic Fibrosis Transmembrane Conductance Regulator (CFTR) and the Calcium Activated Chloride Conductance (CaCC; TMEM16A) and $Na^+$ absorption through the epithelial $Na^+$ channel (ENaC) determine the hydration status of the airway mucosa. As ions are transported across the epithelium, water is osmotically obliged to follow and thus fluid is either secreted or absorbed.

In respiratory diseases such as chronic bronchitis and cystic fibrosis, the % solids of the mucus gel is increased as the hydration is reduced and mucus clearance is reduced (Boucher, 2007). In cystic fibrosis, where loss of function mutations in CFTR attenuates the ability of the airway to secrete fluid, the % solids can be increased to 15% which is believed to contribute towards the plugging of small airways and failure of mucus clearance. Strategies to increase the hydration of the airway mucus include either the stimulation of anions and thereby fluid secretion or the inhibition of $Na^+$ absorption. To this end, stimulating the activity of TMEM16A channels will increase anion secretion and therefore increase fluid accumulation in the airway mucosa, hydrate mucus and enhance mucus clearance mechanisms.

TMEM16A, also referred to as Anoctamin-1 (Ano1), is the molecular identity of calcium-activated chloride channels (Caputo et al, 2008; Yang et al, 2008). TMEM16A channels open in response to elevation of intracellular calcium levels and allow the bidirectional flux of chloride, bicarbonate and other anions across the cell membrane. Functionally TMEM16A channels have been proposed to modulate transepithelial ion transport, gastrointestinal peristalsis, nociception and cell migration/proliferation (Pedemonte & Galietta, 2014).

TMEM16A channels are expressed by the epithelial cells of different organs including the lungs, liver, kidney, pancreas and salivary glands. In the airway epithelium TMEM16A is expressed at high levels in mucus producing goblet cells, ciliated cells and in submucosal glands. Physiologically TMEM16A is activated by stimuli which mobilise intracellular calcium, particularly purinergic agonists (ATP, UTP), which are released by the respiratory epithelium in response to cyclical shear stress caused by breathing and other mechanical stimuli such as cough. In addition to increasing anion secretion leading to enhanced hydration of the airways, activation of TMEM16A plays an important role in bicarbonate secretion. Bicarbonate secretion is reported to be an important regulator of mucus properties and in controlling airway lumen pH and hence the activity of native antimicrobials such as defensins (Pezzulo et al, 2012).

Indirect modulation of TMEM16A, via elevation of intracellular calcium, has been clinically explored eg. denufosol (Kunzelmann & Mall, 2003). Although encouraging initial results were observed in small patient cohorts this approach did not deliver clinical benefit in larger patient cohorts (Accurso et al 2011; Kellerman et al 2008). This lack of clinical effect was ascribed to only a transient elevation in anion secretion, the result of a short half-life of denufosol on the surface of the epithelium and receptor/pathway desensitisation, and unwanted effects of elevating intracellular calcium such as increased release of mucus from goblet cells (Moss, 2013). Compounds which act directly upon TMEM16A to enhance channel opening at low levels of calcium elevation are expected to durably enhance anion secretion and mucociliary clearance in patients and improve innate defence. As TMEM16A activity is independent of CFTR function, TMEM16A positive modulators have the potential to deliver clinical benefit to all CF patients and non-CF respiratory diseases characterised by mucus congestion including chronic bronchitis and severe asthma.

TMEM16A modulation has been implicated as a therapy for dry mouth (xerostomia), resultant from salivary gland dysfunction in Sjorgen's syndrome and radiation therapy, dry eye, cholestasis and gastrointestinal motility disorders.

Our application, WO2019/145726 relates to compounds which are positive modulators of TMEM16A and which are therefore of use in the treatment of diseases and conditions in which TMEM16A plays a role, particularly respiratory diseases and conditions.

The present inventors have developed further compounds which have excellent activity as positive modulators of TMEM16A. In addition, at least some of the compounds have one or more advantages compared with the compounds exemplified in WO2019/145726. Some of the compounds of the invention have increased metabolic stability, as represented by their low clearance rates from human microsomes and hepatocytes. This makes them particularly suitable for oral administration since lower first pass metabolism, leads to increased oral bioavailability and a lower dose for a given pharmacological effect Other compounds of the present invention have metabolic stability which is decreased in comparison with the compounds exemplified in WO2019/145726 to an extent which makes them particularly suitable for administration by inhalation. The decreased in vivo half-life in blood ensures that compounds administered directly to the lungs will have a reduced chance of interacting with TMEM16A at other locations in the body, and potential side effects will therefore be minimised. The compounds of the invention also have adequate water solubility as represented by log D values, leading also to modest lipophilicity which is an advantage when preparing a pharmaceutical formulation.

SUMMARY OF THE INVENTION

In a first aspect of the present invention there is provided a compound of general formula (I) including all tautomeric forms all enantiomers, isotopic variants, and salts and solvates thereof:

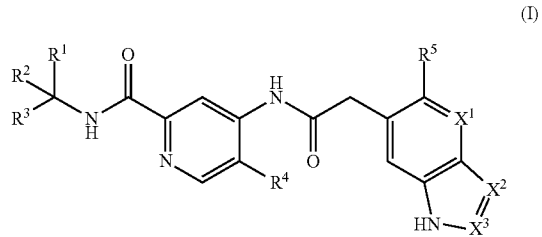

(I)

wherein:
- $R^1$ is selected from H, ethynyl, CN, methyl, fluoromethyl, difluoromethyl, trifluoromethyl, chlorodifluoromethyl, dichlorofluoromethyl and hydroxymethyl;
- $R^2$ is selected from methyl and $CH_2OH$;
- $R^3$ is selected from H and methyl; or
- $R^2$ and $R^3$ together with the carbon atom to which they are attached form a 3- to 10-membered carbocyclic or oxygen-containing heterocyclic ring system either of which is optionally substituted, in addition to the $R^1$ group, with one or more substituents selected from $C_{1-4}$ alkyl, $C_{1-4}$ haloalkyl, halo and OH; or
- $R^1$, $R^2$ and $R^3$ together with the carbon atom to which they are attached combine to form a 5- to 8-membered bridged carbocyclic or heterocyclic ring system optionally substituted with one or more substituents selected from OH, halo, $C_{1-4}$ alkyl and $C_{1-4}$ haloalkyl;
- $R^4$ is H or halo;
- $R^5$ is selected from H, halo, CN and $C_{1-4}$ alkyl optionally substituted with one or more substituents selected from halo and OH;
- $X^1$ is $CR^6$ or N;
  - $R^6$ is selected from H, halo, CN and $C_{1-4}$ alkyl optionally substituted with one or more substituents selected from halo and OH;
- $X^2$ is $CR^7$ or N;
  - $R^7$ is H, halo, CN; a 3- to 7-membered carbocyclic or heterocyclic ring system optionally substituted with one or more substituents selected from halo and OH; or $C_{1-4}$ alkyl optionally substituted with one or more substituents selected from halo, OH and a 3- to 7-membered carbocyclic or heterocyclic ring system optionally substituted with one or more substituents selected from halo and OH;
- $X^3$ is $CR^8$ or N;
  - $R^8$ is selected from H, halo, CN and $C_{1-4}$ alkyl optionally substituted with one or more substituents selected from halo and OH.

Since the compounds of general formula (I) are positive modulators of TMEM16A, they are useful for treating diseases and conditions in which modulation of TMEM16A plays a role, especially respiratory diseases and conditions.

DETAILED DESCRIPTION OF THE INVENTION

In the present specification, except where the context requires otherwise due to express language or necessary implication, the word "comprises", or variations such as "comprises" or "comprising" is used in an inclusive sense i.e. to specify the presence of the stated features but not to preclude the presence or addition of further features in various embodiments of the invention.

All literature and patent documents referred to herein are incorporated by reference to the fullest extent possible.

In the present specification, references to "pharmaceutical use" refer to use for administration to a human or an animal, in particular a human or a mammal, for example a domesticated or livestock mammal, for the treatment or prophylaxis of a disease or medical condition. The term "pharmaceutical composition" refers to a composition which is suitable for pharmaceutical use and "pharmaceutically acceptable" refers to an agent which is suitable for use in a pharmaceutical composition. Other similar terms should be construed accordingly.

Salts and solvates (such as hydrates) of the compounds of general formula (I) are suitably pharmaceutically acceptable. Suitable pharmaceutically acceptable salts are well known to those of skill in the art and are described, for example by Gupta et al (2018). Some particularly suitable salts of the compounds of general formula (I) include basic addition salts such as sodium, potassium, calcium, aluminium, zinc, magnesium and other metal salts as well as choline, diethanolamine, ethanolamine, ethyl diamine and meglumine salts. Alternatively, acid addition salts may be formed, for example hydrochloride, mesylate, hydrobromide, sulphate, and fumarate salts. Salts of synthetic intermediates need not be pharmaceutically acceptable.

In the present specification, the term "$C_{1-4}$" alkyl refers to a straight or branched fully saturated hydrocarbon group having from 1 to 4 carbon atoms. The term encompasses methyl, ethyl, n-propyl, isopropyl, n-butyl, s-butyl and t-butyl. Other alkyl groups, for example $C_{1-6}$ alkyl are as defined above but contain the stated numbers of carbon atoms.

The term "3- to 10-membered carbocyclic" refers to a non-aromatic hydrocarbon ring system containing from 3 to 10 ring carbon atoms. The carbocyclic ring system may be a single ring or may contain two rings which may be fused or in a spiro arrangement or bridged, where carbon atoms in a bridge are included in the number of ring carbon atoms. Examples include cycloalkyl groups such as cyclopropyl, cyclobutyl, cyclopentyl, cyclohexyl, as well as spiro systems and bridged systems such as bicyclo[1.1.1]pentyl. Carbocyclic ring systems may contain other numbers of ring atoms as specified, for example 5 to 8 ring atoms or 3 to 7 ring atoms.

In the context of the present specification, the term "cycloalkyl" refers to a fully saturated carbocyclic ring system as defined above. Examples of cycloalkyl groups include cyclopropyl, cyclobutyl, cyclopentyl, cyclohexyl, as well as bridged cycloalkyl systems such as bicyclo[1.1.1]pentyl.

In the context of the present specification, the terms "3- to 10-membered heterocyclic" and "3- to 10-membered heterocyclyl" refer to a non-aromatic ring system containing 3 to 10 ring atoms including at least one heteroatom selected from N, O and S. A heterocyclic ring system may contain one or more carbon-carbon double bonds but preferably is fully saturated. The heterocyclic ring system may be a single ring or may contain two or three rings which may be fused or in a spiro arrangement or bridged, where bridge atoms are included in the number of ring atoms. An oxygen-containing heterocyclic ring system contains at least one oxygen as a ring atom and optionally one or two further heteroatoms selected from O, N and S. Examples of 3- to 10-membered heterocyclic ring systems include oxetanyl, tetrahydrofuranyl, tetrahydropyranyl, pyrrolidinyl, piperidinyl, morpholinyl, piperazinyl and 2-oxaspiro[3.3] heptan-6-yl. Heterocyclic ring systems may contain other numbers of ring atoms as specified, for example 5 to 8 ring atoms or 3 to 7 ring atoms.

The term "halogen" refers to fluorine, chlorine, bromine or iodine and the term "halo" to fluoro, chloro, bromo or iodo groups. Similarly, "halide" refers to fluoride, chloride, bromide or iodide.

The term "$C_{1-4}$ haloalkyl" as used herein refers to a $C_{1-4}$ alkyl group as defined above in which one or more of the hydrogen atoms is replaced by a halo group. Any number of hydrogen atoms may be replaced, up to perhalo substitution. Examples include trifluoromethyl, chloroethyl and 1,1-difluoroethyl. A fluoroalkyl group is a haloalkyl group in which halo is fluoro. Other haloalkyl groups, for example $C_{1-3}$ haloalkyl, are as defined above but contain the stated number of carbon atoms.

The term "isotopic variant" refers to isotopically-labelled compounds which are identical to those recited in formula (I) but for the fact that one or more atoms are replaced by an atom having an atomic mass or mass number different from the atomic mass or mass number most commonly found in nature, or in which the proportion of an atom having an atomic mass or mass number found less commonly in nature has been increased (the latter concept being referred to as "isotopic enrichment"). Examples of isotopes that can be incorporated into compounds of the invention include isotopes of hydrogen, carbon, nitrogen, oxygen, fluorine, iodine and chlorine such as 2H (deuterium), 3H, 11C, 13C, 14C, 18F, 123I or 125I (e.g. 3H, 11C, 14C, 18F, 123I or 125I), which may be naturally occurring or non-naturally occurring isotopes.

In particularly suitable isotopic variants of the compounds of general formula (I), some or all methyl groups are replaced by $CD_3$. For example, one of, two of or all of $R^1$, $R^2$ and $R^3$ may be $CD_3$.

In some suitable compounds of the present invention, $R^1$ is H, methyl, difluoromethyl trifluoromethyl, ethynyl or CN, especially methyl, difluoromethyl trifluoromethyl, ethynyl or CN.

In some compounds of the invention, $R^2$ is methyl. In other compounds of the invention, $R^2$ is $CH_2OH$;

Suitably, $R^3$ is methyl.

In some suitable compounds of the present invention, $R^2$ is methyl and $R^3$ is methyl.

In some such compounds, $R^1$ is not H and is suitably CN, ethynyl or methyl optionally substituted with one or more substituents selected from fluoro and OH.

More suitably in these compounds $R^1$ is methyl, difluoromethyl trifluoromethyl, ethynyl or CN.

In other suitable compounds of the invention, $R^2$ and $R^3$ together with the carbon atom to which they are attached form a 3- to 10-membered carbocyclic or oxygen-containing heterocyclic ring system optionally substituted as described above. More suitable substituents for such rings (not including the $R^1$ group) include fluoro, chloro, methyl, ethyl, trifluoromethyl and OH. Still more suitably, ring systems formed by $R^2$ and $R^3$ and the carbon atom to which they are attached are unsubstituted (except for the $R^1$ group) or substituted in addition to the $R^1$ group with one or more, for example one or two, substituents selected from methyl and fluoro.

Ring systems formed by $R^2$ and $R^3$ and the carbon atom to which they are attached include $C_{3-6}$ cycloalkyl rings, particularly cyclopropyl, cyclobutyl and cyclopentyl, any of which may be unsubstituted or substituted as described above.

Other ring formed by $R^2$ and $R^3$ and the carbon atom to which they are attached include 3- to 8-membered oxygen-containing heterocyclic ring systems, which may be monocyclic ring systems such as tetrahydropyranyl, tetrahydrofuranyl and oxetanyl or alternatively may be fused or spiro-linked ring systems such as oxaspiro[3.3] heptan-6-yl. These ring systems may be unsubstituted or substituted as described above.

In still other compounds of general formula (I), $R^1$, $R^2$ and $R^3$ together with the carbon atom to which they are attached combine to form a 5- to 8-membered bridged carbocyclic or heterocyclic ring system. In this case, the carbon to which $R^1$, $R^2$ and $R^3$ are attached is a bridgehead atom. Examples of such ring systems include bicyclo[1.1.1]pentyl.

The ring system formed by $R^1$, $R^2$ and $R^3$ together with the carbon atom to which they are attached may be unsubstituted or substituted as described above but is more suitably unsubstituted.

In some suitable compounds of general formula (I), $R^4$ is H.

In some suitable compounds of general formula (I), $R^5$ is H or halo, especially H, fluoro or chloro. More suitably, $R^5$ is H.

In some suitable compounds of the general formula (I), $X^1$ is N. However, more suitably, $X^1$ is $CR^6$. $R^6$ is suitably H or halo, for example H, fluoro or chloro. More suitably, $R^6$ is H.

In compounds of general formula (I), $X^2$ may be $CR^7$ or N. More suitably, $X^2$ is $CR^7$ and, in this case $R^7$ is suitably H, $C_{1-3}$ alkyl optionally substituted with OH, $C_{1-3}$ haloalkyl optionally substituted with OH, methyl substituted with a 3- to 6-membered carbocyclic or heterocyclic ring system; or a 3- to 6-membered carbocyclic or heterocyclic ring system.

In some cases, $R^7$ is H, $C_{1-3}$ alkyl, $C_{1-3}$ haloalkyl, $C_{1-3}$ alkyl substituted with OH, $C_{1-3}$ haloalkyl substituted with OH, a 3- to 6-membered carbocyclic or heterocyclic ring system or $CH_2$—$R^{11}$, where $R^{11}$ is a nitrogen-containing 3- to 6-membered heterocyclic ring linked to the $CH_2$ moiety via a ring nitrogen atom.

When $R^7$ is $C_{1-3}$ alkyl substituted with OH or $C_{1-3}$ haloalkyl substituted with OH, it may take the form —$C(CH_3)(OH)$—$R^{12}$, wherein $R^{12}$ is $C_{1-2}$ alkyl or $C_{1-2}$ haloalkyl.

More suitably $R^7$ is H, methyl, ethyl, isopropyl, trifluoromethyl, morpholinylmethyl, tetrahydrofuryl or 1-hydroxy-1-trifluoromethyl(ethyl), especially H, methyl, ethyl, isopropyl and trifluoromethyl.

In particularly suitable compounds, $R^7$ is H.

In the compounds of the present invention, $X^3$ is $CR^8$ or N.

In some suitable compounds of general formula (I), $X^3$ is $CR^8$. In these compounds, $R_8$ is suitably H, methyl or trifluoromethyl, especially H or trifluoromethyl and more especially H.

In other suitable compounds, however, $R^8$ is N.

In some suitable compounds of the present invention, $X^1$ is $CR^6$ and $X^2$ is $CR^7$, such that the compound is of general formula (Ia):

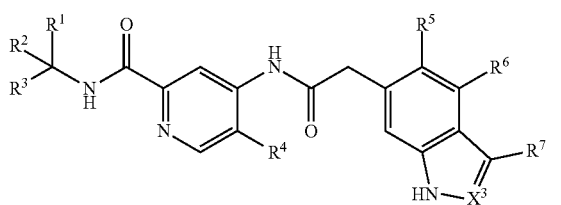

(Ia)

wherein $X^3$, $R^1$, $R^2$, $R^3$, $R^4$, $R^5$, $R^6$ and $R^7$ are as defined for general formula (I).

In some suitable compounds of the present invention, $X^1$ is $CR^6$, $X^2$ is $CR^7$ and $X^3$ is N, such that the compound is of general formula (Ib):

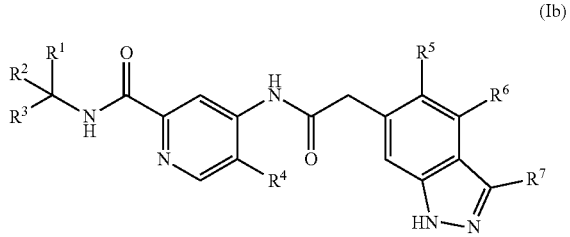

(Ib)

wherein $R^1$, $R^2$, $R^3$, $R^4$, $R^5$, $R^6$ and $R^7$ are as defined for general formula (I).

In some suitable compounds of the present invention, $X^1$ is $CR^6$, $X^2$ is $CR^7$ and $X^3$ is $CR^8$, such that the compound is of general formula (Ic):

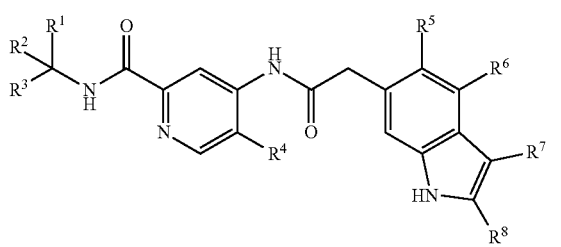

(Ic)

wherein $R^1$, $R^2$, $R^3$, $R^4$, $R^5$, $R^6$, $R^7$ and $R^8$ are as defined for general formula (I).

Suitably in compounds of general formulae (Ia), (Ib) and (Ic), at least one of $R^5$, $R^6$ and $R^7$ is H.

Suitably, in compounds of general formulae (Ia), (Ib) and (Ic), when $R^5$ is halo, $R^6$ is H and when $R^6$ is halo, $R^5$ is H.

In some compounds of general formulae (Ia), (Ib) and (Ic), when $R^5$ is halo, both $R^6$ and $R^7$ are H.

In some compounds of general formulae (Ia), (Ib) and (Ic), when $R^6$ is halo, both $R^5$ and $R^7$ are H.

In some compounds of general formulae (Ia), (Ib) and (Ic), when $R^7$ is other than H, both $R^5$ and $R^6$ are H.

Specific examples of compounds of general formula (I) include the following:

N-(1,1-Dimethylprop-2-ynyl)-4-[[2-(1H-indol-6-yl)acetyl]amino]pyridine-2-carboxamide (Compound 1);
4-[[2-(1H-indol-6-yl)acetyl]amino]-N-[1-(trifluoromethyl)cyclopropyl]pyridine-2-carboxamide (Compound 1.1)
N-tert-Butyl-4-[[2-(1H-indazol-6-yl)acetyl]amino]pyridine-2-carboxamide (Compound 2);
N-(1-Cyano-1-methyl-ethyl)-4-[[2-(1H-indazol-6-yl)acetyl]amino]pyridine-2-carboxamide (Compound 2.1);
N-(1,1-Dimethylprop-2-ynyl)-4-[[2-(1H-indazol-6-yl)acetyl]amino]pyridine-2-carboxamide (Compound 3);
N-(1-Ethynylcyclopentyl)-4-[[2-(1H-indazol-6-yl)acetyl]amino]pyridine-2-carboxamide (Compound 4);
4-[[2-(1H-Indazol-6-yl)acetyl]amino]-N-(2,2,2-trifluoro-1,1-dimethyl-ethyl)pyridine-2-carboxamide (Compound 4.1);
4-[[2-(1H-Indazol-6-yl)acetyl]amino]-N-[1-(trifluoromethyl)cyclopropyl]pyridine-2-carboxamide (Compound 4.2);
N-(3,3-Difluoro-1-methyl-cyclobutyl)-4-[[2-(1H-indazol-6-yl)acetyl]amino]pyridine-2-carboxamide (Compound 4.3);
N-(2,2-Difluoro-1,1-dimethyl-ethyl)-4-[[2-(1H-indazol-6-yl)acetyl]amino]pyridine-2-carboxamide (Compound 5);
4-[[2-(1H-Indazol-6-yl)acetyl]amino]-N-[1-(trifluoromethyl)cyclobutyl]pyridine-2-carboxamide (Compound 5.1);
N-(3-Fluoro-3-methyl-cyclobutyl)-4-[[2-(1H-indazol-6-yl)acetyl]amino]pyridine-2-carboxamide (Compound 5.2);
N-(2,2-Difluorocyclopentyl)-4-[[2-(1H-indazol-6-yl)acetyl]amino]pyridine-2-carboxamide (Compound 5.3);
N-(4-Cyanotetrahydropyran-4-yl)-4-[[2-(1H-indazol-6-yl)acetyl]amino]pyridine-2-carboxamide (Compound 5.4);
N-tert-Butyl-4-[[2-(5-fluoro-1H-indazol-6-yl)acetyl]amino]pyridine-2-carboxamide (Compound 6);
4-[[2-(5-Fluoro-1H-indazol-6-yl)acetyl]amino]-N-[1-(trifluoromethyl)cyclopropyl]pyridine-2-carboxamide (Compound 6.1);
N-(2,2-Difluorocyclopentyl)-4-[[2-(5-fluoro-1H-indazol-6-yl)acetyl]amino]pyridine-2-carboxamide (Compound 6.2);
4-[[2-(4-Chloro-1H-indazol-6-yl)acetyl]amino]-N-[1-(trifluoromethyl)cyclopropyl]pyridine-2-carboxamide (Compound 6.3);
4-[[2-(4-Chloro-1H-indazol-6-yl)acetyl]amino]-N-(1-ethynylcyclopentyl)pyridine-2-carboxamide (Compound 6.4);
N-tert-Butyl-4-[[2-(4-fluoro-1H-indazol-6-yl)acetyl]amino]pyridine-2-carboxamide (Compound 7);
N-tert-Butyl-4-[[2-(5-chloro-1H-indazol-6-yl)acetyl]amino]pyridine-2-carboxamide (Compound 7.1);
N-tert-Butyl-4-[[2-(4-chloro-1H-indazol-6-yl)acetyl]amino]pyridine-2-carboxamide (Compound 7.2);
N-tert-Butyl-4-[[2-[3-(trifluoromethyl)-1H-indazol-6-yl]acetyl]amino]pyridine-2-carboxamide (Compound 8);
N-[1-(Trifluoromethyl)cyclopropyl]-4-[[2-[3-(trifluoromethyl)-1H-indazol-6-yl]acetyl]amino]pyridine-2-carboxamide (Compound 8.1);
N-tert-Butyl-4-[[2-(3-isopropyl-1H-indazol-6-yl)acetyl]amino]pyridine-2-carboxamide (Compound 9);
4-[[2-(3-Tetrahydrofuran-2-yl-1H-indazol-6-yl)acetyl]amino]-N-[1-(trifluoromethyl)cyclopropyl]pyridine-2-carboxamide (Compound 9.1);
4-[[2-[3-(Morpholinomethyl)-1H-indazol-6-yl]acetyl]amino]-N-(2,2,2-trifluoro-1,1-dimethyl-ethyl)pyridine-2-carboxamide (Compound 10);
4-[[2-(1H-Indazol-6-yl)acetyl]amino]-N-(3-methyloxetan-3-yl)pyridine-2-carboxamide (Compound 11);

4-[[2-(1H-Indazol-6-yl)acetyl]amino]-N-(2-oxaspiro[3.3]
heptan-6-yl)pyridine-2-carboxamide (Compound 11.1);
4-[[2-(1H-Indazol-6-yl)acetyl]amino]-N-[4-(trifluoromethyl)tetrahydropyran-4-yl]pyridine-2-carboxamide
(Compound 11.2);
4-[[2-(1H-Indazol-6-yl)acetyl]amino]-N-[3-(trifluoromethyl)oxetan-3-yl]pyridine-2-carboxamide (Compound 11.3);
N-[1-(Difluoromethyl)cyclopropyl]-4-[[2-(1H-indazol-6-yl)acetyl]amino]pyridine-2-carboxamide (Compound 11.4);
N-(3-Fluoro-1-bicyclo[1.1.1]pentanyl)-4-[[2-(1H-indazol-6-yl)acetyl]amino]pyridine-2-carboxamide; (Compound 11.5);
4-[[2-[3-(2,2,2-Trifluoro-1-hydroxy-1-methyl-ethyl)-1H-indazol-6-yl]acetyl]amino]-N-[1-(trifluoromethyl)cyclopropyl]pyridine-2-carboxamide; (Compound 12) 4-[[2-(1H-Indol-6-yl)acetyl]amino]-N-(2,2,2-trifluoro-1,1-dimethyl-ethyl) pyridine-2-carboxamide; (Compound 13);
N-(3,3-Difluoro-1-methyl-cyclobutyl)-4-[[2-(1H-indol-6-yl)acetyl]amino] pyridine-2-carboxamide (Compound 13.1);
N-(4-Cyanotetrahydropyran-4-yl)-4-[[2-(1H-indol-6-yl)acetyl]amino] pyridine-2-carboxamide (Compound 13.2);
and salts and solvates of the above.

The compounds of the invention may be prepared by the methods set out below, which are novel and form a further aspect of the invention.

A compound of general formula (I) may be prepared by reacting a compound of general formula (II):

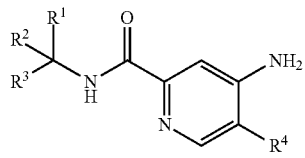

(II)

wherein $R^1$, $R^2$, $R^3$ and $R^4$ are as defined for general formula (I);
with a compound of general formula (III):

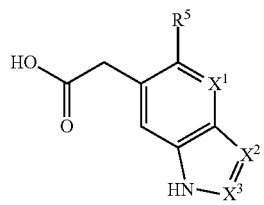

(III)

wherein $R^1$, $X^1$, $X^2$ and $X^3$ are as defined for general formula (I).

Suitably, the reaction is conducted in the presence of a coupling reagent and under basic conditions, for example in the presence of an amine such as diisopropylethylamine (DIPEA) and in an organic solvent such as DMF.

Suitable coupling reagents include known peptide coupling agents such as O-(Benzotriazol-1-yl)-N,N,N',N'-tetramethyluronium hexafluorophosphate (HBTU), O-(Benzotriazol-1-yl)-N,N,N',N'-tetramethyluronium tetrafluoroborate (TBTU), O-(7-Azabenzotriazol-1-yl)-N,N,N',N'-tetramethyluronium hexafluorophosphate (HATU), O-(7-Azabenzotriazol-1-yl)-N,N,N',N'-tetramethyluronium tetrafluoroborate (TATU), (Benzotriazol-1-yloxy)tris(dimethylamino)phosphonium hexafluorophosphate (BOP), (Benzotriazol-1-yloxy)tripyrrolidinophosphonium hexafluorophosphate (PyBOP) carbodiimides such as 1-ethyl-3-(3-dimethylaminopropyl)carbodiimide (EDCI) and triazoles such as 1-hydroxy-7-azabenzotriazole (HOAt) or hydroxybenzotriazole (HOBt). Suitably, when these coupling agents are used, the reaction is conducted under basic conditions, for example in the presence of an amine such as diisopropylethylamine (DIPEA) and in an organic solvent such as DMF.

Alternatively, the coupling reagent may be propylphosphonic anhydride (T3P®). When T3P is used as the coupling reagent, the reaction may be conducted under basic conditions, for example in the presence of an amine such as diisopropylethylamine (DIPEA) or triethylamine (TEA) and in an organic solvent such as 1,4-dioxane.

Compounds of general formula (III) are known and are commercially available or may be obtained by known methods.

A compound of general formula (II) may be prepared by reacting a compound of general formula (IV):

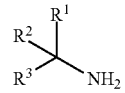

(IV)

wherein $R^1$, $R^2$ and $R^3$ are as defined for general formula (I);
with a compound of general formula (V):

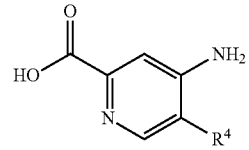

(V)

wherein $R^4$ is as defined for general formula (I).

Again, the reaction is suitably carried out in the presence of a coupling reagent as described above, for example TBTU and in the presence of base such as triethylamine.

Compounds of general formulae (IV) and (V) are known and are readily available or may be prepared by known methods.

Alternatively, a compound of general formula (I) may be prepared by deprotecting a protected compound of general formula (Iz):

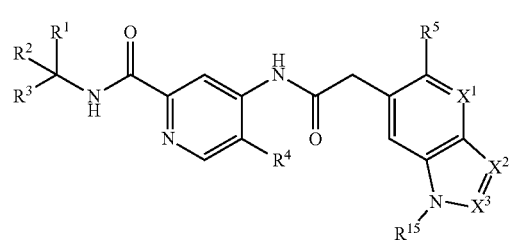

(Iz)

wherein $R^1$, $R^2$, $R^3$, $R^4$ $R^5$, $X^1$, $X^2$ and $X^3$ are as defined for general formula (I) and $R^{15}$ is an amine protecting group, for example a cyclic ether such as tetrahydropyran-2-yl or a benzyl or substituted benzyl group such as 4-methoxybenzyl.

Deprotection may be achieved by treatment with an acid, for example trifluoroacetic acid.

The protected compound of general formula (Iz) may be prepared by reacting a compound of general formula (II) with a protected compound of general formula (IIIz):

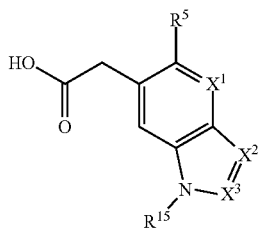

(IIIz)

wherein $R^5$, $X^1$, $X^2$ and $X^3$ are as defined for general formula (I) and $R^{15}$ is as defined for general formula (Iz).

The reaction may be conducted in the presence of a coupling agent as described above for the reaction between the compounds of general formulae (II) and (III). The crude product may be used in the subsequent deprotection step without further purification.

Some compounds of general formula (IIIz) may be prepared from a compound of general formula (III) by known methods depending on the nature of the protecting group.

For example, when the group $R^{15}$ is a tetrahydropyran-2-yl group, a compound of general formula (III) may be reacted with 3,4-dihydro-2H-pyran in the presence of pyridinium p-toluenesulfonate. When the group $R^{15}$ is benzyl or a benzyl derivative, the compound of general formula (III) may be reacted with chloromethyl benzene or a substituted derivative thereof such as 1-chloromethyl-4-methoxybenzene. This reaction usually leads to a mixture of the required protected compound of general formula (IIIz) as a mixture with the estes of the compound of formula (IIIz). The ester can be converted to the compound of general formula (IIIz) by hydrolysis using an aqueous base such as lithium or sodium hydroxide. When $X^2$ and/or $X^3$ is N, a mixture of isomers may be produced which will not require separation since the eventual removal of the protecting groups will yield the required product.

Methods for preparing other compounds of general formula (IIIz) are described below (see method for preparing compounds of formulae (IIIaz)).

An alternative method for preparing a compound of general formula (Iz) is by reacting a compound of general formula (IV) as defined above with a protected compound of general formula (XIIz):

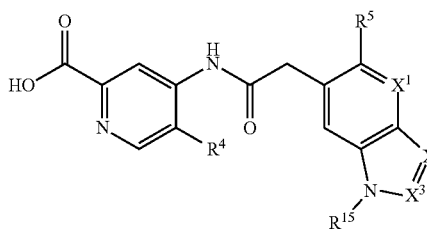

(XIIz)

wherein $R^4$ $R^5$, $X^1$, $X^2$ and $X^3$ are as defined for general formula (I) and $R^{15}$ is as defined for general formula (Iz).

Suitably, the reaction is carried out in the presence of a coupling agent under similar conditions to those described above for the reaction of the compound of general formula (II) with the compound of general formula (III).

A compound of general formula (XIIz) may be prepared by hydrolysis of a compound of general formula (XIIIz):

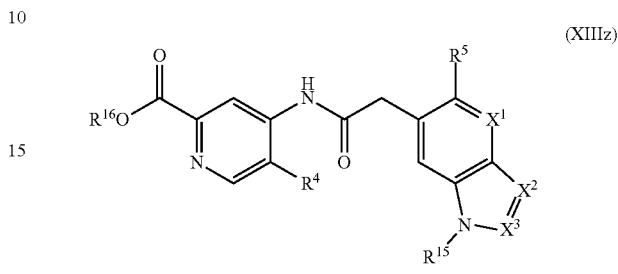

(XIIIz)

wherein $R^4$ $R^5$, $X^1$, $X^2$ and $X^3$ are as defined for general formula (I), $R^{15}$ is as defined for general formula (Iz) and $R^{16}$ is $C_{1-6}$ alkyl or benzyl, for example methyl.

Suitably, the hydrolysis is conducted under basic conditions, for example in the presence of lithium, sodium or potassium hydroxide and in a mixed solvent comprising an alcohol such as methanol, water and an organic solvent such as tetrahydrofuran. The reaction may be carried out at a temperature of about 15 to 25° C., typically at room temperature.

A compound of general formula (XIIIz) may be prepared by reacting a compound of general formula (IIIz) as defined above with a compound of general formula (XIV):

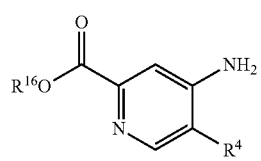

(XIV)

wherein $R^4$ is as defined for general formula (I) and $R^{16}$ is as defined for general formula (XIIIz).

Suitably, the reaction is carried out in the presence of a coupling reagent as described above.

Compounds of general formula (XIV) are known and are commercially available or may be prepared by known methods, for example by esterification of carboxylic acids of general formula (V) above.

A compound of general formula (XIIz) in which $X^1$ is $CR^6$ and $X^2$ is $CR^7$ is designated a compound of general formula (XIIaz):

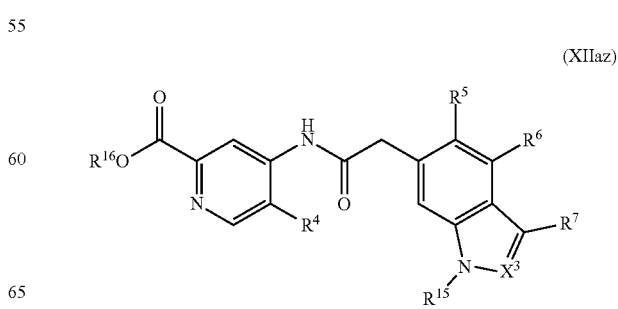

(XIIaz)

wherein $X^3$, $R^4$ $R^5$, $R^6$ and $R^7$ are as defined for general formula (I), $R^{15}$ is as defined for general formula (Iz) and $R^{16}$ is as defined for general formula (XIIIz).

Compounds of general formula (XIIaz) are particularly useful for preparing compounds of general formula (I) in which one of $R^5$ and $R^6$ is H and the other of $R^5$ and $R^6$ is halo and compounds in which $R^7$ is other than H.

A compound of general formula (XIIaz) may be prepared by reacting a compound of general formula (IIIz) in which $X^1$ is $CR^6$ and $X^2$ is $CR^7$ (i.e. a compound of general formula (IIIaz)):

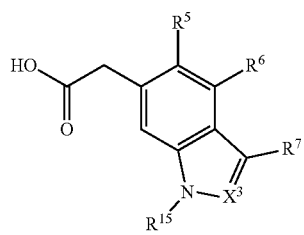

(IIIaz)

wherein $X^3$, $R^5$, $R^6$ and $R^7$ are as defined for general formula (I) and $R^{15}$ is as defined for general formula (Iz);
with a compound of general formula (XIV) as defined above.

A compound of general formula (IIIaz) may be prepared by carbonylation of a compound of general formula (XXI):

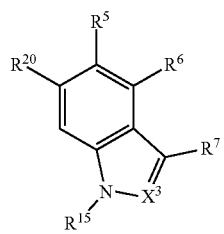

(XXI)

wherein $X^3$, $R^5$, $R^6$ and $R^7$ are as defined for general formula (I); $R^{15}$ is as defined for general formula (Iz); and $R^{20}$ is halo, for example bromo.

Carbonylation can be achieved by reaction with the alkali metal salt of a malonic acid monoester, such as methyl potassium malonate, in the presence of a Pd catalyst such as [Pd(allyl)Cl]$_2$, a phosphine ligand such as 2,2'-bis(diphenylphosphino)-1,1'-binaphthyl (BINAP) and an organic base, such as DMAP, followed by hydrolysis of the resulting ester with aqueous base, for example an alkali metal hydroxide such as lithium hydroxide.

Suitably, the reaction is carried out under an inert atmosphere such as nitrogen and at elevated temperature, typically 120° to 160° C.

An alternative method for preparing a compound of general formula (IIIaz) is by reacting a compound of general formula (XXI) as defined above with the alkali metal salt of cyanoacetic acid, such as potassium 2-cyanoacetate, in the presence of a phosphine ligand such as SPhos and a palladium catalyst such as [Pd(allyl)Cl]$_2$ dichloride, followed by hydrolysis of the resulting nitrile with aqueous base, for example an alkali metal hydroxide such as sodium hydroxide. Suitably, the reaction is carried out under an inert atmosphere such as nitrogen and at elevated temperature, typically 120° to 160° C.

A compound of general formula (XXI) may be prepared by protecting a compound of general formula (XXII):

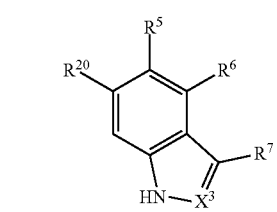

(XXII)

wherein $X^3$, $R^5$, $R^6$ and $R^7$ as defined for general formula (I); and $R^{20}$ is as defined for general formula (XXI).

Protection may be achieved using the methods described above for the preparation of a compound of general formula (IIIz) from a compound of general formula (III).

Compounds of general formula (XXII) are known and are commercially available or may be prepared by known methods.

An alternative method for preparing a compound of general formula (XXI) which is particularly suitable for compounds in which $R^7$ is CH$_2$—$R^{11}$, (where $R^{11}$ is a nitrogen-containing 3- to 6-membered heterocyclic ring linked to the CH$_2$ moiety via a ring nitrogen atom), is by reaction of a compound of general formula (XXX):

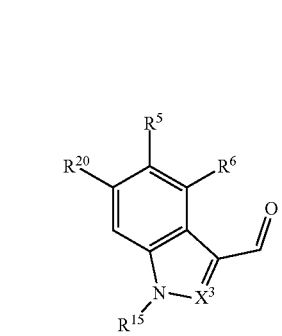

(XXX)

wherein $X^3$ $R^5$ and $R^6$ are as defined for general formula (I); $R^{15}$ is as defined for general formula (Iz); and $R^{20}$ is as defined for general formula (XXI);
with a compound of general formula (XXXI):

$R^{11}$—H  (XXXI)

wherein $R^{11}$ is a nitrogen-containing 3- to 6-membered heterocyclic ring linked to the H atom via a ring nitrogen atom.

The reaction may be carried out under reducing conditions, for example in the presence of a hydride such as sodium triacetoxyborohydride in an organic solvent such as tetrahydrofuran and at a temperature of about 15 to 25° C., typically at room temperature and in the presence of an acid such as acetic acid.

Compounds of general formula (XXXI) are known and are commercially available or may be prepared by known methods.

A compound of general formula (XXX) may be prepared by protecting a compound of general formula (XXXII):

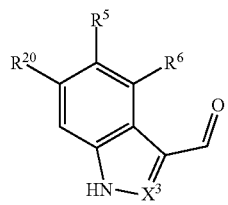

(XXXII)

wherein $X^3$, $R^5$ and $R^6$ are as defined for general formula (I); and $R^{20}$ is as defined for general formula (XXI);
by a method as described above for the preparation of the compound of general formula (IIIz).

Compounds of general formula (XXXII) are known and are commercially available or may be prepared by known methods.

An alternative method for preparing a compound of general formula (XXI) which is particularly suitable for compounds in which $R^7$ is —C(CH$_3$)(OH)—R$^{12}$ in which $R^{12}$ is CF$_3$ or CHF$_2$ is by reaction of a compound of general formula (XXXV):

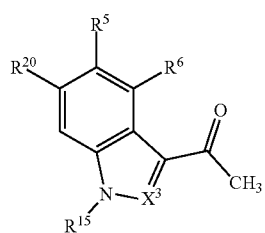

(XXXV)

wherein $X^3$, $R^5$ and $R^6$ are as defined for general formula (I); $R^{15}$ is as defined for general formula (Iz); and $R^{20}$ is as defined for general formula (XXI);
with a compound of general formula (XXXVI):

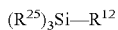

(R$^{25}$)$_3$Si—R$^{12}$    (XXXVI)

wherein each $R^{25}$ is independently C$_{1-6}$ alkyl and $R^{12}$ is C$_{1-2}$ alkyl or C$_{1-2}$ haloalkyl.

The reaction may be conducted in the presence of a fluoride ion source such as tetrabutylammonium fluoride (TBAF).

Compounds of general formula (XXI) in which $R^7$ is —C(CH$_3$)(OH)—R$^{12}$ where $R^{12}$ is other than CF$_3$ or CHF$_2$, may be synthesised by reacting the compound of general formula (XXXV) with an appropriate Grignard reagent under suitable reaction conditions.

Compounds of general formula (XXXVI) are known and are commercially available or may be prepared by known methods.

A compound of general formula (XXXV) may be prepared by oxidation of a compound of general formula (XXXVII):

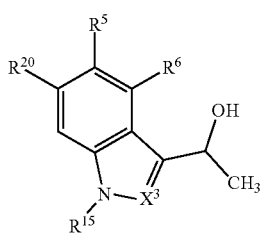

(XXXVII)

wherein $X^3$, $R^5$ and $R^6$ are as defined for general formula (I); $R^{15}$ is as defined for general formula (Iz); and $R^{20}$ is as defined for general formula (XXI).

Suitable oxidising agents include Dess-Martin periodinane. In this case the oxidation is suitably conducted in an organic solvent such as dichloromethane.

A compound of general formula (XXXVII) may be prepared by reacting a compound of general formula (XXX) as defined above with a methyl Grignard reagent.

The OH group of a compound of general formula (XXI) in which $R^7$ is —C(CH$_3$)(OH)—R$^{12}$ will generally be protected, for example as a benzyl ether, before carbonylation to yield a compound of general formula (IIIaz). The protecting group can be retained in the compounds of general formulae (XIIaz) and (Iaz) and removed at the same time as the protecting group $R^{15}$ when the compound of general formula (Iaz) is converted to a compound of general formula (Ia).

A compound of general formula (IIIaz) is a protected compound of general formula (III) in which $X^1$ is CR$^6$ and $X^2$ is CR$^7$ and so it can be reacted with a compound of general formula (II) as described above to give a compound of general formula (Iaz):

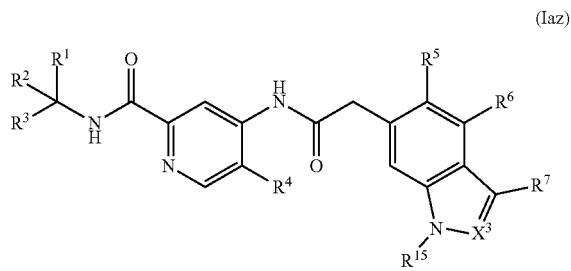

(Iaz)

wherein $R^1$, $R^2$, $R^3$, $R^4$ $R^5$, $R^6$ and $R^7$ are as defined for general formula (I) and $R^{15}$ is as defined for general formula (Iz);

which can be deprotected to give a compound of general formula (Ia).

A further alternative method for preparing a compound of general formula (I) is by reacting a compound of general formula (IV) as defined above with a compound of general formula (XII):

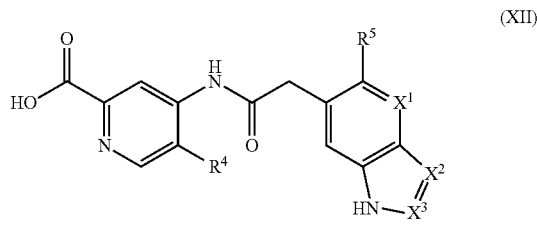

(XII)

wherein $R^4$ $R^5$, $X^1$, $X^2$ and $X^3$ are as defined for general formula (I).

Suitably, the reaction is carried out in the presence of a coupling agent under similar conditions to those described above for the reaction of the compound of general formula (II) with the compound of general formula (III).

The compound of general formula (XII) may be prepared by deprotecting a compound of general formula (XIIz) as described above by reaction with an acid such as trifluoroacetic acid.

Compounds of general formula (Ia) in which $R^7$ is alkyl or heterocyclyl can be prepared from compounds of general formula (XXVaz):

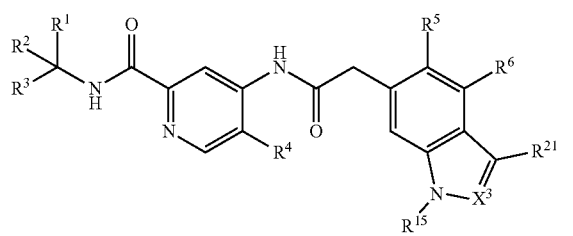

(XXVaz)

wherein $X^3$, $R^1$, $R^2$, $R^3$, $R^4$ $R^5$ and $R^6$ are as defined for general formula (I); $R^{15}$ is as defined for general formula (Iz); and $R^{21}$ is halo, for example bromo or iodo;

by reaction with an appropriate dioxaborolane under basic conditions, for example in the presence of $K_2PO_4$, and in the presence of a palladium catalyst such as palladium acetate followed by catalytic hydrogenation over a palladium catalyst. When the protecting group $R^{15}$ is benzyl or a derivative such as paramethoxybenzyl, it will be removed by the hydrogenation process. Otherwise, an additional deprotection step may be required, for example treatment with an acid such as TFA.

For compounds of general formula (Ib) in which $R^7$ is isopropyl, the borolane used in the first step may be 2-isopropenyl-4,4,5,5-tetramethyl-1,3,2-dioxaborolane, while for compounds in which $R^7$ is tetrahydrofuran-2-yl, 2-(2,3-dihydrofuran-4-yl)-4,4,5,5-tetramethyl-1,3,2-dioxaborolane may be used. Other diborolanes may be selected for the introduction of alternative $R^7$ groups.

A compound of general formula (XXVaz) may be prepared by reacting a compound of general formula (II) as defined above with a compound of general formula (XXVI).

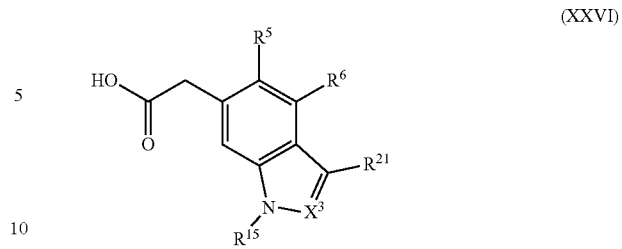

(XXVI)

wherein $X^3$, $R^5$ and $R^6$ are as defined for general formula (I); $R^{15}$ is as defined for general formula (Iz); and $R^{21}$ is as defined for general formula (XXVaz).

The reaction may take place in the presence of a coupling reagent under the conditions described above for the reaction of the compound of general formula (II) with the compound of general formula (III).

A compound of general formula (XXVI) may be prepared from a compound of general formula (XXVII):

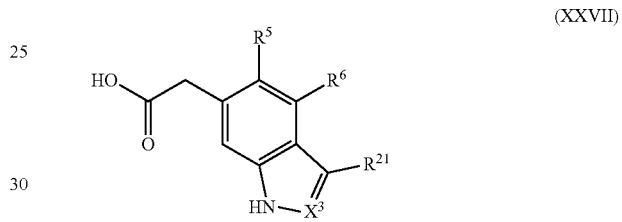

(XXVII)

wherein $X^3$, $R^5$ and $R^6$ are as defined for general formula (I); and $R^{21}$ is as defined for general formula (XXVaz).
by methods analogous to those described above for preparing the compounds of general formula (IIIz) and (IIIaz).

A compound of general formula (XXVII) may be prepared by halogenating a compound of general formula (XXVIII):

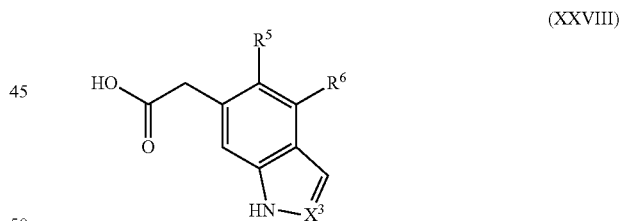

(XXVIII)

wherein $X^3$, $R^5$ and $R^6$ are as defined for general formula (I); according to the procedure of Tang et al, *J. Org. Chem.* 2018, 83(2), 930-938.

Compounds of general formula (XXVIII) are known and are commercially available or may be prepared by known methods.

The compounds of general formula (I) are positive modulators of TMEM16A and therefore, in a further aspect of the invention, there is provided a compound of general formula (I) as defined above for use in medicine, particularly in the treatment or prophylaxis of diseases and conditions affected by modulation of TMEM16A.

There is also provided the use of a compound of general formula (I) in the manufacture of a medicament for the treatment or prophylaxis of diseases and conditions affected by modulation of TMEM16A.

There is also provided a method for the treatment or prophylaxis of diseases and conditions affected by modulation of TMEM16A, the method comprising administering to a patient in need of such treatment an effective amount of a compound of general formula (I).

The diseases and conditions affected by modulation of TMEM16A include respiratory diseases and conditions, dry mouth (xerostomia), intestinal hypermobility, cholestasis and ocular conditions.

There is also provided:

A compound of general formula (I) for use in the treatment or prophylaxis of respiratory diseases and conditions.

A compound of general formula (I) for use in the treatment or prophylaxis of dry mouth (xerostomia).

A compound of general formula (I) for use in the treatment or prophylaxis of intestinal hypermobility.

A compound of general formula (I) for use in the treatment or prophylaxis of cholestasis.

A compound of general formula (I) for use in the treatment or prophylaxis of ocular conditions.

The invention also provides:

The use of a compound of general formula (I) in the manufacture of a medicament for the treatment or prophylaxis of respiratory diseases and conditions.

The use of a compound of general formula (I) in the manufacture of a medicament for the treatment or prophylaxis of dry mouth (xerostomia).

The use of a compound of general formula (I) in the manufacture of a medicament for the treatment or prophylaxis of intestinal hypermobility.

The use of a compound of general formula (I) in the manufacture of a medicament for the treatment or prophylaxis of cholestasis.

The use of a compound of general formula (I) in the manufacture of a medicament for the treatment or prophylaxis of ocular conditions.

There is further provided:

A method for the treatment or prophylaxis of respiratory diseases and conditions, the method comprising administering to a patient in need of such treatment an effective amount of a compound of general formula (I).

A method for the treatment or prophylaxis of dry mouth (xerostomia), the method comprising administering to a patient in need of such treatment an effective amount of a compound of general formula (I).

A method for the treatment or prophylaxis of intestinal hypermobility, the method comprising administering to a patient in need of such treatment an effective amount of a compound of general formula (I).

A method for the treatment or prophylaxis of cholestasis, the method comprising administering to a patient in need of such treatment an effective amount of a compound of general formula (I).

A method for the treatment or prophylaxis of ocular conditions, the method comprising administering to a patient in need of such treatment an effective amount of a compound of general formula (I).

Respiratory diseases and conditions which may be treated or prevented by the compounds of general formula (I) include cystic fibrosis, chronic obstructive pulmonary disease (COPD), chronic bronchitis, emphysema, bronchiectasis, including non-cystic fibrosis bronchiectasis, asthma and primary ciliary dyskinesia.

Dry mouth (xerostomia) which may be treated or prevented by the compounds of general formula (I) may result from Sjorgens syndrome, radiotherapy treatment and xerogenic drugs.

Intestinal hypermobility which may be treated or prevented by the compounds of general formula (I) may be associated with gastric dyspepsia, gastroparesis, chronic constipation and irritable bowel syndrome.

Ocular conditions which may be treated or prevented by the compounds of by the compounds of general formula (I) include dry eye disease.

The compounds of the present invention will generally be administered as part of a pharmaceutical composition and therefore the invention further provides a pharmaceutical composition comprising a compound of general formula (I) together with a pharmaceutically acceptable excipient.

The pharmaceutical composition may be formulated for oral, rectal, nasal, bronchial (inhaled), topical (including dermal, transdermal, eye drops, buccal and sublingual), vaginal or parenteral (including subcutaneous, intramuscular, intravenous and intradermal) administration and may be prepared by any methods well known in the art of pharmacy.

The composition may be prepared by bringing into association the above defined active agent with the excipient. In general, the formulations are prepared by uniformly and intimately bringing into association the active agent with liquid carriers or finely divided solid carriers or both, and then if necessary shaping the product. The invention extends to methods for preparing a pharmaceutical composition comprising bringing a compound of general formula (I) in conjunction or association with a pharmaceutically acceptable carrier or vehicle.

Formulations for oral administration in the present invention may be presented as: discrete units such as capsules, sachets or tablets each containing a predetermined amount of the active agent; as a powder or granules; as a solution or a suspension of the active agent in an aqueous liquid or a non-aqueous liquid; or as an oil-in-water liquid emulsion or a water in oil liquid emulsion; or as a bolus etc.

For compositions for oral administration (e.g. tablets and capsules), the term "acceptable carrier" includes vehicles such as common excipients e.g. binding agents, for example syrup, acacia, gelatin, sorbitol, tragacanth, polyvinylpyrrolidone (Povidone), methylcellulose, ethylcellulose, sodium carboxymethylcellulose, hydroxypropylmethylcellulose, sucrose and starch; fillers and carriers, for example corn starch, gelatin, lactose, sucrose, microcrystalline cellulose, kaolin, mannitol, dicalcium phosphate, sodium chloride and alginic acid; and lubricants such as magnesium stearate, sodium stearate and other metallic stearates, glycerol stearate, stearic acid, silicone fluid, talc waxes, oils and colloidal silica. Flavouring agents such as peppermint, oil of wintergreen, cherry flavouring and the like can also be used. It may be desirable to add a colouring agent to make the dosage form readily identifiable. Tablets may also be coated by methods well known in the art.

A tablet may be made by compression or moulding, optionally with one or more accessory ingredients. Compressed tablets may be prepared by compressing in a suitable machine the active agent in a free flowing form such as a powder or granules, optionally mixed with a binder, lubricant, inert diluent, preservative, surface-active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active agent.

Other formulations suitable for oral administration include lozenges comprising the active agent in a flavoured base, usually sucrose and acacia or tragacanth; pastilles comprising the active agent in an inert base such as gelatin and glycerin, or sucrose and acacia; and mouthwashes comprising the active agent in a suitable liquid carrier.

For topical application to the skin, compounds of general formula (I) may be made up into a cream, ointment, jelly, solution or suspension etc. Cream or ointment formulations that may be used for the drug are conventional formulations well known in the art, for example, as described in standard text books of pharmaceutics such as the British Pharmacopoeia.

Topical administration to the lung may be achieved by use of an aerosol formulation. Aerosol formulations typically comprise the active ingredient suspended or dissolved in a suitable aerosol propellant, such as a chlorofluorocarbon (CFC) or a hydrofluorocarbon (HFC). Suitable CFC propellants include trichloromonofluoromethane (propellant 11), dichlorotetrafluoromethane (propellant 114), and dichlorodifluoromethane (propellant 12). Suitable HFC propellants include tetrafluoroethane (HFC-134a) and heptafluoropropane (HFC-227). The propellant typically comprises 40%-99.5% e.g. 40%-90% by weight of the total inhalation composition. The formulation may comprise excipients including co-solvents (e.g. ethanol) and surfactants (e.g. lecithin, sorbitan trioleate and the like). Other possible excipients include polyethylene glycol, polyvinylpyrrolidone, glycerine and the like. Aerosol formulations are packaged in canisters and a suitable dose is delivered by means of a metering valve (e.g. as supplied by Bespak, Valois or 3M or alternatively by Aptar, Coster or Vari).

Topical administration to the lung may also be achieved by use of a non-pressurised formulation such as an aqueous solution or suspension. These may be administered by means of a nebuliser e.g. one that can be hand-held and portable or for home or hospital use (ie non-portable). The formulation may comprise excipients such as water, buffers, tonicity adjusting agents, pH adjusting agents, surfactants and co-solvents. Suspension liquid and aerosol formulations (whether pressurised or unpressurised) will typically contain the compound of the invention in finely divided form, for example with a $D_{50}$ of 0.5-10 µm e.g. around 1-5 µm. Particle size distributions may be represented using $D_{10}$, $D_{50}$ and $D_{90}$ values. The $D_{50}$ median value of particle size distributions is defined as the particle size in microns that divides the distribution in half. The measurement derived from laser diffraction is more accurately described as a volume distribution, and consequently the $D_{50}$ value obtained using this procedure is more meaningfully referred to as a $Dv_{50}$ value (median for a volume distribution). As used herein Dv values refer to particle size distributions measured using laser diffraction. Similarly, $D_{10}$ and $D_{90}$ values, used in the context of laser diffraction, are taken to mean $D_{v10}$ and $Dv_{90}$ values and refer to the particle size whereby 10% of the distribution lies below the $D_{10}$ value, and 90% of the distribution lies below the $D_{90}$ value, respectively.

Topical administration to the lung may also be achieved by use of a dry-powder formulation. A dry powder formulation will contain the compound of the disclosure in finely divided form, typically with a mass mean diameter (MMAD) of 1-10 µm or a $D_{50}$ of 0.5-10 µm e.g. around 1-5 µm. Powders of the compound of the invention in finely divided form may be prepared by a micronization process or similar size reduction process. Micronization may be performed using a jet mill such as those manufactured by Hosokawa Alpine. The resultant particle size distribution may be measured using laser diffraction (e.g. with a Malvern Mastersizer 2000S instrument). The formulation will typically contain a topically acceptable diluent such as lactose, glucose or mannitol (preferably lactose), usually of comparatively large particle size e.g. a mass mean diameter (MMAD) of 50 µm or more, e.g. 100 µm or more or a $D_{50}$ of 40-150 µm. As used herein, the term "lactose" refers to a lactose-containing component, including α-lactose monohydrate, β-lactose monohydrate, α-lactose anhydrous, β-lactose anhydrous and amorphous lactose. Lactose components may be processed by micronization, sieving, milling, compression, agglomeration or spray drying. Commercially available forms of lactose in various forms are also encompassed, for example Lactohale® (inhalation grade lactose; DFE Pharma), InhaLac®70 (sieved lactose for dry powder inhaler; Meggle), Pharmatose® (DFE Pharma) and Respitose® (sieved inhalation grade lactose; DFE Pharma) products. In one embodiment, the lactose component is selected from the group consisting of α-lactose monohydrate, α-lactose anhydrous and amorphous lactose. Preferably, the lactose is α-lactose monohydrate.

Dry powder formulations may also contain other excipients. Thus in one embodiment a dry powder formulation according the present disclosure comprises magnesium or calcium stearate. Such formulations may have superior chemical and/or physical stability especially when such formulations also contain lactose.

A dry powder formulation is typically delivered using a dry powder inhaler (DPI) device. Example dry powder delivery systems include SPINHALER®, DISKHALER®, TURBOHALER®, DISKUS®, SKYEHALER®, ACCUHALER® and CLICKHALER®. Further examples of dry powder delivery systems include ECLIPSE, NEXT, ROTAHALER, HANDIHALER, AEROLISER, CYCLOHALER, BREEZHALER/NEOHALER, MONODOSE, FLOWCAPS, TWINCAPS, X-CAPS, TURBOSPIN, ELPENHALER, MIATHALER, TWISTHALER, NOVOLIZER, PRESSAIR, ELLIPTA, ORIEL dry powder inhaler, MICRODOSE, PULVINAL, EASYHALER, ULTRAHALER, TAIFUN, PULMOJET, OMNIHALER, GYROHALER, TAPER, CONIX, XCELOVAIR and PROHALER.

In one embodiment a compound of general formula (I) is provided as a micronized dry powder formulation, for example comprising lactose of a suitable grade.

Thus, as an aspect of the invention there is provided a pharmaceutical composition comprising a compound of general formula (I) in particulate form in combination with particulate lactose, said composition optionally comprising magnesium stearate.

In one embodiment a compound of general formula (I) is provided as a micronized dry powder formulation, comprising lactose of a suitable grade and magnesium stearate, filled into a device such as DISKUS. Suitably, such a device is a multidose device, for example the formulation is filled into blisters for use in a multi-unit dose device such as DISKUS.

In another embodiment a compound of general formula (I) is provided as a micronized dry powder formulation, for example comprising lactose of a suitable grade, filled into hard shell capsules for use in a single dose device such as AEROLISER.

In another embodiment a compound of general formula (I) is provided as a micronized dry powder formulation, comprising lactose of a suitable grade and magnesium stearate, filled into hard shell capsules for use in a single dose device such as AEROLISER.

In another embodiment a compound of general formula (I) is provided as a fine powder for use in an inhalation dosage form wherein the powder is in fine particles with a $D_{50}$ of 0.5-10 μm e.g. around 1-5 μm, that have been produced by a size reduction process other than jet mill micronisation e.g. spray drying, spray freezing, microfluidisation, high pressure homogenisation, super critical fluid crystallisation, ultrasonic crystallisation or combinations of these methods thereof, or other suitable particle formation methods known in the art that are used to produce fine particles with an aerodynamic particle size of 0.5-10 μm. The resultant particle size distribution may be measured using laser diffraction (e.g. with a Malvern Mastersizer 2000S instrument). The particles may either comprise the compound alone or in combination with suitable other excipients that may aid the processing. The resultant fine particles may form the final formulation for delivery to humans or may optionally be further formulated with other suitable excipients to facilitate delivery in an acceptable dosage form.

The compound of the invention may also be administered rectally, for example in the form of suppositories or enemas, which include aqueous or oily solutions as well as suspensions and emulsions and foams. Such compositions are prepared following standard procedures, well known by those skilled in the art. For example, suppositories can be prepared by mixing the active ingredient with a conventional suppository base such as cocoa butter or other glycerides. In this case, the drug is mixed with a suitable non-irritating excipient which is solid at ordinary temperatures but liquid at the rectal temperature and will therefore melt in the rectum to release the drug. Such materials are cocoa butter and polyethylene glycols.

Generally, for compositions intended to be administered topically to the eye in the form of eye drops or eye ointments, the total amount of the compound of general formula (I) will be about 0.0001 to less than 4.0% (w/w).

Preferably, for topical ocular administration, the compositions administered according to general formula (I) will be formulated as solutions, suspensions, emulsions and other dosage forms. Aqueous solutions are generally preferred, based on ease of formulation, as well as a patient's ability to administer such compositions easily by means of instilling one to two drops of the solutions in the affected eyes. However, the compositions may also be suspensions, viscous or semi-viscous gels, or other types of solid or semi-solid compositions. Suspensions may be preferred for compounds that are sparingly soluble in water.

An alternative for administration to the eye is intravitreal injection of a solution or suspension of the compound of general formula (I). In addition, the compound of general formula (I) may also be introduced by means of ocular implants or inserts.

The compositions administered according to general formula (I) may also include various other ingredients, including, but not limited to, tonicity agents, buffers, surfactants, stabilizing polymer, preservatives, co-solvents and viscosity building agents. Suitable pharmaceutical compositions of general formula (I) include a compound of the invention formulated with a tonicity agent and a buffer. The pharmaceutical compositions of general formula (I) may further optionally include a surfactant and/or a palliative agent and/or a stabilizing polymer.

Various tonicity agents may be employed to adjust the tonicity of the composition, preferably to that of natural tears for ophthalmic compositions. For example, sodium chloride, potassium chloride, magnesium chloride, calcium chloride, simple sugars such as dextrose, fructose, galactose, and/or simply polyols such as the sugar alcohols mannitol, sorbitol, xylitol, lactitol, isomaltitol, maltitol, and hydrogenated starch hydrolysates may be added to the composition to approximate physiological tonicity. Such an amount of tonicity agent will vary, depending on the particular agent to be added. In general, however, the compositions will have a tonicity agent in an amount sufficient to cause the final composition to have an ophthalmically acceptable osmolality (generally about 150-450 mOsm, preferably 250-350 mOsm and most preferably at approximately 290 mOsm). In general, the tonicity agents of the invention will be present in the range of 2 to 4% w/w. Preferred tonicity agents of the invention include the simple sugars or the sugar alcohols, such as D-mannitol.

An appropriate buffer system (e.g. sodium phosphate, sodium acetate, sodium citrate, sodium borate or boric acid) may be added to the compositions to prevent pH drift under storage conditions. The particular concentration will vary, depending on the agent employed. Preferably however, the buffer will be chosen to maintain a target pH within the range of pH 5 to 8, and more preferably to a target pH of pH 5 to 7.

Surfactants may optionally be employed to deliver higher concentrations of compound of general formula (I). The surfactants function to solubilise the compound and stabilise colloid dispersion, such as micellar solution, microemulsion, emulsion and suspension. Examples of surfactants which may optionally be used include polysorbate, poloxamer, polyosyl 40 stearate, polyoxyl castor oil, tyloxapol, Triton, and sorbitan monolaurate. Preferred surfactants to be employed in the invention have a hydrophile/lipophile/balance "HLB" in the range of 12.4 to 13.2 and are acceptable for ophthalmic use, such as TritonX114 and tyloxapol.

Additional agents that may be added to the ophthalmic compositions of compounds of general formula (I) are demulcents which function as a stabilising polymer. The stabilizing polymer should be an ionic/charged example with precedence for topical ocular use, more specifically, a polymer that carries negative charge on its surface that can exhibit a zeta-potential of (−)10-50 mV for physical stability and capable of making a dispersion in water (i.e. water soluble). A preferred stabilising polymer of the invention would be polyelectrolyte, or polyelectrolytes if more than one, from the family of cross-linked polyacrylates, such as carbomers and Pemulen(R), specifically Carbomer 974p (polyacrylic acid), at 0.1-0.5% w/w.

Other compounds may also be added to the ophthalmic compositions of the compound of general formula (I) to increase the viscosity of the carrier. Examples of viscosity enhancing agents include, but are not limited to: polysaccharides, such as hyaluronic acid and its salts, chondroitin sulfate and its salts, dextrans, various polymers of the cellulose family; vinyl polymers; and acrylic acid polymers.

Topical ophthalmic products are typically packaged in multidose form. Preservatives are thus required to prevent microbial contamination during use. Suitable preservatives include: benzalkonium chloride, chlorobutanol, benzododecinium bromide, methyl paraben, propyl paraben, phenylethyl alcohol, edentate disodium, sorbic acid, polyquaternium-1, or other agents known to those skilled in the art. Such preservatives are typically employed at a level of from 0.001 to 1.0% w/v. Unit dose compositions of general formula (I) will be sterile, but typically unpreserved. Such compositions, therefore, generally will not contain preservatives.

Parenteral formulations will generally be sterile.

The medical practitioner, or other skilled person, will be able to determine a suitable dosage for the compound of general formula (I) and hence the amount of the compound of the invention that should be included in any particular pharmaceutical formulation (whether in unit dosage form or otherwise).

Compounds of general formula (I) may be used in combination with one or more other active agents which are useful in the treatment or prophylaxis of respiratory diseases and conditions.

An additional active agent of this type may be included in the pharmaceutical composition described above but alternatively it may be administered separately, either at the same time as the compound of general formula (I) or at an earlier or later time.

Therefore, in a further aspect of the present invention there is provided a product comprising a compound of general formula (I) and an additional agent useful in the treatment or prevention of respiratory conditions as a combined preparation for simultaneous, sequential or separate use in the treatment of a disease or condition affected by modulation of TMEM16A and especially a respiratory disease or condition, for example one of the diseases and conditions mentioned above.

There is also provided a compound of general formula (I) in combination with an additional agent useful in the treatment or prevention of respiratory conditions as a combined preparation for simultaneous, sequential or separate use in the treatment of a disease or condition affected by modulation of TMEM16A and especially a respiratory disease or condition, for example one of the diseases and conditions mentioned above.

Suitable additional active agents which may be included in a pharmaceutical composition or a combined preparation with the compounds of general formula (I), (Ix), (IA), (IB), (IC), (ID) or (IE) include:
- β2 adrenoreceptor agonists such as metaproterenol, isoproterenol, isoprenaline, albuterol, salbutamol, formoterol, salmeterol, indacaterol, terbutaline, orciprenaline, bitolterol mesylate, pirbuterol, olodaterol, vilanterol and abediterol;
- antihistamines, for example histamine $H_1$ receptor antagonists such as loratadine, cetirizine, desloratadine, levocetirizine, fexofenadine, astemizole, azelastine and chlorpheniramine or $H_4$ receptor antagonists;
- dornase alpha;
- corticosteroids such as prednisone, prednisolone, flunisolide, triamcinolone acetonide, beclomethasone dipropionate, budesonide, fluticasone propionate mometasone furoate and fluticasone furoate;
- Leukotriene antagonists such as montelukast and zafirlukast;
- anticholinergic compounds, particularly muscarinic antagonists such as ipratropium, tiotropium, glycopyrrolate, aclidinium and umeclidinium;
- CFTR repair therapies (e.g. CFTR potentiators, correctors or amplifiers) such as Ivacaftor, QBW251, Bamacaftor (VX659), Elexacaftor (VX445), VX561/CPT-656, VX152, VX440, GLP2737, GLP2222, GLP2451, PT1438, PTI801, PT1808, FDL-169 and FDL-176 and CFTR correctors such as Lumacaftor and Tezacaftor or combinations thereof (for example a combination of Ivacaftor, Tezacaftor and Elexacaftor);
- ENaC modulators, particularly ENaC inhibitors;
- Antibiotics;
- Antivirals such as ribavirin and neuraminidase inhibitors such as zanamivir;
- Antifungals such as PUR1900;
- Airway hydrating agents (osmoloytes) such as hypertonic saline and mannitol (Bronchitol®); and
- Mucolytic agents such as. N-acetyl cysteine.

When the additional active agent is an ENaC modulator, it may be an ENaC inhibitor such as amiloride, VX-371, AZD5634, QBW276, SPX-101, B1443651, B11265162 and ETD001. Other suitable ENaC blockers are disclosed in our applications WO 2017/221008, WO 2018/096325, WO 2019/077340 and WO 2019/220147 and any of the example compounds of those applications may be used in combination with the compounds of general formula (I). Particularly suitable compounds for use in combination with the compounds of general formula (I) include compounds having a cation selected from:
2-[({3-amino-5H-pyrrolo[2,3-b]pyrazin-2-yl}formamido) ethyl]-6-(4-{bis[(2S,3R,4R,5R)-2,3,4,5,6-pentahydroxyhexyl]amino}piperidine-1-carbonyl)-1,3-diethyl-1H-1,3-benzodiazol-3-ium;
2-[({3-amino-5H-pyrrolo[2,3-b]pyrazin-2-yl}formamido) methyl]-6-{[2-(4-{bis[(2S,3R,4R,5R)-2,3,4,5,6-pentahydroxyhexyl]amino}piperidin-1-yl)ethyl]carbamoyl}-1,3-diethyl-1H-1,3-benzodiazol-3-ium;
2-[({3-amino-5H-pyrrolo[2,3-b]pyrazin-2-yl}formamido) methyl]-5-[4-({bis[(2S,3R,4R,5R)-2,3,4,5,6-pentahydroxyhexyl]amino}methyl)piperidine-1-carbonyl]-1,3-diethyl-1H-1,3-benzodiazol-3-ium;
2-[({3-amino-5H-pyrrolo[2,3-b]pyrazin-2-yl}formamido) methyl]-6-[(3R)-3-{bis[(2S,3R,4R,5R)-2,3,4,5,6-pentahydroxyhexyl]amino}pyrrolidine-1-carbonyl]-1,3-diethyl-1H-1,3-benzodiazol-3-ium;
2-[({3-amino-5H-pyrrolo[2,3-b]pyrazin-2-yl}formamido) methyl]-6-[(3S)-3-{bis[(2S,3R,4R,5R)-2,3,4,5,6-pentahydroxyhexyl]amino}pyrrolidine-1-carbonyl]-1,3-diethyl-1H-1,3-benzodiazol-3-ium;
2-[({3-amino-5H-pyrrolo[2,3-b]pyrazin-2-yl}formamido) methyl]-1,3-diethyl-6-{[(1r,4r)-4-{bis[(2S,3R,4R,5R)-2,3,4,5,6-pentahydroxyhexyl]amino}cyclohexyl]carbamoyl}-1H-1,3-benzodiazol-3-ium;
2-[({3-amino-5H-pyrrolo[2,3-b]pyrazin-2-yl}formamido) methyl]-1,3-diethyl-6-{[(1s,4s)-4-{bis[(2S,3R,4R,5R)-2,3,4,5,6-pentahydroxyhexyl]amino}cyclohexyl]carbamoyl}-1H-1,3-benzodiazol-3-ium;
and a suitable anion, for example halide, sulfate, nitrate, phosphate, formate, acetate, trifluoroacetate, fumarate, citrate, tartrate, oxalate, succinate, mandelate, methane sulfonate or p-toluene sulfonate.

The invention is illustrated by the following non-limiting Examples and the drawing in which:

DESCRIPTION OF THE DRAWINGS

FIG. 1 is an example trace from a whole-cell patch clamp (Qpatch) TMEM16A potentiator assay as used in Biological Example 14 and illustrates the methodology used in the assay.

The invention is illustrated by the following Examples.

EXAMPLES

General Conditions:

Mass spectra were run on LC-MS systems using electrospray ionization. These were run using either a Waters Acquity uPLC system with Waters PDA and ELS detectors or Shimadzu LCMS-2010EV systems. [M+H]+ refers to mono-isotopic molecular weights.

NMR spectra were recorded on a Bruker Avance III HD 500 MHz with a 5 mm Broad Band Inverse probe, a Bruker Avance III HD 250 MHz, a 400 MHz Avance III HD Nanobay fitted with a 5 mm Broad Band Observed Smart-Probe using the solvent as internal deuterium lock. Spectra were recorded at room temperature unless otherwise stated and were referenced using the solvent peak.

Referring to the examples that follow, compounds of the preferred embodiments were synthesized using the methods described herein, or other methods, which are known in the art.

The various starting materials, intermediates, and compounds of the preferred embodiments may be isolated and purified, where appropriate, using conventional techniques such as precipitation, filtration, crystallization, evaporation, distillation, and chromatography. Unless otherwise stated, all starting materials are obtained from commercial suppliers and used without further purification. Salts may be prepared from compounds by known salt-forming procedures.

Compounds were purified by flash column chromatography on normal phase silica on Biotage® Isolera systems using the appropriate SNAP cartridge and gradient. Alternatively, compounds were purified on reverse phase silica using Biotage® Isolera systems with the appropriate SNAP C18 cartridges and reverse phase eluent or by preparative HPLC (if stated otherwise).

Preparative HPLC Using Acidic pH, Early Elution Method

Purifications by were performed on a Gilson LC system using Waters Sunfire C18 columns (30 mm×100 mm, 10 μM; temperature: room temperature) and a gradient of 10-95% B (A=0.1% formic acid in water; B=0.1% formic acid in MeCN) over 14.44 mins then 95% B for 2.11 min, with an injection volume of 1500 μL and a flow rate of 40 mL/min. UV spectra were recorded at 215 nm using a Gilson detector.

Preparative HPLC Using Acidic pH, Standard Elution Method

Purifications by preparative HPLC (acidic pH, standard elution method) were performed on a Gilson LC system using Waters Sunfire C18 columns (30 mm×100 mm, 10 μM; temperature: room temperature) and a gradient of 30-95% B (A=0.1% formic acid in water; B=0.1% formic acid in MeCN) over 11 mins then 95% B for 2.11 min, with an injection volume of 1500 μL and a flow rate of 40 mL/min. UV spectra were recorded at 215 nm using a Gilson detector.

Preparative HPLC Using Basic pH, Early Elution Method

Purifications by preparative HPLC (basic pH, early elution method) were performed on a Gilson LC system using Waters Xbridge C18 columns (30 mm×100 mm, 10 μM; temperature: room temperature) and a gradient of 10-95% (A=0.2% ammonium hydroxide in water; B=0.2% ammonium hydroxide in MeCN) over 14.44 mins then 95% B for 2.11 min, with an injection volume of 1500 μL and a flow rate of 40 mL/min. UV spectra were recorded at 215 nm using a Gilson detector.

Preparative HPLC Using Basic pH, Standard Elution Method

Purifications by preparative HPLC (basic pH, standard elution method) were performed on a Gilson LC system using Waters Xbridge C18 columns (30 mm×100 mm, 10 μM; temperature: room temperature) and a gradient of 30-95% (A=0.2% ammonium hydroxide in water; B=0.2% ammonium hydroxide in MeCN) over 11 mins then 95% B for 2.11 min, with an injection volume of 1500 μL and a flow rate of 40 mL/min. UV spectra were recorded at 215 nm using a Gilson detector.

If not indicated otherwise, the analytical HPLC conditions are as follows:

Method A

| Column: | Phenomenex Kinetix-XB C18 2.1 × 100 mm, 1.7 μm |
|---|---|
| Column Temp | 40° C. |
| Eluents: | A: $H_2O$ 0.1% formic acid, B: MeCN, 0.1% formic acid |
| Flow Rate: | 0.6 mL/min |
| Gradient: | 0-5.3 mins 5-100% B, 5.3-5.8 mins 100% B, 5.8-5.82 mins 100-5% B, 5.82-7.00 mins 5% B |

Method B

| Column: | Waters UPLC® CSH™ C18 2.1 × 100 mm 1.7 μm |
|---|---|
| Column Temp | 40° C. |
| Eluents: | A: 2 mM ammonium bicarbonate, buffered to pH 10, B: MeCN |
| Flow Rate: | 0.6 mL/min |
| Gradient: | 0-5.3 mins 5-100% B, 5.3-5.8 mins 100% B, 5.8-5.82 mins 100-5% B, 5.82-7.00 mins 5% B |

Method C

| Column: | Waters UPLC® BEH™ C18 2.1 × 100 mm 1.7 μm |
|---|---|
| Column Temp | 40° C. |
| Eluents: | A: 2 mM ammonium bicarbonate, buffered to pH 10, B: MeCN |
| Flow Rate: | 0.6 mL/min |
| Gradient: | 0-5.3 mins 5-100% B, 5.3-5.8 mins 100% B, 5.8-5.82 mins 100-5% B, 5.82-7.00 mins 5% B |

Method D

| Column: | Waters Atlantis dC18 2.1 × 100 mm 3 μm |
|---|---|
| Column Temp | 40° C. |
| Eluents: | A: $H_2O$ + 0.1% formic acid, B: MeCN + 0.1% formic acid |
| Flow Rate: | 0.6 mL/min |
| Gradient: | 0-5 mins 5-100% B, 5-5.4 mins 100% B, 5.4-5.42 mins 100-5% B, 5.42-7.00 mins 5% B |

Method E

| Column: | Kinetex Core-Shell C18 2.1 × 50 mm 5 μm |
|---|---|
| Column Temp | 40° C. |
| Eluents: | A: $H_2O$ + 0.1% formic acid, B: MeCN + 0.1% formic acid |
| Flow Rate: | 1.2 mL/min |
| Gradient: | 0-1.20 mins 5-100% B, 1.20-1.30 mins 100% B, 1.30-1.31 mins 100-5% B |

Method F

| Column: | Phenomenex Gemini-NX C18 2 × 50 mm 3 μm |
|---|---|
| Column Temp | 40° C. |
| Eluents: | A: 2 mM ammonium bicarbonate, buffered to pH 10, B: MeCN |
| Flow Rate: | 1 mL/min |
| Gradient: | 0-1.80 mins 1-100% B, 1.80-2.10 mins 100% B, 2.10-2.30 mins 100-1% B |

The following example are intended to illustrate the invention and are not to be construed as being limitations thereon. Temperatures are given in degrees centigrade. If not mentioned otherwise, all evaporations are performed in vacuo, preferably between about 15 mm Hg and 100 mm Hg (=20-133 mbar). The structure of final products, intermediates and starting materials is confirmed by standard analytical methods, e.g., microanalysis and spectroscopic characteristics, e.g., MS, IR, and NMR. Abbreviations used are those conventional in the art. If not defined, the terms have their generally accepted meanings.

Abbreviation aq. aqueous
br broad
d doublet
dd doublet of doublets
DCM dichloromethane
DIPEA diisopropylethylamine
DMF N,N-dimethylformamide
EDCl 1-ethyl-3-(3-dimethylaminopropyl)carbodiimide
EtOAc ethyl acetate
HOAt 1-hydroxy-7-azabenzotriazole
HATU 2-(7-aza-1H-benzotriazole-1-yl)-1,1,3,3-tetramethyluronium hexafluorophosphate
HPLC high pressure liquid chromatography
MeCN acetonitrile
MeOH methanol
MS mass spectrometry
m multiplet
min minute(s)
mL milliliter(s)
m/z mass to charge ratio
NCS N-chlorosuccinimide
NMR nuclear magnetic resonance
PTFE polytetrafluoroethylene
Rt retention time
s singlet
sPhos 2-dicyclohexylphosphino-2',6'-dimethoxybiphenyl
t triplet
TBME methyl tert-butyl ether
TBTU N,N,N',N'-tetramethyl-O-(benzotriazol-1-yl)uronium tetrafluoroborate
TEA triethylamine
TFA trifluoroacetic acid
THF tetrahydrofuran
T3P® propylphosphonic anhydride Example 1

N-(1,1-Dimethylprop-2-ynyl)-4-[[2-(1H-indol-6-yl)acetyl]amino]pyridine-2-carboxamide

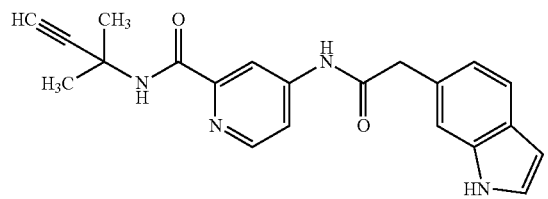 [SMILES: C#CC(C)(C)NC(=O)c1cc(NC(=O)Cc2ccc3cc[nH]c3c2)ccn1]

To a stirred solution of 2-(1H-indol-6-yl)acetic acid (70 mg, 0.40 mmol), 4-amino-N-(1,1-dimethylprop-2-ynyl)pyridine-2-carboxamide (Intermediate A) (70 mg, 0.36 mmol) and TEA (95 µL, 0.54 mmol) in 1,4-dioxane (2 mL) was added a 50% solution of T3P® in EtOAc (0.32 mL, 0.54 mmol) and the mixture was stirred at room temperature for 2 h. The resulting mixture was diluted with EtOAc (5 mL) and washed sequentially with 1M HCl (5 mL), sat. NaHCO₃ solution (5 mL) and brine (5 mL). The organics were separated, dried over Na₂SO₄ and concentrated in vacuo. The crude residue was purified by chromatography on silica (10 g, KP-Sil) eluting with 0-100% EtOAc in heptane to afford the title compound as a pale pink powder.

LC-MS (Method A): Rt 3.01 mins; MS m/z 361.2=[M+H]+

¹H NMR (500 MHz, DMSO-d₆) δ 11.03 (s, 1H), 10.76 (s, 1H), 8.46 (d, J=5.5 Hz, 1H), 8.31 (s, 1H), 8.22 (d, J=2.0 Hz, 1H), 7.85 (dd, J=5.5, 2.2 Hz, 1H), 7.48 (d, J=8.1 Hz, 1H), 7.37 (s, 1H), 7.30 (t, J=2.7 Hz, 1H), 6.98 (dd, J=8.1, 1.3 Hz, 1H), 6.40-6.37 (m, 1H), 3.76 (s, 2H), 3.21 (s, 1H), 1.65 (s, 6H).

Example 1.1

4-[[2-(1H-indol-6-yl)acetyl]amino]-N-[1-(trifluoromethyl)cyclopropyl]pyridine-2-carboxamide

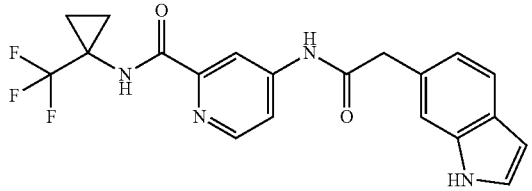 [SMILES: O=C(Cc1ccc2cc[nH]c2c1)Nc1ccnc(C(=O)NC2(C(F)(F)F)CC2)c1]

The title compound was prepared from 4-amino-N-[1-(trifluoromethyl)cyclopropyl]pyridine-2-carboxamide (Intermediate AD) and 2-(1H-indol-6-yl)acetic acid analogously to Example 1.

LC-MS (Method A): Rt 3.08 mins; MS m/z 403.2=[M+H]+

1H NMR (500 MHz, DMSO-d₆) δ 11.04 (s, 1H), 10.76 (s, 1H), 9.38 (s, 1H), 8.48 (d, J=5.5 Hz, 1H), 8.22 (d, J=2.0 Hz, 1H), 7.86 (dd, J=5.5, 2.2 Hz, 1H), 7.47 (d, J=8.1 Hz, 1H), 7.37 (s, 1H), 7.30 (t, 1H), 6.97 (dd, J=8.1, 1.4 Hz, 1H), 6.39-6.36 (m, 1H), 3.75 (s, 2H), 1.31-1.27 (m, 2H), 1.20-1.16 (m, 2H).

Example 2

N-tert-Butyl-4-[[2-(1H-indazol-6-yl)acetyl]amino]pyridine-2-carboxamide

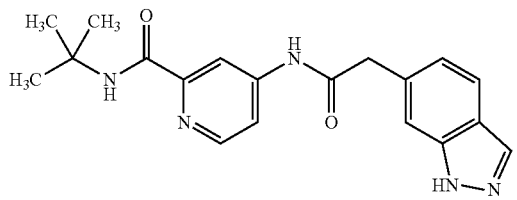 [SMILES: CC(C)(C)NC(=O)c1cc(NC(=O)Cc2ccc3cn[nH]c3c2)ccn1]

A mixture of 2-(1-tetrahydropyran-2-ylindazol-6-yl)acetic acid (Intermediate B) (154 mg, 0.59 mmol) and 4-amino-N-tert-butyl-pyridine-2-carboxamide (Intermediate AB) (95 mg, 0.49 mmol) in 1,4-dioxane (4.9 mL) was treated with TEA (0.17 mL, 0.98 mmol) and a 50% solution of T3P® in EtOAc (1.17 mL, 0.98 mmol) and stirred at room temperature for 2 h. The resulting mixture was concentrated in vacuo and the residue dissolved into EtOAc (10 mL). The organics were washed with saturated aqueous sodium bicarbonate (2×10 mL) and the combined aqueous washes were re-extracted with EtOAc (2×10 mL). The combined organics were dried over Na$_2$SO$_4$ and concentrated in vacuo. The resulting residue was dissolved in DCM (4.9 mL) and cooled (0° C.) then treated with TFA (0.94 mL, 12.29 mmol). The mixture was allowed to warm to room temperature and stirred for 3 h. The resulting mixture was concentrated in vacuo and the crude residue dissolved in EtOAc (10 mL). The solution was washed with saturated aqueous sodium bicarbonate (10 mL), dried over Na$_2$SO$_4$ and concentrated in vacuo. Purification by preparative HPLC (acidic pH, early elution method) afforded the title compound as a pale yellow solid.

LC-MS (Method A): Rt 2.71 mins; MS m/z 352.2=[M+H]+

$^1$H NMR (500 MHz, DMSO-d$_6$) δ 12.99 (s, 1H), 10.79 (s, 1H), 8.44 (d, J=5.5 Hz, 1H), 8.19 (d, J=2.0 Hz, 1H), 8.03-8.01 (m, 2H), 7.82 (dd, J=5.5, 2.2 Hz, 1H), 7.70 (d, J=8.3 Hz, 1H), 7.49 (s, 1H), 7.08 (dd, J=8.3, 1.2 Hz, 1H), 3.84 (s, 2H), 1.39 (s, 9H).

Example 2.1

N-(1-Cyano-1-methyl-ethyl)-4-[[2-(1H-indazol-6-yl)acetyl]amino]pyridine-2-carboxamide

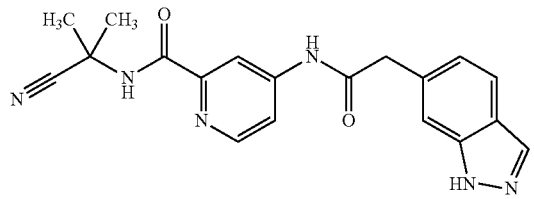 [SMILES: CC(C)(C#N)NC(=O)c1cc(NC(=O)Cc2ccc3cn[nH]c3c2)ccn1]

The title compound was prepared from 4-amino-N-(1-cyano-1-methyl-ethyl)pyridine-2-carboxamide (Intermediate AC) and 2-(1-tetrahydropyran-2-ylindazol-6-yl)acetic acid (Intermediate B) analogously to Example 2.

LC-MS (Method A): Rt 2.32 mins; MS m/z 363.2=[M+H]+

$^1$H NMR (500 MHz, DMSO-d$_6$) δ 12.99 (s, 1H), 10.84 (s, 1H), 8.83 (s, 1H), 8.51 (d, J=5.5 Hz, 1H), 8.24 (d, J=2.1 Hz, 1H), 8.02 (s, 1H), 7.87 (dd, J=5.5, 2.2 Hz, 1H), 7.70 (d, J=8.3 Hz, 1H), 7.50 (s, 1H), 7.09 (dd, J=8.3, 1.2 Hz, 1H), 3.85 (s, 2H), 1.72 (s, 6H).

Example 3

N-(1,1-Dimethylprop-2-ynyl)-4-[[2-(1H-indazol-6-yl)acetyl]amino]pyridine-2-carboxamide

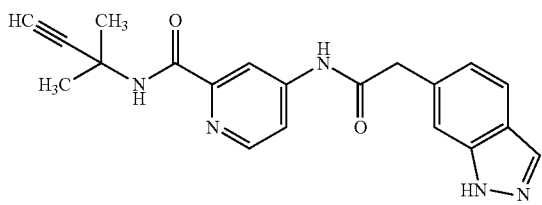 [SMILES: C#CC(C)(C)NC(=O)c1cc(NC(=O)Cc2ccc3cn[nH]c3c2)ccn1]

Step 1: N-(1,1-Dimethylprop-2-ynyl)-4-[[2-(1-tetrahydropyran-2-ylindazol-6-yl)acetyl]amino]pyridine-2-carboxamide

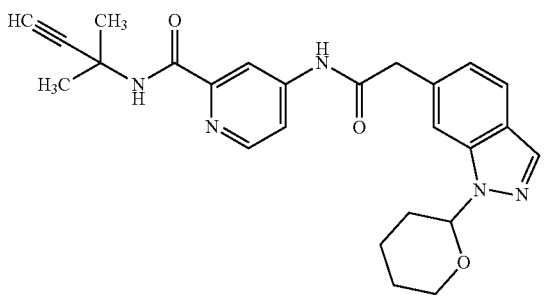 [SMILES: C#CC(C)(C)NC(=O)c1cc(NC(=O)Cc2ccc3cnn(C4CCCCO4)c3c2)ccn1]

The title compound was prepared from 4-amino-N-(1,1-dimethylprop-2-ynyl)pyridine-2-carboxamide (Intermediate A) and 2-(1-tetrahydropyran-2-ylindazol-6-yl)acetic acid (Intermediate B) analogously to Example 1.

LC-MS (Method E): Rt 1.15 mins; MS m/z 446.1=[M+H]+

$^1$H NMR (500 MHz, DMSO-d$_6$) δ 10.84 (s, 1H), 8.47 (d, J=5.5 Hz, 1H), 8.31 (s, 1H), 8.21 (d, J=1.5 Hz, 1H), 8.07 (s, 1H), 7.84 (dd, J=5.5, 1.7 Hz, 1H), 7.72 (d, J=8.3 Hz, 1H), 7.66 (s, 1H), 7.16 (d, J=8.3 Hz, 1H), 5.81 (d, J=9.6 Hz, 1H), 3.92-3.86 (m, 3H), 3.78-3.68 (m, 1H), 3.20 (s, 1H), 2.46-2.37 (m, 1H), 2.09-1.93 (m, 2H), 1.82-1.69 (m, 1H), 1.64 (s, 6H), 1.60-1.55 (m, 2H).

Step 2: N-(1,1-Dimethylprop-2-ynyl)-4-[[2-(1H-indazol-6-yl)acetyl]amino]pyridine-2-carboxamide A cooled (0° C.) solution of N-(1,1-dimethylprop-2-ynyl)-4-[[2-(1-tetrahydropyran-2-ylindazol-6-yl)acetyl]amino]pyridine-2-carboxamide (step 1) (83%, 950 mg, 1.77 mmol) in DCM (12 mL) was treated with TFA (1.74 mL, 22.79 mmol). The mixture was allowed to warm to room temperature and stirred for 3 h. Additional TFA (0.87 mL, 11.40 mmol) was added and the reaction allowed to continue for 3 h. The resulting mixture was concentrated in vacuo. The crude residue was dissolved in EtOAc (30 mL) and washed with sat. NaHCO$_3$ solution (20 ml), brine (20 mL), dried over Na$_2$SO$_4$ and concentrated in vacuo. Purification by C18 reverse phase chromatography eluting with 10-100% MeCN (0.1% formic acid) and water (0.1% formic acid) afforded the title compound as an off-white solid.

LC-MS (Method A): Rt 2.52 mins; MS m/z 362.2=[M+H]+

$^1$H NMR (400 MHz, DMSO-d$_6$) δ 12.99 (s, 1H), 10.82 (s, 1H), 8.47 (d, J=5.5 Hz, 1H), 8.31 (s, 1H), 8.21 (d, J=2.0 Hz, 1H), 8.02 (s, 1H), 7.84 (dd, J=5.5, 2.2 Hz, 1H), 7.70 (d, J=8.3 Hz, 1H), 7.49 (s, 1H), 7.09 (dd, J=8.3, 1.2 Hz, 1H), 3.84 (s, 2H), 3.21 (s, 1H), 1.64 (s, 6H).

Example 4

N-(1-Ethynylcyclopentyl)-4-[[2-(1H-indazol-6-yl)acetyl]amino]pyridine-2-carboxamide

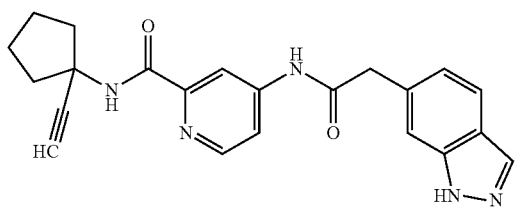 [SMILES: C#CC1(NC(=O)c2cc(NC(=O)Cc3ccc4cn[nH]c4c3)ccn2)CCCC1]

Step 1: A mixture of methyl 4-[[2-(1-tetrahydropyran-2-ylindazol-6-yl)acetyl]amino]pyridine-2-carboxylate and methyl 4-[[2-(2-tetrahydropyran-2-ylindazol-6-yl)acetyl]amino]pyridine-2-carboxylate

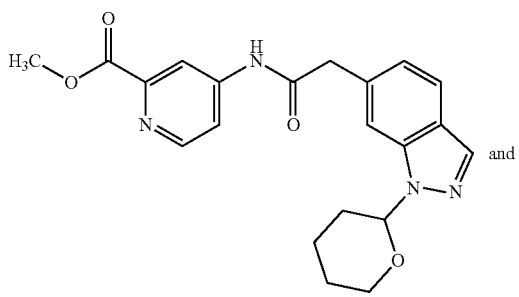

and

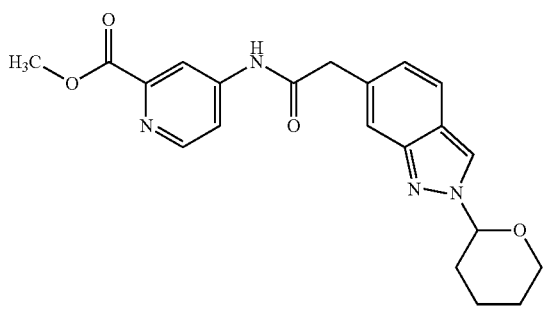

The title compound was prepared from methyl 4-aminopyridine-2-carboxylate and 2-(1-tetrahydropyran-2-ylindazol-6-yl)acetic acid (Intermediate B1) analogously to Example 1.

LC-MS (Method E): Rt 0.97, 0.99 mins; MS m/z 395.2=[M+H]+: 2 peaks for regioisomers Step 2: A mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino]pyridine-2-carboxylic acid

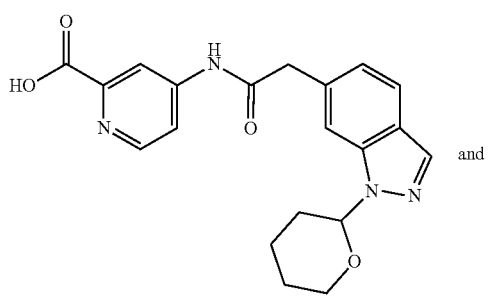

and

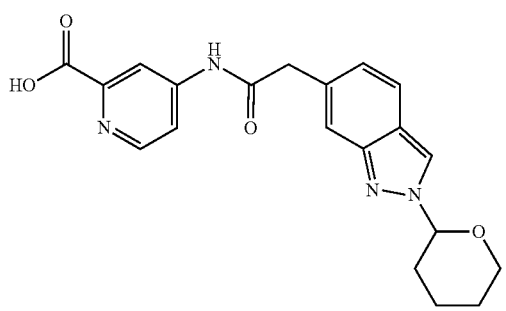

To a solution of a mixture of methyl 4-[[2-(1-tetrahydropyran-2-ylindazol-6-yl)acetyl]amino]pyridine-2-carboxylate and methyl 4-[[2-(2-tetrahydropyran-2-ylindazol-6-yl)acetyl]amino]pyridine-2-carboxylate (step 1) (80%, 1.76 g, 3.57 mmol) in THF (6 mL), MeOH (6 mL) and water (6 mL) was added LiOH·H$_2$O (180 mg, 4.28 mmol) and the mixture stirred at room temperature for 2 h. Additional LiOH·H$_2$O (45 mg, 1.07 mmol) was added and the mixture stirred at room temperature for a further hour. The resulting mixture was acidified to pH 5 using 1M HCl then diluted with brine (15 mL) and EtOAc (15 mL) whereupon a precipitate formed which was collected by vacuum filtration. The phases of the filtrate were separated and the aqueous was extracted with EtOAc (15 mL) then the combined organics were concentrated in vacuo. The resulting residue was triturated in ether (10 mL) and filtered and the solids combined with those from the previous filtration. The aqueous phase was cooled to 2-8° C. and allowed to sit for 3 days. The resulting suspension was filtered and the solids combined with those from the previous filtrations. The combined solids were dried in a vacuum oven to afford the title compound as a colourless solid.

LC-MS (Method E): Rt 0.86 mins; MS m/z 381.1=[M+H]+

Step 3: N-(1-Ethynylcyclopentyl)-4-[[2-(1H-indazol-6-yl)acetyl]amino]pyridine-2-carboxamide To a solution of a mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino] pyridine-2-carboxylic acid (step 2) (99%, 150 mg, 0.39 mmol) and 1-ethynylcyclopentanamine hydrochloride (68 mg, 0.47 mmol) in DMF (2 mL) was added DIPEA (136 µL, 0.78 mmol) followed by HATU (163 mg, 0.43 mmol) and the mixture stirred at room temperature for 3 h. The resulting mixture was diluted with EtOAc (10 mL) and washed with sat. NaHCO₃ solution (10 mL) and brine (10 mL)_then dried over Na₂SO₄ and concentrated in vacuo. The crude material was dissolved in DCM (2 mL), treated with TFA (1.0 mL, 13.07 mmol) and stirred at room temperature for 2 h. The reaction mixture was concentrated in vacuo and the residue was dissolved in EtOAc. The organic mixture was washed with sat. NaHCO₃ solution, dried over Na₂SO₄ and concentrated in vacuo. Purification of the crude residue by preparative HPLC (acidic pH, early elution method) afforded the title compound as a colourless powder.

LC-MS (Method A): Rt 2.83 mins; MS m/z 388.2=[M+H]+

¹H NMR (400 MHz, DMSO-d₆) δ 13.00 (s, 1H), 10.82 (s, 1H), 8.52-8.44 (m, 2H), 8.21 (d, J=2.0 Hz, 1H), 8.03 (s, 1H), 7.85 (dd, J=5.5, 2.2 Hz, 1H), 7.71 (d, J=8.3 Hz, 1H), 7.50 (s, 1H), 7.09 (dd, J=8.3, 1.2 Hz, 1H), 3.85 (s, 2H), 3.17 (s, 1H), 2.30-2.21 (m, 2H), 2.13-2.06 (m, 2H), 1.77-1.65 (m, 4H).

The compounds of the following tabulated Examples (Table 1) were prepared analogously to Example 4 step 3 from a mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino]pyridine-2-carboxylic acid (Example 4 step 2) and the appropriate commercially available amine.

Example 5

N-(2,2-Difluoro-1,1-dimethyl-ethyl)-4-[[2-(1H-indazol-6-yl)acetyl]amino] pyridine-2-carboxamide

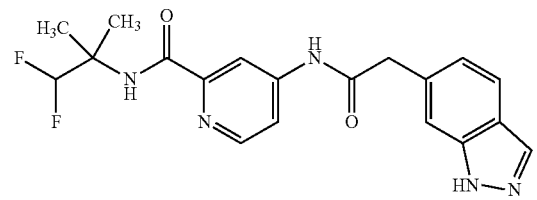 [SMILES: CC(C)(NC(=O)c1cc(NC(=O)Cc2ccc3cn[nH]c3c2)ccn1)C(F)F]

A suspension of a mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino]pyridine-2-carboxylic acid (Example 4 step 2) (60 mg, 0.16 mmol), 1,1-difluoro-2-methyl-propan-2-amine hydrochloride (28 mg, 0.19 mmol) and DIPEA (69 µL, 0.39 mmol) in 1,4-dioxane (1.2 mL) was treated with a 50% solution of T3P® in EtOAc (235 µL, 0.39 mmol) and stirred at room temperature for 2 h. The resulting mixture was partitioned between DCM (5 mL) and water (5 mL) and the organic portion was separated by filtration through a hydrophobic PTFE fritted tube. The filtrate was concentrated in vacuo and the residue was dissolved in TFA (50% in DCM) (2.0 mL, 0.16 mmol). The resulting mixture was agitated for 4 h and then diluted with DCM (10 mL). Saturated aq. NaHCO₃ (10

TABLE 1

| Ex. | Structure and Name | LCMS Retention Time, [M + H]+, 1H NMR |
|---|---|---|
| 4.1 | 4-[[2-(1H-Indazol-6-yl)acetyl]amino]-N-(2,2,2-trifluoro-1,1-dimethyl-ethyl)pyridine-2-carboxamide | LC-MS (Method A): Rt 2.99 mins; MS m/z 406.2 = [M + H]+ ¹H NMR (500 MHz, DMSO-d₆) δ 12.99 (s, 1H), 10.85 (s, 1H), 8.49 (d, J = 5.5 Hz, 1H), 8.33 (s, 1H), 8.24 (d, J = 2.1 Hz, 1H), 8.02 (s, 1H), 7.85 (dd, J = 5.6, 2.2 Hz, 1H), 7.70 (d, J = 8.3 Hz, 1H), 7.49 (s, 1H), 7.08 (dd, J = 8.3, 1.1 Hz, 1H), 3.85 (s, 2H), 1.65 (s, 6H). |
| 4.2 | 4-[[2-(1H-Indazol-6-yl)acetyl]amino]-N-[1-(trifluoromethyl)cyclopropyl]pyridine-2-carboxamide | LC-MS (Method A): Rt 2.63 mins; MS m/z 404.1 = [M + H]+ ¹H NMR (400 MHz, DMSO-d₆) δ 13.00 (s, 1H), 10.82 (s, 1H), 9.38 (s, 1H), 8.50 (d, J = 5.5 Hz, 1H), 8.22 (d, J = 1.9 Hz, 1H), 8.03 (s, 1H), 7.87 (dd, J = 5.5, 2.2 Hz, 1H), 7.71 (d, J = 8.3 Hz, 1H), 7.50 (s, 1H), 7.09 (dd, J = 8.3, 1.3 Hz, 1H), 3.85 (s, 2H), 1.34-1.26 (m, 2H), 1.22-1.13 (m, 2H) |
| 4.3 | N-(3,3-Difluoro-1-methyl-cyclobutyl)-4-[[2-(1H-indazol-6-yl)acetyl]amino]pyridine-2-carboxamide | LC-MS (Method A): Rt 2.65 mins; MS m/z 400.2 = [M + H]+ ¹H NMR (500 MHz, DMSO-d₆) δ 13.00 (s, 1H), 10.81 (s, 1H), 9.03 (s, 1H), 8.49 (d, J = 5.5 Hz, 1H), 8.20 (d, J = 2.1 Hz, 1H), 8.03 (s, 1H), 7.85 (dd, J = 5.5, 2.2 Hz, 1H), 7.71 (d, J = 8.3 Hz, 1H), 7.50 (s, 1H), 7.09 (dd, J = 8.3, 1.3 Hz, 1H), 3.85 (s, 2H), 3.12-3.02 (m, 2H), 2.72-2.64 (m, 2H), 1.52 (s, 3H). | mL) was slowly added and the free-based mixture separated via filtration through a hydrophobic PTFE fritted tube. The organic portion was concentrated in vacuo and the residue was purified by chromatography on basic silica eluting with 0 to 100% EtOAc in heptane followed 0 to 100% MeOH in EtOAc. The resulting material was further purified by C18 reverse phase chromatography eluting with 10-100% MeCN in water with 0.1% formic acid modifier. The product containing fractions were combined and concentrated in vacuo to remove the volatile solvents then treated with saturated aq. NaHCO$_3$ (10 mL) and DCM (10 mL). The organic portion was separated by filtration through a hydrophobic PTFE fritted tube and concentrated in vacuo to afford the title compound as a white crystalline solid.

LC-MS (Method A): Rt 2.83 mins; MS m/z 388.2=[M+H]+
$^1$H NMR (500 MHz, DMSO-d$_6$) δ 13.00 (s, 1H), 10.83 (s, 1H), 8.48 (d, J=5.5 Hz, 1H), 8.29 (s, 1H), 8.23 (d, J=2.0 Hz, 1H), 8.03 (s, 1H), 7.83 (dd, J=5.5, 2.2 Hz, 1H), 7.70 (d, J=8.3 Hz, 1H), 7.49 (s, 1H), 7.08 (dd, J=8.3, 1.2 Hz, 1H), 6.46 (t, J=57.0 Hz, 1H), 3.84 (s, 2H), 1.44 (s, 6H).

The compounds of the following tabulated Examples (Table 2) were prepared analogously to Example 5 from a mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino]pyridine-2-carboxylic acid (Example 4 step 2) and the appropriate commercially available amine.

TABLE 2

| Ex. | Structure and Name | LCMS Retention Time, [M + H]+, 1H NMR |
|---|---|---|
| 5.1 | 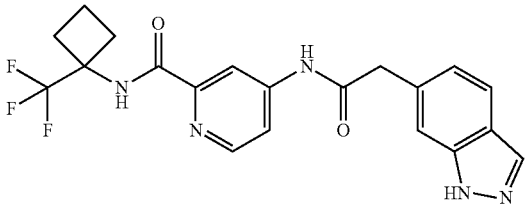 [SMILES: O=C(Cc1ccc2cn[nH]c2c1)Nc1ccnc(C(=O)NC2(C(F)(F)F)CCC2)c1]<br>4-[[2-(1H-Indazol-6-yl)acetyl]amino]-N-[1-(trifluoromethyl)cyclobutyl]pyridine-2-carboxamide | LC-MS (Method A): Rt 2.95 mins; MS m/z 418.2 = [M + H]+<br>$^1$H NMR (500 MHz, DMSO-d$_6$) δ 13.01 (s, 1H), 10.83 (s, 1H), 9.03 (s, 1H), 8.51 (d, J = 5.5 Hz, 1H), 8.21 (d, J = 2.1 Hz, 1H), 8.03 (s, 1H), 7.86 (dd, J = 5.5, 2.2 Hz, 1H), 7.71 (d, J = 8.3 Hz, 1H), 7.50 (s, 1H), 7.09 (dd, J = 8.3, 1.2 Hz, 1H), 3.85 (s, 2H), 2.68-2.59 (m, 2H), 1.99-1.85 (m, 2H), 1.73-1.22 (m, 2H). |
| 5.2 | 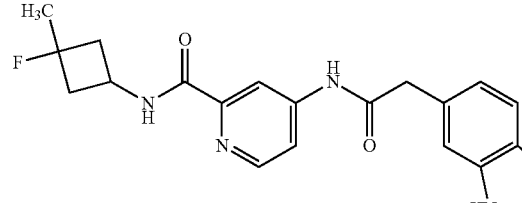<br>N-(3-Fluoro-3-methyl-cyclobutyl)-4-[[2-(1H-indazol-6-yl)acetyl]amino]pyridine-2-carboxamide | LC-MS (Method A): Rt 2.49 mins; MS m/z 382.2 = [M + H]+<br>$^1$H NMR (500 MHz, DMSO-d$_6$) δ 13.01 (s, 1H), 10.80 (s, 1H), 9.05 (d, J = 8.0 Hz, 1H), 8.50 (d, J = 5.5 Hz, 1H), 8.20-8.16 (m, 1H), 8.03 (s, 1H), 7.85 (td, J = 5.8, 2.2 Hz, 1H), 7.71 (d, J = 8.3 Hz, 1H), 7.50 (s, 1H), 7.09 (dd, J = 8.3, 1.2 Hz, 1H), 4.64-4.54 (m, 0.5H), 4.14-3.99 (m, 0.5H), 3.84 (s, 2H), 2.60-2.53 (m, 2H), 2.46-2.39 (m, 2H), 1.46 (d, J = 22.2 Hz, 3H). |
| 5.3 | 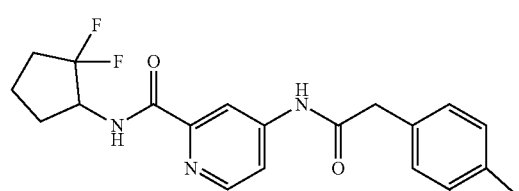<br>N-(2,2-Difluorocyclopentyl)-4-[[2-(1H-indazol-6-yl)acetyl]amino]pyridine-2-carboxamide | LC-MS (Method A): Rt 2.70 mins; MS m/z 400.2 = [M + H]+<br>$^1$H NMR (400 MHz, DMSO-d$_6$) δ 12.99 (s, 1H), 10.82 (s, 1H), 8.60 (d, J = 9.3 Hz, 1H), 8.51 (d, J = 5.5 Hz, 1H), 8.24 (d, J = 2.1 Hz, 1H), 8.02 (s, 1H), 7.85 (dd, J = 5.5, 2.2 Hz, 1H), 7.70 (d, J = 8.3 Hz, 1H), 7.49 (s, 1H), 7.09 (dd, J = 8.3, 1.3 Hz, 1H), 4.64-4.51 (m, 1H), 3.84 (s, 2H), 2.22-2.05 (m, 3H), 1.90-1.68 (m, 3H). |
| 5.4 | 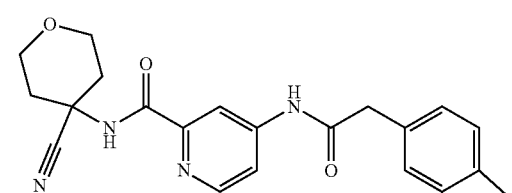<br>N-(4-Cyanotetrahydropyran-4-yl)-4-[[2-(1H-indazol-6-yl)acetyl]amino]pyridine-2-carboxamide | LC-MS (Method A): Rt 2.21 mins; MS m/z 405.2 = [M + H]+<br>$^1$H NMR (500 MHz, DMSOd$_6$) δ 12.99 (s, 1H), 10.85 (s, 1H), 9.00 (s, 1H), 8.53 (d, J = 5.5 Hz, 1H), 8.25 (d, J = 2.0 Hz, 1H), 8.02 (s, 1H), 7.88 (dd, J = 5.5, 2.2 Hz, 1H), 7.70 (d, J = 8.3 Hz, 1H), 7.49 (s, 1H), 7.09 (dd, J = 8.3, 1.2 Hz, 1H), 3.89-3.83 (m, 4H), 3.63-3.54 (m, 2H), 2.37-2.32 (m, 2H), 2.07 (ddd, J = 13.8, 10.4, 3.9 Hz, 2H). |

Example 6

N-tert-Butyl-4-[[2-(5-fluoro-1H-indazol-6-yl)acetyl]amino]pyridine-2-carboxamide

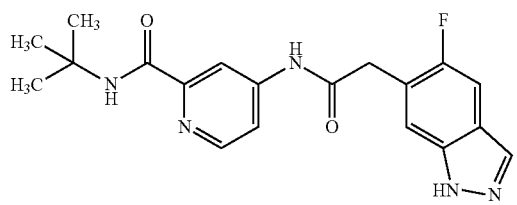 [SMILES: CC(C)(C)NC(=O)c1cc(NC(=O)Cc2cc3[nH]ncc3cc2F)ccn1]

Step 1: A mixture of 6-bromo-5-fluoro-1-[(4-methoxyphenyl)methyl] indazole and 6-bromo-5-fluoro-2-[(4-methoxyphenyl)methyl]indazole

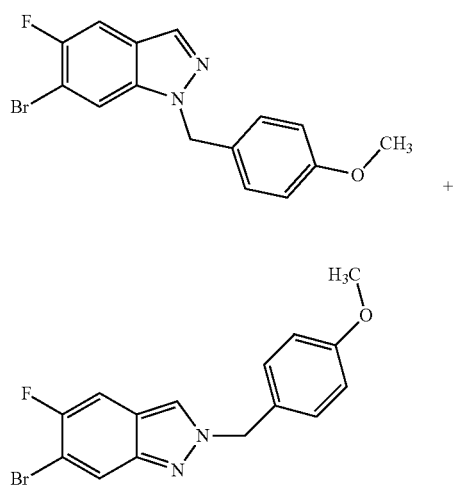

6-Bromo-5-fluoro-1H-indazole (1.0 g, 4.65 mmol), $K_2CO_3$ (964 mg, 6.98 mmol) and potassium iodide (849 mg, 5.12 mmol) in acetone (100 mL) was treated with 1-(chloromethyl)-4-methoxy-benzene (694 μL, 5.12 mmol) and the mixture was heated to 45° C. for 4 h and then stirred at room temperature for 2 days. The resulting mixture was concentrated in vacuo and the residue was dissolved in EtOAc (50 mL). The organic mixture and washed with water (2×50 mL), brine (2×50 mL), dried over $Na_2SO_4$ and concentrated in vacuo. Purification of the crude material by chromatography on silica eluting with a gradient of 0 to 100% EtOAc in heptane afforded the title regiomeric mixture as a yellow solid.

LC-MS (Method E): Rt 1.22, 1.26 mins; MS m/z 335.0, 337.0=[M+H]+

$^1$H NMR (400 MHz, DMSO-$d_6$) δ 8.47 (d, J=0.7 Hz, 0.4H), 8.25 (d, J=5.6 Hz, 0.6H), 8.10 (d, J=0.9 Hz, 0.6H), 8.04 (d, J=6.2 Hz, 0.4H), 7.74 (d, J=8.8 Hz, 0.6H), 7.66 (d, J=9.3 Hz, 0.4H), 7.34-7.29 (m, 0.8H), 7.25-7.19 (m, 1.2H), 6.93-6.89 (m, 0.8H), 6.89-6.84 (m, 1.2H), 5.58 (s, 1.2H), 5.55 (s, 0.8H), 3.72 (s, 1.2H), 3.70 (s, 1.8H). (0.4:0.6 ratio of regioisomers)

Step 2: A mixture of 2-[5-fluoro-1-[(4-methoxyphenyl)methyl]indazol-6-yl]acetic acid and 2-[5-fluoro-2-[(4-methoxyphenyl)methyl]indazol-6-yl]acetic acid

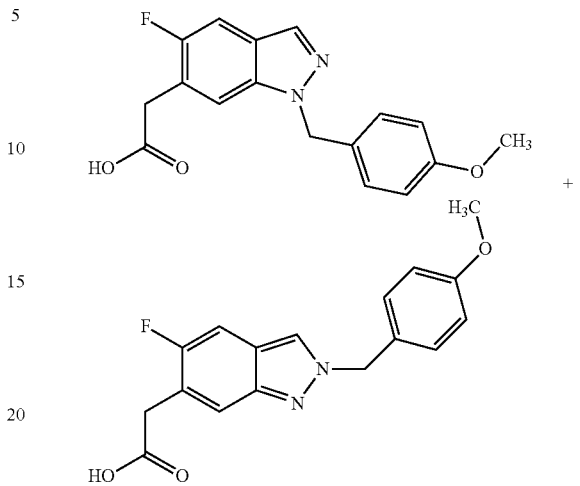

To a solution of a mixture of 6-bromo-5-fluoro-1-[(4-methoxyphenyl)methyl]indazole and 6-bromo-5-fluoro-2-[(4-methoxyphenyl)methyl]indazole (step 1) (1200 mg, 3.58 mmol) and potassium 3-ethoxy-3-oxo-propanoate (914 mg, 5.37 mmol) in mesitylene (30 mLl) was added DMAP (44 mg, 0.36 mmol) and the resulting mixture was sparged with nitrogen for 5 mins and stirred at room temperature. Diallyldipalladium dichloride (26 mg, 0.07 mmol) and BINAP (134 mg, 0.21 mmol) were added and the mixture was sparged with nitrogen for a further 5 minutes. The resulting mixture was stirred at 140° C. for 16 h. After cooling to room temperature, the mixture was diluted with MeOH (50 mL), treated with 2M LiOH (25 mL) and stirred at room temperature for 2 h. The resulting mixture was concentrated in vacuo and the crude material was partitioned between water and EtOAc. The layers were separated and the organic portion extracted with water. The combined aqueous portions were acidified to pH 4 using 2M HCl and then re-extracted with EtOAc (2×50 mL). The organic extracts were dried over $Na_2SO_4$ and concentrated in vacuo to afford the title regiomeric mixture as a yellow solid.

LC-MS (Method E): Rt 1.02, 1.04 mins; MS m/z 315.1=[M+H]+; two regioisomers

Step 3: A mixture of methyl 4-[[2-[5-fluoro-1-[(4-methoxyphenyl)methyl]indazol-6-yl]acetyl]amino]pyridine-2-carboxylate and methyl 4-[[2-[5-fluoro-2-[(4-methoxyphenyl)methyl]indazol-6-yl]acetyl]amino] pyridine-2-carboxylate

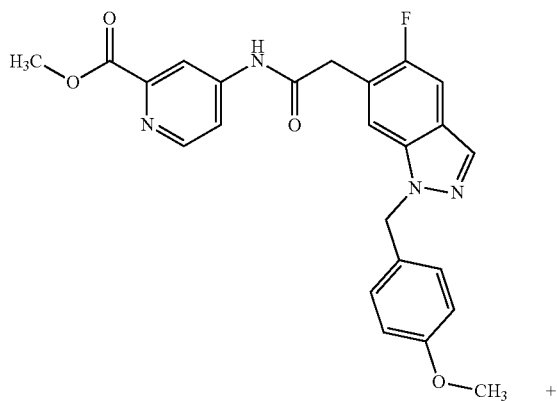

-continued

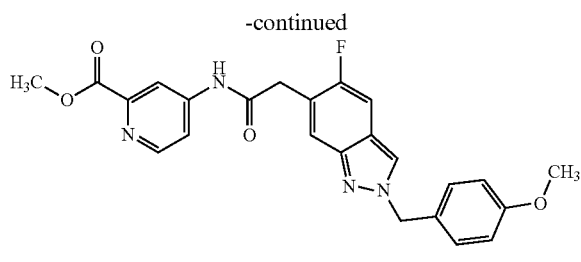

To a solution of a mixture of 2-[5-fluoro-1-[(4-methoxyphenyl) methyl]indazol-6-yl]acetic acid and 2-[5-fluoro-2-[(4-methoxyphenyl)methyl]indazol-6-yl]acetic acid (step 2) (975 mg, 3.1 mmol) in 1,4-dioxane (25 mL) was added methyl 4-aminopyridine-2-carboxylate (472 mg, 3.1 mmol), DIPEA (1.08 mL, 6.2 mmol) followed by a 50% solution of T3P® in EtOAc (1.02 mL, 3.41 mmol) and the reaction mixture was stirred at room temperature under an inert atmosphere for 16 h. The resulting mixture was diluted with EtOAc (100 mL) and washed with water (2×50 mL). The organic extracts were combined, dried over $Na_2SO_4$ and concentrated in vacuo. The crude material was purified by chromatography on silica eluting with a gradient of 0 to 100% EtOAc in heptane to afford the title regiomeric mixture as an off-white solid.

LC-MS (Method E): Rt 1.04, 1.06 mins; MS m/z 449.1=[M+H]+

$^1$H NMR (500 MHz, DMSO-$d_6$) δ 10.85 (s, 0.75H), 10.80 (s, 0.25H), 8.57-8.54 (m, 1H), 8.38 (s, 0.25H), 8.30 (d, J=2.0 Hz, 1H), 8.06-8.05 (m, 0.75H), 7.78 (dd, J=5.5, 2.1 Hz, 1H), 7.74 (d, J=5.9 Hz, 0.75H), 7.62 (d, J=6.6 Hz, 0.25H), 7.54 (d, J=9.9 Hz, 0.75H), 7.42 (d, J=10.5 Hz, 0.25H), 7.31-7.27 (m, 0.5H), 7.21-7.17 (m, 1.5H), 6.92-6.88 (m, 0.5H), 6.86-6.81 (m, 1.5H), 5.55 (s, 1.5H), 5.54 (s, 0.5H), 3.91 (s, 2H), 3.86 (s, 2.25H), 3.86 (s, 0.75H), 3.72 (s, 0.75H), 3.68 (s, 2.25H). 0.75:0.25 ratio of regisomers.

Step 4: A mixture of 4-[[2-[5-fluoro-1-[(4-methoxyphenyl) methyl]indazol-6-yl]acetyl]amino]pyridine-2-carboxylic acid and 4-[[2-[5-fluoro-2-[(4-methoxyphenyl)methyl]indazol-6-yl]acetyl]amino]pyridine-2-carboxylic acid

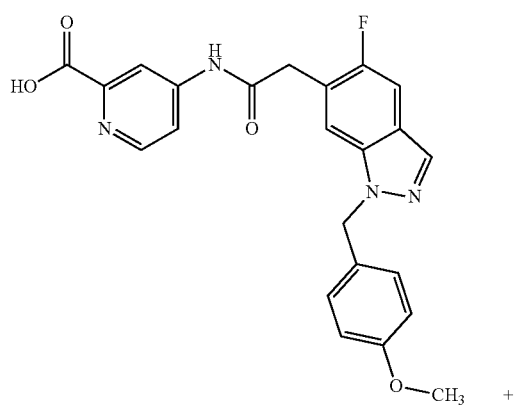

-continued

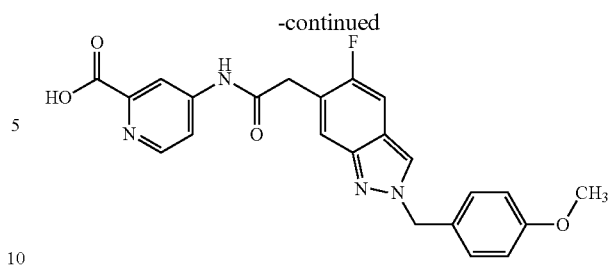

To a solution of a mixture of methyl 4-[[2-[5-fluoro-1-[(4-methoxyphenyl)methyl]indazol-6-yl]acetyl]amino]pyridine-2-carboxylate and methyl 4-[[2-[5-fluoro-2-[(4-methoxyphenyl)methyl]indazol-6-yl]acetyl]amino] pyridine-2-carboxylate (step 3) (830 mg, 1.85 mmol) in THF (20 mL) was added 1M LiOH (4.63 mL, 4.63 mmol) and the reaction mixture was stirred at room temperature for 3 h. The resulting mixture was concentrated in vacuo and the residue re-dissolved in water (20 mL). The aqueous portion was acidified to pH 4 using 6M HCl. The resulting white precipitate was filtered, washed with water (20 mL) and dried under vacuum at 40° C. to afford the title regiomeric mixture as a white solid.

LC-MS (Method E): Rt 0.95 mins; MS m/z 435.1=[M+H]+

$^1$H NMR (500 MHz, DMSO-$d_6$) δ 10.84 (s, 0.7H), 10.79 (s, 0.3H), 8.54-8.49 (m, 1H), 8.38-8.36 (m, 0.3H), 8.25-8.23 (m, 1H), 8.04 (d, J=0.8 Hz, 0.7H), 7.80-7.77 (m, 1H), 7.74 (d, J=5.9 Hz, 0.7H), 7.61 (d, J=6.5 Hz, 0.3H), 7.53 (d, J=9.9 Hz, 0.7H), 7.41 (d, J=10.5 Hz, 0.3H), 7.30-7.26 (m, 0.6H), 7.21-7.14 (m, 1.4H), 6.91-6.88 (m, 0.6H), 6.85-6.81 (m, 1.4H), 5.54 (s, 1.4H), 5.54 (s, 0.6H), 3.90 (s, 1.4H), 3.86 (s, 0.6H), 3.71 (s, 0.9H), 3.67 (s, 2.1H). 0.3:0.7 ratio of regioisomers.

Step 5: N-tert-Butyl-4-[[2-(5-fluoro-1H-indazol-6-yl)acetyl]amino]pyridine-2-carboxamide To a solution of a mixture of 4-[[2-[5-fluoro-1-[(4-methoxyphenyl) methyl]indazol-6-yl]acetyl]amino]pyridine-2-carboxylic acid and 4-[[2-[5-fluoro-2-[(4-methoxyphenyl)methyl]indazol-6-yl]acetyl]amino]pyridine-2-carboxylic acid (step 4) (200 mg, 0.46 mmol) in DMF (5 mL) was added HATU (193 mg, 0.51 mmol) followed by DIPEA (161 μL, 0.92 mmol). After stirring for 5 mins, 2-methylpropan-2-amine (37 mg, 0.51 mmol) was added and the mixture was stirred at room temperature under an inert atmosphere for 2 h. The resulting mixture was diluted with EtOAc (20 mL) and washed with water (2×20 mL), brine (20 mL), dried over $Na_2SO_4$ and concentrated in vacuo. The crude material was dissolved in DCE (5 mL), TFA (1.76 mL, 23.02 mmol) was added and the mixture was stirred at 75° C. for 16 h. The resulting mixture was concentrated in vacuo, azeotroping with toluene (2 mL). Purification of the crude material by C18 reverse phase chromatography eluting with 10-100% MeCN in water with 0.1% formic acid modifier afforded the title compound as a light yellow solid.

LC-MS (Method A): Rt 2.76 mins; MS m/z 370.2=[M+H]+

$^1$H NMR (500 MHz, DMSO-$d_6$) δ 13.12 (br. s, 1H), 10.84 (s, 1H), 8.46 (d, J=5.5 Hz, 1H), 8.19 (d, J=2.0 Hz, 1H), 8.06-8.02 (m, 2H), 7.82 (dd, J=5.6, 2.2 Hz, 1H), 7.57 (d, J=6.1 Hz, 1H), 7.52 (d, J=10.1 Hz, 1H), 3.93 (s, 2H), 1.40 (s, 9H).

Example 6.1

4-[[2-(5-Fluoro-1H-indazol-6-yl)acetyl]amino]-N-[1-(trifluoromethyl)cyclo propyl]pyridine-2-carboxamide

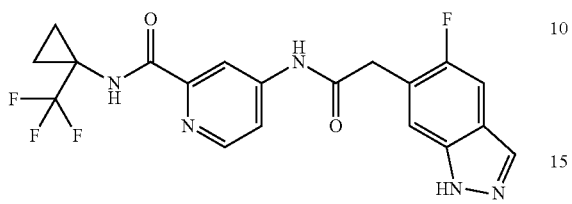

The title compound was prepared from a mixture of 4-[[2-[5-fluoro-1-[(4-methoxyphenyl)methyl]indazol-6-yl]acetyl]amino]pyridine-2-carboxylic acid and 4-[[2-[5-fluoro-2-[(4-methoxyphenyl)methyl]indazol-6-yl]acetyl]amino] pyridine-2-carboxylic acid (Example 6, step 4) and 1-(trifluoromethyl) cyclopropanamine hydrochloride analogously to Example 6 step 5.

LC-MS (Method A): Rt 2.68 mins; MS m/z 422.2=[M+H]+

$^1$H NMR (500 MHz, DMSO-d$_6$) δ 13.12 (s, 1H), 10.85 (s, 1H), 9.38 (s, 1H), 8.50 (d, J=5.5 Hz, 1H), 8.21 (d, J=2.0 Hz, 1H), 8.03 (s, 1H), 7.85 (dd, J=5.5, 2.2 Hz, 1H), 7.57 (d, J=6.0 Hz, 1H), 7.52 (d, J=10.1 Hz, 1H), 3.93 (s, 2H), 1.33-1.27 (m, 2H), 1.21-1.17 (m, 2H).

Example 6.2

N-(2,2-Difluorocyclopentyl)-4-[[2-(5-fluoro-1H-indazol-6-yl)acetyl]amino]pyridine-2-carboxamide

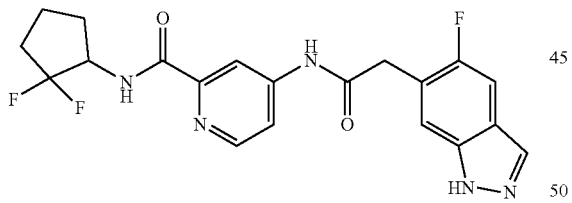

The title compound was prepared from a mixture of 4-[[2-[5-fluoro-1-[(4-methoxyphenyl)methyl]indazol-6-yl]acetyl]amino]pyridine-2-carboxylic acid and 4-[[2-[5-fluoro-2-[(4-methoxyphenyl)methyl]indazol-6-yl]acetyl]amino] pyridine-2-carboxylic acid (Example 6, step 4) and 2,2-difluorocyclopentanamine hydrochloride analogously to Example 6 step 5.

LC-MS (Method A): Rt 2.73 mins; MS m/z 418.2=[M+H]+

$^1$H NMR (500 MHz, DMSO-d$_6$) δ 13.12 (s, 1H), 10.85 (s, 1H), 8.61 (d, J=9.3 Hz, 1H), 8.52 (d, J=5.5 Hz, 1H), 8.25 (d, J=2.1 Hz, 1H), 8.04 (s, 1H), 7.85 (dd, J=5.5, 2.2 Hz, 1H), 7.58 (d, J=6.0 Hz, 1H), 7.52 (d, J=10.1 Hz, 1H), 4.67-4.52 (m, 1H), 3.94 (s, 2H), 2.24-2.05 (m, 3H), 1.91-1.65 (m, 3H).

Example 6.3

4-[[2-(4-Chloro-1H-indazol-6-yl)acetyl]amino]-N-[1-(trifluoromethyl)cyclo propyl]pyridine-2-carboxamide

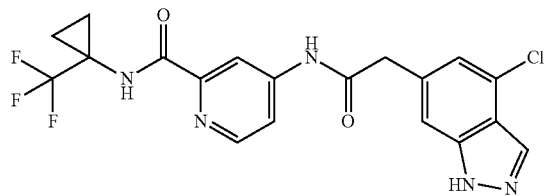 [SMILES: O=C(Cc1cc(Cl)c2cn[nH]c2c1)Nc1ccnc(C(=O)NC2(C(F)(F)F)CC2)c1]

Steps 1-4: 4-[[2-[4-Chloro-1-[(4-methoxyphenyl)methyl]indazol-6-yl]acetyl]amino]pyridine-2-carboxylic acid

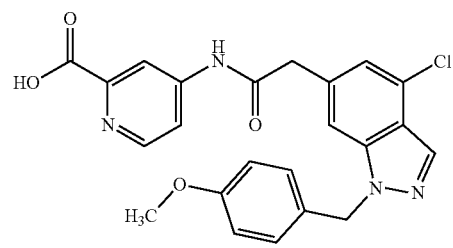 [SMILES: COc1ccc(Cn2ncc3c(Cl)cc(CC(=O)Nc4ccnc(C(=O)O)c4)cc32)cc1]

The title compound was prepared analogously to a mixture of 4-[[2-[5-fluoro-1-[(4-methoxyphenyl)methyl]indazol-6-yl]acetyl]amino]pyridine-2-carboxylic acid and 4-[[2-[5-fluoro-2-[(4-methoxyphenyl)methyl]indazol-6-yl]acetyl]amino]pyridine-2-carboxylic acid (Example 6 steps 1-4) by replacing 6-bromo-5-fluoro-1H-indazole (step 1) with 6-bromo-4-chloro-1H-indazole.

LC-MS (Method E): Rt 1.00 mins; MS m/z 451.1, 453.1=[M+H]+

$^1$H NMR (500 MHz, DMSO-d$_6$) δ 10.98 (s, 1H), 8.55 (d, J=5.6 Hz, 1H), 8.30 (d, J=2.0 Hz, 1H), 8.12 (d, J=0.8 Hz, 1H), 7.84 (dd, J=5.6, 2.1 Hz, 1H), 7.69 (s, 1H), 7.22 (d, J=0.8 Hz, 1H), 7.22-7.18 (m, 2H), 6.85-6.81 (m, 2H), 5.57 (s, 2H), 3.89 (s, 2H), 3.67 (s, 3H).

Step 5: 4-[[2-(4-Chloro-1H-indazol-6-yl)acetyl]amino]-N-[1-(trifluoromethyl) cyclopropyl]pyridine-2-carboxamide The title compound was prepared from 4-[[2-[4-chloro-1-[(4-methoxyphenyl)methyl]indazol-6-yl]acetyl]amino] pyridine-2-carboxylic acid (steps 1-4) and 1-(trifluoromethyl)cyclopropanamine hydrochloride analogously to Example 6 step 5.

LC-MS (Method A): Rt 3.03 mins; MS m/z 438.1, 440.1=[M+H]+

$^1$H NMR (500 MHz, DMSO-d$_6$) δ 13.38 (s, 1H), 10.83 (s, 1H), 9.39 (s, 1H), 8.50 (d, J=5.5 Hz, 1H), 8.20 (d, J=2.0 Hz, 1H), 8.09 (s, 1H), 7.86 (dd, J=5.5, 2.2 Hz, 1H), 7.48 (s, 1H), 7.19 (d, J=0.9 Hz, 1H), 3.87 (s, 2H), 1.32-1.27 (m, 2H), 1.21-1.15 (m, 2H).

Example 6.4

4-[[2-(4-Chloro-1H-indazol-6-yl)acetyl]amino]-N-(1-ethynylcyclopentyl) pyridine-2-carboxamide

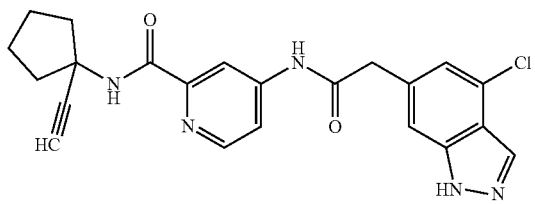 [SMILES: C#CC1(NC(=O)c2cc(NC(=O)Cc3cc(Cl)c4cn[nH]c4c3)ccn2)CCCC1]

Step 1: 4-[[2-(4-Chloro-1H-indazol-6-yl)acetyl]amino]pyridine-2-carboxylic acid

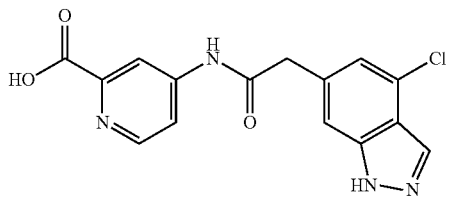 [SMILES: O=C(Cc1cc(Cl)c2cn[nH]c2c1)Nc1ccnc(C(=O)O)c1]

TFA (0.5 mL, 6.53 mmol) was added to a solution of 4-[[2-[4-chloro-1-[(4-methoxyphenyl)methyl]indazol-6-yl]acetyl]amino]pyridine-2-carboxylic acid (Example 6.3 steps 1-4) (80 mg, 0.18 mmol) in DCE (1 mL) and the mixture was heated to 75° C. for 40 h. The resulting mixture was diluted with DCM (2 mL) and concentrated in vacuo azeotroping with DCM (3×5 mL). The crude residue was suspended in MeCN (1 mL), filtered, washing with MeCN (3×1 mL) and dried to afford the title compound as a pale brown solid.

LC-MS (Method E): Rt 0.86 mins; MS m/z 331.0, 333.0=[M+H]+

$^1$H NMR (500 MHz, DMSO-d$_6$) δ 13.40 (s, 1H), 10.96 (s, 1H), 8.55 (d, J=5.7 Hz, 1H), 8.30 (d, J=2.0 Hz, 1H), 8.09 (s, 1H), 7.86 (dd, J=5.7, 2.1 Hz, 1H), 7.48 (s, 1H), 7.19 (s, 1H), 1H), 3.89 (s, 2H).

Step 2: 4-[[2-(4-Chloro-1H-indazol-6-yl)acetyl]amino]-N-(1-ethynylcyclopentyl) pyridine-2-carboxamide The title compound was prepared from 4-[[2-(4-chloro-1H-indazol-6-yl)acetyl]amino]pyridine-2-carboxylic acid (step 1) and 1-ethynylcyclopentanamine hydrochloride analogously to Example 6 step 5.

LC-MS (Method A): Rt 3.22 mins; MS m/z 422.2, 424.2=[M+H]+

$^1$H NMR (500 MHz, DMSO-d$_6$) δ 13.38 (s, 1H), 10.82 (s, 1H), 8.50-8.44 (m, 2H), 8.19 (d, J=2.0 Hz, 1H), 8.09 (s, 1H), 7.84 (dd, J=5.5, 2.2 Hz, 1H), 7.48 (s, 1H), 7.19 (s, 1H), 3.87 (s, 2H), 3.16 (s, 1H), 2.28-2.20 (m, 2H), 2.13-2.05 (m, 2H), 1.77-1.63 (m, 4H).

Example 7

N-tert-Butyl-4-[[2-(4-fluoro-1H-indazol-6-yl)acetyl]amino]pyridine-2-carboxamide

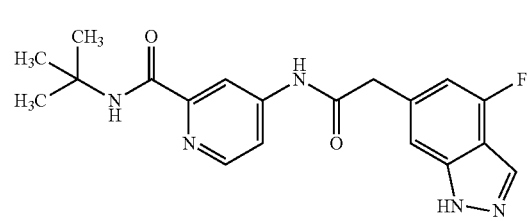 [SMILES: CC(C)(C)NC(=O)c1cc(NC(=O)Cc2cc(F)c3cn[nH]c3c2)ccn1]

Step 1: A mixture of 6-bromo-4-fluoro-1-[(4-methoxyphenyl)methyl]indazole and 6-bromo-4-fluoro-2-[(4-methoxyphenyl) methyl]indazole

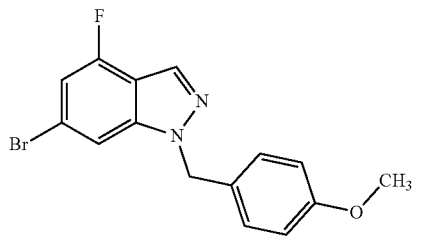

+

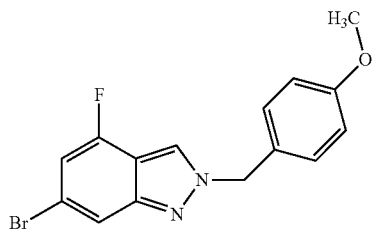

The title compound was prepared from 6-bromo-4-fluoro-1H-indazole and 1-(chloromethyl)-4-methoxy-benzene analogously to Example 6 step 1.

LC-MS (Method E): Rt 1.31, 1.35 mins; MS m/z 335.0, 337.0=[M+H]+

$^1$H NMR (500 MHz, DMSO-d$_6$) δ 8.73 (d, J=0.7 Hz, 0.4H), 8.24 (d, J=0.8 Hz, 0.6H), 8.00-7.97 (m, 0.6H), 7.75-7.71 (m, 0.4H), 7.36-7.31 (m, 0.8H), 7.25-7.21 (m, 1.2H), 7.19 (dd, J=9.6, 1.2 Hz, 0.6H), 7.03 (dd, J=9.9, 1.2 Hz, 0.4H), 6.93-6.89 (m, 0.8H), 6.89-6.85 (m, 1.2H), 5.60 (s, 1.2H), 5.56 (s, 0.8H), 3.72 (s, 1.2H), 3.70 (s, 1.8H). 0.4:0.6 ratio of regioisomers.

Step 2: A mixture of 2-[4-fluoro-1-[(4-methoxyphenyl)methyl]indazol-6-yl]acetic acid and 2-[4-fluoro-2-[(4-methoxyphenyl)methyl]indazol-6-yl]acetic acid

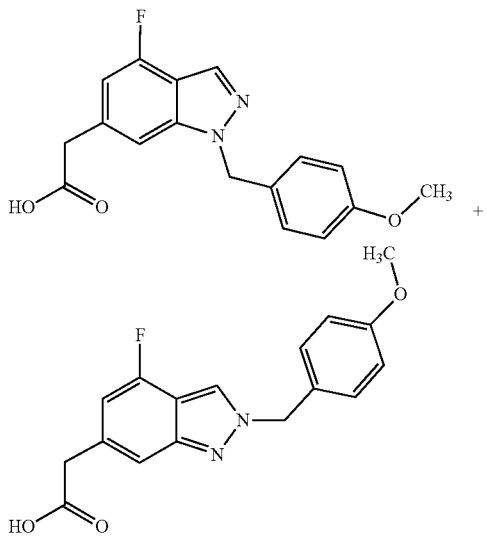

The title compound was prepared from a mixture of 6-bromo-4-fluoro-1-[(4-methoxyphenyl)methyl]indazole and 6-bromo-4-fluoro-2-[(4-methoxy phenyl)methyl]indazole (step 1), and potassium 3-ethoxy-3-oxo-propanoate analogously to Example 6 step 2.

LC-MS (Method E): Rt 1.07, 1.10 mins; MS m/z 315.0= [M+H]+; two regioisomers

Step 3: N-tert-Butyl-4-[[2-(4-fluoro-1H-indazol-6-yl)acetyl]amino]pyridine-2-carboxamide To a solution of a mixture of 2-[4-fluoro-1-[(4-methoxyphenyl)methyl]indazol-6-yl]acetic acid and 2-[4-fluoro-2-[(4-methoxyphenyl)methyl]indazol-6-yl]acetic acid (step 2)(87%, 114 mg, 0.32 mmol), 4-amino-N-tert-butyl-pyridine-2-carboxamide (Intermediate AB) (61 mg, 0.32 mmol) and DIPEA (110 µL, 0.63 mmol) in 1,4-dioxane (5 mL) was added a 50% solution of T3P® in EtOAc (103 µL, 0.35 mmol) and the reaction mixture was stirred at room temperature for 1 h. The resulting mixture was concentrated in vacuo and the residue dissolved in EtOAc (20 mL). The organic mixture was washed with water (20 mL), dried over Na$_2$SO$_4$ and concentrated in vacuo. The crude material was dissolved in DCE (2 mL), then TFA (1.21 mL, 15.78 mmol) was added and the mixture was heated to 75° C. for 48 h. The resulting mixture was concentrated in vacuo and purification of the crude residue by C18 reverse phase chromatography eluting with 10-100% MeCN in water with 0.1% formic acid modifier afforded the title compound as an off-white solid.

LC-MS (Method A): Rt 2.91 mins; MS m/z 370.2=[M+H]+

$^1$H NMR (500 MHz, DMSO-d$_6$) δ 13.35 (s, 1H), 10.81 (s, 1H), 8.45 (d, J=5.5 Hz, 1H), 8.19 (d, J=2.1 Hz, 1H), 8.13 (s, 1H), 8.02 (s, 1H), 7.82 (dd, J=5.5, 2.1 Hz, 1H), 7.34 (s, 1H), 6.88 (d, J=11.2 Hz, 1H), 3.86 (s, 2H), 1.39 (s, 9H).

Example 7.1

N-tert-Butyl-4-[[2-(5-chloro-1H-indazol-6-yl)acetyl]amino]pyridine-2-carboxamide

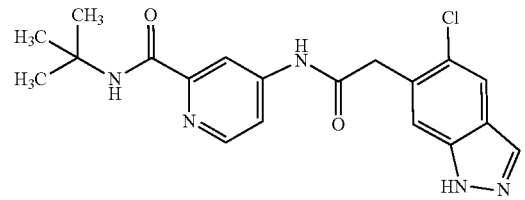 [SMILES: CC(C)(C)NC(=O)c1cc(NC(=O)Cc2cc3[nH]ncc3cc2Cl)ccn1]

The title compound was prepared analogously to N-tert-Butyl-4-[[2-(4-fluoro-1H-indazol-6-yl)acetyl]amino]pyridine-2-carboxamide [Example 7 (steps 1-3)] by replacing 6-bromo-5-fluoro-1H-indazole (step 1) with 6-bromo-5-chloro-1H-indazole.

LC-MS (Method A): Rt 2.96 mins; MS m/z 386.1, 388.1= [M+H]+

$^1$H NMR (500 MHz, DMSO-d$_6$) δ 13.22 (s, 1H), 10.86 (s, 1H), 8.46 (d, J=5.5 Hz, 1H), 8.20 (d, J=2.0 Hz, 1H), 8.04 (d, J=7.3 Hz, 2H), 7.88 (s, 1H), 7.82 (dd, J=5.5, 2.2 Hz, 1H), 7.64 (s, 1H), 4.03 (s, 2H), 1.40 (s, 9H).

Example 7.2

N-tert-Butyl-4-[[2-(4-chloro-1H-indazol-6-yl)acetyl]amino]pyridine-2-carboxamide

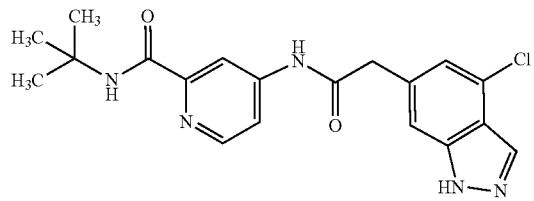 [SMILES: CC(C)(C)NC(=O)c1cc(NC(=O)Cc2cc(Cl)c3cn[nH]c3c2)ccn1]

Step 1: 6-Bromo-4-chloro-1-[(4-methoxyphenyl)methyl]indazole

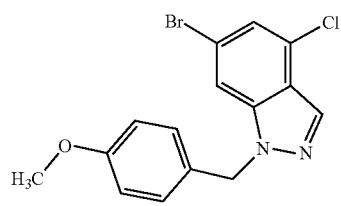 [SMILES: COc1ccc(Cn2ncc3c(Cl)cc(Br)cc32)cc1]

A mixture of 6-bromo-4-chloro-1H-indazole (500 mg, 2.16 mmol) and Cs$_2$CO$_3$ (1.06 mg, 3.24 mmol) in DMF (10 mL) was treated with 1-(chloromethyl)-4-methoxy-benzene (0.35 mL, 2.59 mmol) and the resulting mixture was stirred at room temperature for 16 h. The resulting mixture was diluted with EtOAc (50 mL) and water (50 mL) and the phases were separated. The organic portion was washed with brine (50 mL), dried over Na$_2$SO$_4$ and concentrated in vacuo. Purification of the crude material by chromatography on silica eluting with 0-80% EtOAc in heptane afforded the title compound as an orange solid.

LC-MS (Method E): Rt 1.40 mins; MS m/z 350.9, 352.9, 354.9=[M+H]+

¹H NMR (500 MHz, DMSO-d₆) δ 8.18 (d, J=0.9 Hz, 1H), 8.13 (t, J=1.1 Hz, 1H), 7.43 (d, J=1.3 Hz, 1H), 7.24-7.20 (m, 2H), 6.89-6.85 (m, 2H), 5.60 (s, 2H), 3.70 (s, 3H).

Step 2: 2-[4-Chloro-1-[(4-methoxyphenyl)methyl]indazol-6-yl]acetic acid

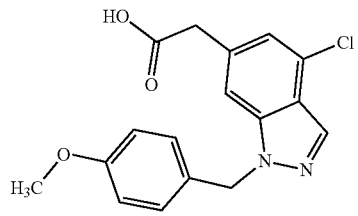 [SMILES: COc1ccc(Cn2ncc3c(Cl)cc(CC(=O)O)cc32)cc1]

The title compound was prepared from 6-bromo-4-chloro-1-[(4-methoxyphenyl)methyl]indazole (step 1) and potassium 3-ethoxy-3-oxo-propanoate analogously to Example 6 step 2.

LC-MS (Method E): Rt 1.16 mins; MS m/z 331.0, 333.0=[M+H]+

¹H NMR (400 MHz, DMSO-d₆) δ 12.44 (s (br), 1H), 8.10 (d, J=0.8 Hz, 1H), 7.63 (s, 1H), 7.22-7.19 (m, 2H), 7.15 (d, J=0.9 Hz, 1H), 6.88-6.84 (m, 2H), 5.56 (s, 2H), 3.71 (s, 2H), 3.70 (s, 3H).

Step 3: N-tert-Butyl-4-[[2-[4-chloro-1-[(4-methoxyphenyl)methyl]indazol-6-yl]acetyl]amino]pyridine-2-carboxamide

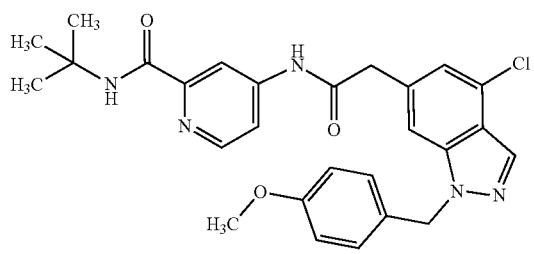 [SMILES: COc1ccc(Cn2ncc3c(Cl)cc(CC(=O)Nc4ccnc(C(=O)NC(C)(C)C)c4)cc32)cc1]

A mixture of 4-amino-N-tert-butyl-pyridine-2-carboxamide (Intermediate AB) (28 mg, 0.14 mmol), 2-[4-chloro-1-[(4-methoxyphenyl)methyl]indazol-6-yl]acetic acid (step 2) (99%, 43 mg, 0.13 mmol) and DIPEA (0.045 mL, 0.26 mmol) in 1,4-dioxane (1 mL) was treated with a 50% solution of T3P® in EtOAc (50%, 0.093 mL, 0.16 mmol) and the mixture was stirred at room temperature for 30 mins. The resulting mixture was diluted with EtOAc (15 mL) and 1:1 water/brine (15 mL) and the phases were separated. The organic portion was dried over Na₂SO₄ and concentrated in vacuo. Purification of the crude material by chromatography on silica eluting with 0-100% EtOAc in heptane afforded the title compound as a pale yellow waxy solid.

LC-MS (Method E): Rt 1.34 mins; MS m/z 506.2, 508.2=[M+H]+

¹H NMR (400 MHz, DMSO-d₆) δ 10.80 (s, 1H), 8.46 (d, J=5.5 Hz, 1H), 8.18 (dd, J=1.8, 0.4 Hz, 1H), 8.12 (d, J=0.9 Hz, 1H), 8.03 (s, 1H), 7.82 (dd, J=5.5, 2.2 Hz, 1H), 7.68 (s, 1H), 7.23-7.18 (m, 3H), 6.86-6.81 (m, 2H), 5.58 (s, 2H), 3.87 (s, 2H), 3.67 (s, 3H), 1.40 (s, 9H).

Step 4: N-tert-Butyl-4-[[2-(4-chloro-1H-indazol-6-yl)acetyl]amino]pyridine-2-carboxamide A solution of N-tert-butyl-4-[[2-[4-chloro-1-[(4-methoxyphenyl)methyl]indazol-6-yl]acetyl]amino]pyridine-2-carboxamide (step 3) (100%, 40 mg, 0.08 mmol) in DCE (1 mL) was treated with TFA (0.3 mL, 3.91 mmol) and the mixture was heated to 75° C. overnight. Additional TFA (0.3 mL, 3.91 mmol) was added and stirring continued at 75° C. for a further 24 h. The resulting mixture was concentrated in vacuo azeotroping with DCM (2×5 mL) and purification of the crude material by C18 reverse phase chromatography eluting with 10-100% MeCN in water with 0.1% formic acid modifier afforded the title compound as a pale yellow solid.

LC-MS (Method A): Rt 3.12 mins; MS m/z 386.2, 388.2=[M+H]+

¹H NMR (500 MHz, DMSO-d₆) δ 13.38 (s, 1H), 10.80 (s, 1H), 8.45 (d, J=5.5 Hz, 1H), 8.18 (d, J=2.0 Hz, 1H), 8.09 (s, 1H), 8.03 (s, 1H), 7.82 (dd, J=5.5, 2.2 Hz, 1H), 7.48 (s, 1H), 7.19 (d, J=0.7 Hz, 1H), 3.87 (s, 2H), 1.39 (s, 9H).

Example 8

N-tert-Butyl-4-[[2-[3-(trifluoromethyl)-1H-indazol-6-yl]acetyl]amino]pyridine-2-carboxamide

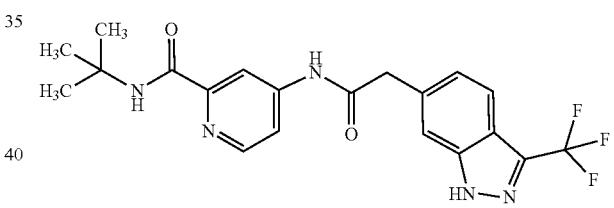

Step 1: 6-Bromo-1-[(4-methoxyphenyl)methyl]-3-(trifluoromethyl)indazole

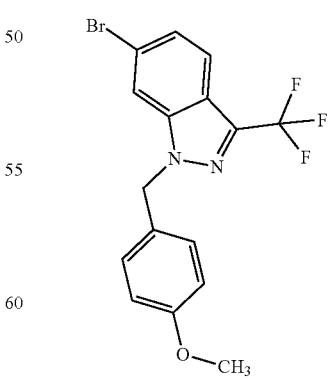

To a mixture of 6-bromo-3-(trifluoromethyl)-1H-indazole (1.0 g, 3.77 mmol), K₂CO₃ (782 mg, 5.66 mmol) and potassium iodide (689 mg, 4.15 mmol) was added acetone (100 mL) followed by 1-(chloromethyl)-4-methoxy-benzene (0.56 mL, 4.15 mmol) and the mixture was heated to 40° C. for 2 h. The resulting mixture was concentrated in vacuo. The dry crude residue was dissolved in EtOAc (30 mL) and washed with brine (30 mL), dried over Na$_2$SO$_4$ and concentrated in vacuo. Purification of the crude material by chromatography on silica (50 g KP-Sil) eluting with 0-6% EtOAc in heptane afforded the title compound as an off-white solid.

LC-MS (Method E): Rt 1.44 mins; MS m/z no ion observed $^1$H NMR (400 MHz, DMSO-d$_6$) δ 8.35 (dd, J=1.6, 0.6 Hz, 1H), 7.76 (dt, J=8.7, 0.8, 1H), 7.49 (dd, J=8.7, 1.6 Hz, 1H), 7.31-7.25 (m, 2H), 6.93-6.88 (m, 2H), 5.70 (s, 2H), 3.71 (s, 3H).

Step 2: 2-[1-[(4-Methoxyphenyl)methyl]-3-(trifluoromethyl)indazol-6-yl]acetic acid

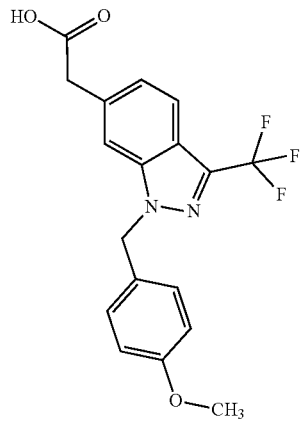 [SMILES: COc1ccc(Cn2nc(C(F)(F)F)c3ccc(CC(=O)O)cc32)cc1]

A mixture of 6-bromo-1-[(4-methoxyphenyl)methyl]-3-(trifluoromethyl)indazole (step 1) (250 mg, 0.65 mmol), potassium 2-cyanoacetate (120 mg, 0.97 mmol), diallyldipalladium dichloride (10 mg, 0.03 mmol) and SPhos (16 mg, 0.04 mmol) in toluene (5 mL) was degassed with nitrogen for 5 mins. The resulting mixture was heated using microwave radiation at 140° C. for 1.5 h. After cooling to room temperature, the mixture was concentrated in vacuo and the residue dissolved in 1,4-dioxane (5 mL) and aqueous 1M NaOH (5 mL). The resulting mixture was heated at reflux (130° C.) for 2 h after which time the volatile organic solvents were removed in vacuo. The remaining basic aqueous solution was extracted with EtOAc (2×10 mL) and the organics were discarded. The aqueous was acidified to pH 2 using 1M HCl then the extracted with EtOAc (3×15 mL) and the combined organic extracts were dried over Na$_2$SO$_4$ and concentrated in vacuo to afford the title compound as an off-white solid.

LC-MS (Method E): Rt 1.17 mins; MS m/z 365.0=[M+H]+

$^1$H NMR (500 MHz, DMSO-d$_6$) δ 7.83 (s, 1H), 7.74 (d, J=8.4 Hz, 1H), 7.29-7.23 (m, 3H), 6.92-6.87 (m, 2H), 5.66 (s, 2H), 3.75 (s, 2H), 3.70 (s, 3H).

Step 3: N-tert-Butyl-4-[[2-[3-(trifluoromethyl)-1H-indazol-6-yl]acetyl]amino]pyridine-2-carboxamide The title compound was prepared from 2-[1-[(4-methoxyphenyl)methyl]-3-(trifluoromethyl)indazol-6-yl]acetic acid (step 2) and (4-amino-N-tert-butyl-pyridine-2-carboxamide (Intermediate AB) analogously to Example 7 step 3.

LC-MS (Method A): Rt 3.44 mins; MS m/z 420.2=[M+H]+

$^1$H NMR (400 MHz, DMSO-d$_6$) δ 13.96 (s, 1H), 10.86 (s, 1H), 9.39 (s, 1H), 8.50 (d, J=5.5 Hz, 1H), 8.21 (d, J=1.6 Hz, 1H), 7.85 (dd, J=5.4, 1.9 Hz, 1H), 7.76 (d, J=8.4 Hz, 1H), 7.66 (s, 1H), 7.31 (d, J=8.4 Hz, 1H), 3.91 (s, 2H), 1.32-1.27 (m, 2H), 1.21-1.16 (m, 2H).

Example 8.1

N-[1-(Trifluoromethyl)cyclopropyl]-4-[[2-[3-(trifluoromethyl)-1H-indazol-6-yl]acetyl]amino]pyridine-2-carboxamide

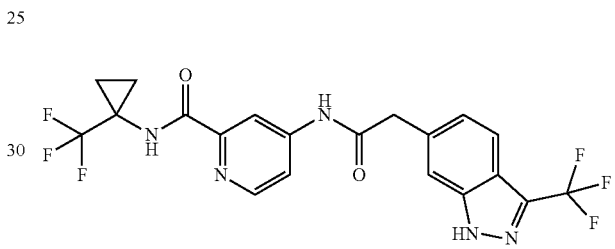

The title compound was prepared from 2-[1-[(4-methoxyphenyl)methyl]-3-(trifluoromethyl)indazol-6-yl]acetic acid (Example 8, step 2) and 4-amino-N-[1-(trifluoromethyl)cyclopropyl]pyridine-2-carboxamide (Intermediate AD) analogously to Example 7 step 3.

LC-MS (Method A): Rt 3.44 mins; MS m/z 472.2=[M+H]+

$^1$H NMR (500 MHz, DMSO-d$_6$) δ 13.96 (s, 1H), 10.86 (s, 1H), 9.39 (s, 1H), 8.50 (d, J=5.5 Hz, 1H), 8.21 (d, J=1.6 Hz, 1H), 7.85 (dd, J=5.4, 1.9 Hz, 1H), 7.76 (d, J=8.4 Hz, 1H), 7.66 (s, 1H), 7.31 (d, J=8.4 Hz, 1H), 3.91 (s, 2H), 1.30 (t, J=6.8 Hz, 2H), 1.18 (s, 2H).

Example 9

N-tert-Butyl-4-[[2-(3-isopropyl-1H-indazol-6-yl)acetyl]amino]pyridine-2-carboxamide

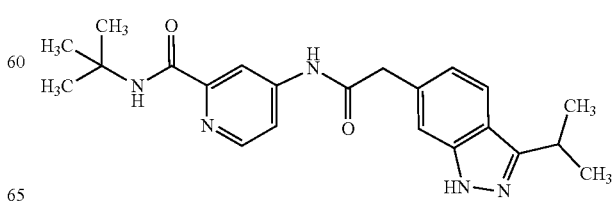

Step 1: 2-[3-Iodo-1-[(4-methoxyphenyl)methyl]indazol-6-yl]acetic acid

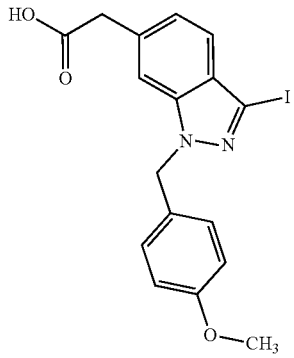 [SMILES: COc1ccc(Cn2nc(I)c3ccc(CC(=O)O)cc32)cc1]

A mixture of 2-(3-iodo-1H-indazol-6-yl)acetic acid (Intermediate C) (728 mg, 2.41 mmol), potassium iodide (880 mg, 5.3 mmol) and potassium carbonate (999 mg, 7.23 mmol) in acetone (12.0 mL) was treated with 1-(chloromethyl)-4-methoxy-benzene (830 mg, 5.3 mmol) and heated at 45° C. for 24 h then stirred at room temperature for 2 days. The resulting mixture was filtered, washing through with EtOAc (30 mL). The filtrate was diluted with water (30 mL) and the phases were separated. The organics were washed with brine (30 mL) then concentrated in vacuo. The residue was treated with 1M LiOH (7.23 mL, 7.23 mmol) and THF (8 mL). After stirring at room temperature for 2 h, the volatile solvents were removed in vacuo and the pH adjusted to ~5/6 with 1M HCl resulting in precipitation. The solid was filtered, washed with water and dried to afford the title compound as an off-white solid.

LC-MS (Method E): Rt 1.16 mins; MS m/z 422.9=[M+H]+

$^1$H NMR (400 MHz, DMSO-$d_6$) δ 7.58 (s, 1H), 7.29 (d, J=8.3 Hz, 1H), 7.23-7.16 (m, 2H), 7.12 (dd, J=8.4, 1.2 Hz, 1H), 6.91-6.83 (m, 2H), 5.52 (s, 2H), 3.69 (s, 3H), 3.56 (s, 2H).

Step 2: N-tert-Butyl-4-[[2-[3-iodo-1-[(4-methoxyphenyl)methyl]indazol-6-yl]acetyl]amino]pyridine-2-carboxamide

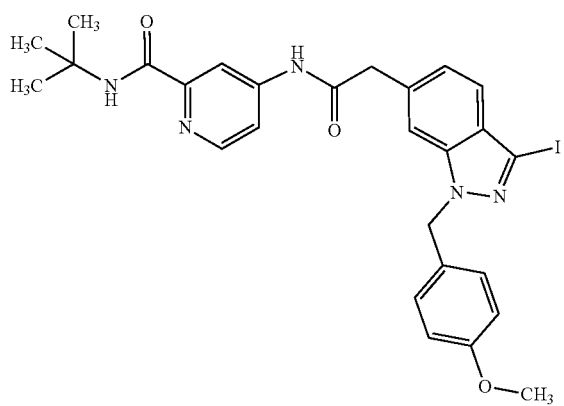 [SMILES: COc1ccc(Cn2nc(I)c3ccc(CC(=O)Nc4ccnc(C(=O)NC(C)(C)C)c4)cc32)cc1]

A mixture of 2-[3-iodo-1-[(4-methoxyphenyl)methyl]indazol-6-yl]acetic acid (step 1) (84%, 428 mg, 0.85 mmol) and 4-amino-N-tert-butyl-pyridine-2-carboxamide (Intermediate AB) (181.09 mg, 0.94 mmol) in 1,4-dioxane (8.5 mL) was treated with TEA (0.30 mL, 1.7 mmol) followed by a 50% solution of T3P® in EtOAc (1.01 mL, 1.7 mmol) and the reaction mixture was stirred at room temperature for 18 h. The volatile solvents were removed in vacuo and the residue was dissolved in EtOAc (20 mL). The organic solution was washed with saturated aqueous sodium bicarbonate solution (2×15 mL) and the combined aqueous washes were extracted with EtOAc (3×10 mL). The organic extracts were combined, dried over $Na_2SO_4$ and concentrated in vacuo. Purification by chromatography on silica eluting with 0-100% EtOAc in heptane the title compound as a colourless solid.

LC-MS (Method E): Rt 1.33 mins; MS m/z 598.0=[M+H]+

$^1$H NMR (500 MHz, DMSO-$d_6$) δ 10.82 (s, 1H), 8.45 (d, J=5.5 Hz, 1H), 8.19 (d, J=2.0 Hz, 1H), 8.03 (s, 1H), 7.82 (dd, J=5.5, 2.2 Hz, 1H), 7.71 (s, 1H), 7.38 (d, J=8.3 Hz, 1H), 7.24-7.17 (m, 3H), 6.87-6.82 (m, 2H), 5.56 (s, 2H), 3.87 (s, 2H), 3.68 (s, 3H), 1.39 (s, 9H).

Step 3: N-tert-Butyl-4-[[2-[3-isopropenyl-1-[(4-methoxyphenyl)methyl]indazol-6-yl]acetyl]amino]pyridine-2-carboxamide

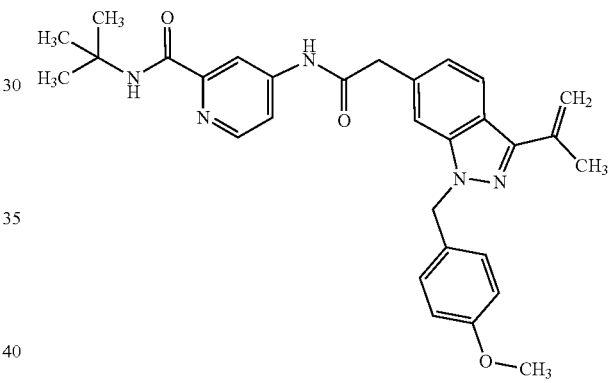

To a mixture of N-tert-butyl-4-[[2-[3-iodo-1-[(4-methoxyphenyl)methyl]indazol-6-yl]acetyl]amino]pyridine-2-carboxamide (step 2) (158 mg, 0.26 mmol), Pd(OAc)$_2$ (12 mg, 0.05 mmol), P(Cy)$_3$ (30 mg, 0.11 mmol) and tripotassium phosphate (225 mg, 1.06 mmol) under a nitrogen atmosphere was added toluene (2.7 mL) followed by 2-isopropenyl-4,4,5,5-tetramethyl-1,3,2-dioxaborolane (0.10 mL, 0.53 mmol) and the reaction mixture was heated at 100° C. for 4 h. After cooling to room temperature, the resulting mixture was purified by chromatography on silica eluting with 0-100% EtOAc in heptane to afford the title compound as a pale yellow solid.

LC-MS (Method E): Rt 1.35 mins; MS m/z 512.2=[M+H]+

$^1$H NMR (400 MHz, DMSO-$d_6$) δ 10.79 (s, 1H), 8.45 (d, J=5.5 Hz, 1H), 8.19 (d, J=2.1 Hz, 1H), 8.03 (s, 1H), 7.93 (d, J=8.5 Hz, 1H), 7.82 (dd, J=5.5, 2.2 Hz, 1H), 7.64 (s, 1H), 7.23-7.18 (m, 2H), 7.16 (dd, J=8.5, 1.2 Hz, 1H), 6.86-6.77 (m, 2H), 5.76 (s, 1H), 5.54 (s, 2H), 5.37-5.30 (m, 1H), 3.84 (s, 2H), 3.67 (s, 3H), 2.23 (s, 3H), 1.40 (s, 9H).

Step 4: N-tert-Butyl-4-[[2-(3-isopropyl-1H-indazol-6-yl)acetyl]amino]pyridine-2-carboxamide N-tert-Butyl-4-[[2-[3-isopropenyl-1-[(4-methoxyphenyl)methyl]indazol-6-yl]acetyl]amino]pyridine-2-carboxamide (step 3) (98%, 113 mg, 0.22 mmol) and 10% Pd—C (23 mg, 0.02 mmol) were dissolved in EtOH (2.2 mL), placed under hydrogen and stirred for 4 h. The resulting mixture was filtered through Kieselguhr and concentrated in vacuo. The residue was and treated with DCE (2.16 mL) followed by TFA (0.017 mL, 0.22 mmol) and the mixture was heated at 70° C. overnight. Additional TFA (1.2 mL) was added and stirring continued at 70° C. for a further 24 h. The resulting mixture was concentrated in vacuo and purification of the crude material by preparative HPLC (acidic pH, early elution method) afforded the title compound as a colourless solid.

LC-MS (Method A): Rt 3.27 mins; MS m/z 394.3=[M+H]+

$^1$H NMR (500 MHz, DMSO-$d_6$) δ 12.51 (s, 1H), 10.78 (s, 1H), 8.44 (d, J=5.5 Hz, 1H), 8.19 (d, J=2.1 Hz, 1H), 8.02 (s, 1H), 7.81 (dd, J=5.5, 2.2 Hz, 1H), 7.71 (d, J=8.3 Hz, 1H), 7.40 (s, 1H), 7.03 (dd, J=8.3, 1.2 Hz, 1H), 3.81 (s, 2H), 1.39 (s, 9H), 1.35 (d, J=6.9 Hz, 6H).

Example 9.1

4-[[2-(3-Tetrahydrofuran-2-yl-1H-indazol-6-yl)acetyl]amino]-N-[1-(trifluoromethyl)cyclopropyl]pyridine-2-carboxamide

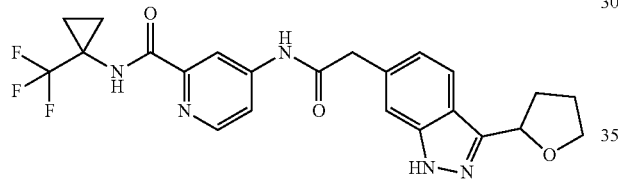

Step 1: 4-[[2-[3-Iodo-1-[(4-methoxyphenyl)methyl]indazol-6-yl]acetyl]amino]-N-[1-(trifluoromethyl)cyclopropyl]pyridine-2-carboxamide

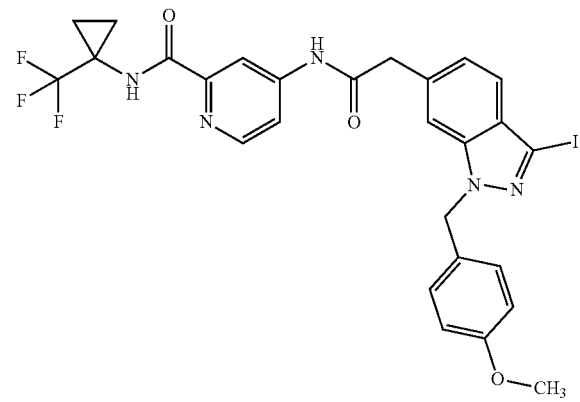 [SMILES: COc1ccc(Cn2nc(I)c3ccc(CC(=O)Nc4ccnc(C(=O)NC5(C(F)(F)F)CC5)c4)cc32)cc1]

The title compound was prepared from 2-[3-iodo-1-[(4-methoxyphenyl)methyl]indazol-6-yl]acetic acid (Example 9 step 1) and 4-amino-N-[1-(trifluoromethyl)cyclopropyl]pyridine-2-carboxamide (Intermediate AD) analogously to Example 9 step 2.

LC-MS (Method E): Rt 1.30 mins; MS m/z 650.1=[M+H]+

$^1$H NMR (500 MHz, DMSO-$d_6$) δ 10.83 (s, 1H), 9.39 (s, 1H), 8.50 (d, J=5.5 Hz, 1H), 8.20 (d, J=2.0 Hz, 1H), 7.85 (dd, J=5.5, 2.2 Hz, 1H), 7.71 (s, 1H), 7.38 (d, J=8.3 Hz, 1H), 7.24-7.16 (m, 3H), 6.86-6.81 (m, 2H), 5.56 (s, 2H), 3.87 (s, 2H), 3.67 (s, 3H), 1.32-1.27 (m, 2H), 1.21-1.16 (m, 2H).

Step 2: 4-[[2-[3-(2,3-Dihydrofuran-4-yl)-1-[(4-methoxyphenyl)methyl]indazol-6-yl]acetyl]amino]-N-[1-(trifluoromethyl)cyclopropyl]pyridine-2-carboxamide

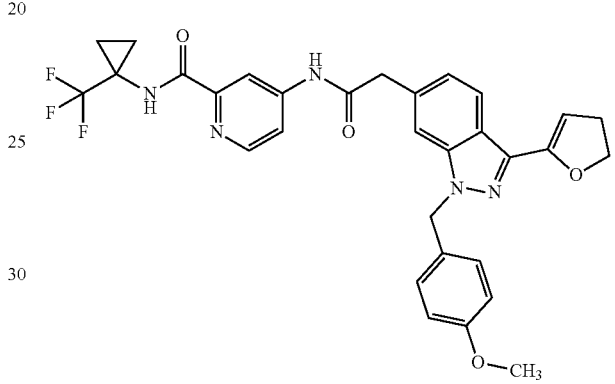

The title compound was prepared from 4-[[2-[3-iodo-1-[(4-methoxyphenyl)methyl]indazol-6-yl]acetyl]amino]-N-[1-(trifluoromethyl)cyclopropyl]pyridine-2-carboxamide (step 1) and 2-(2,3-dihydrofuran-4-yl)-4,4,5,5-tetramethyl-1,3,2-dioxaborolane analogously to Example 9 step 3.

LC-MS (Method E): Rt 1.25 mins; MS m/z 592.3=[M+H]+

Step 3: 4-[[2-(3-Tetrahydrofuran-2-yl-1H-indazol-6-yl)acetyl]amino]-N-[1-(trifluoromethyl)cyclopropyl]pyridine-2-carboxamide The title compound was prepared from 4-[[2-[3-(2,3-dihydrofuran-5-yl)-1-[(4-methoxyphenyl)methyl]indazol-6-yl]acetyl]amino]-N-[1-(trifluoromethyl)cyclopropyl]pyridine-2-carboxamide (step 2) and 10% Pd/C analogously to Example 9 step 4.

LC-MS (Method A): Rt 2.83 mins; MS m/z 474.2=[M+H]+

$^1$H NMR (500 MHz, DMSO-$d_6$) δ 12.78 (s, 1H), 10.83 (s, 1H), 9.38 (s, 1H), 8.49 (d, J=5.5 Hz, 1H), 8.21 (d, J=2.0 Hz, 1H), 7.85 (dd, J=5.5, 2.1 Hz, 1H), 7.72 (d, J=8.3 Hz, 1H), 7.44 (s, 1H), 7.06 (dd, J=8.4, 1.1 Hz, 1H), 5.17 (t, J=7.2 Hz, 1H), 3.94 (q, J=7.2 Hz, 1H), 3.84-3.81 (m, 3H), 2.29-2.15 (m, 2H), 2.10-1.93 (m, 2H), 1.32-1.26 (m, 2H), 1.21-1.14 (m, 2H).

Example 10

4-[[2-[3-(Morpholinomethyl)-1H-indazol-6-yl]acetyl]amino]-N-(2,2,2-trifluoro-1,1-dimethyl-ethyl)pyridine-2-carboxamide

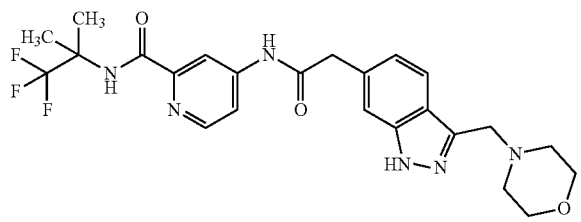 [SMILES: CC(C)(NC(=O)c1cc(NC(=O)Cc2ccc3c(CN4CCOCC4)n[nH]c3c2)ccn1)C(F)(F)F]

Step 1: 6-bromo-1-[(4-methoxyphenyl)methyl]indazole-3-carbaldehyde

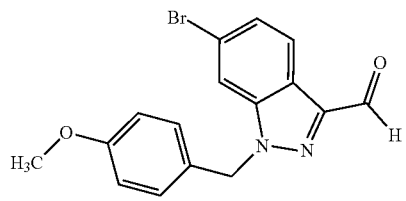 [SMILES: COc1ccc(Cn2nc(C=O)c3ccc(Br)cc32)cc1]

1-(Chloromethyl)-4-methoxy-benzene (0.49 mL, 3.67 mmol) was added to a mixture of 6-bromo-1H-indazole-3-carbaldehyde (750 mg, 3.33 mmol) and Cs$_2$CO$_3$ (1629 mg, 5.0 mmol) in DMF (12 mL) and the reaction mixture was stirred at room temperature for 2 h 30 mins. The resulting mixture was diluted with EtOAc (60 mL) and brine (60 mL). The phases were separated and the aqueous portion was extracted with EtOAc (60 mL). The combined organic extracts were dried over Na$_2$SO$_4$ and concentrated in vacuo. Purification of the crude material by chromatography on silica eluting with 0-80% EtOAc in heptane afforded the title compound as an orange solid.

LC-MS (Method E): Rt 1.30 mins; MS m/z 345.0, 347.0=[M+H]+

$^1$H NMR (500 MHz, DMSO-d$_6$) δ 10.14 (s, 1H), 8.31 (d, J=1.2 Hz, 1H), 8.06 (d, J=8.6 Hz, 1H), 7.53 (dd, J=8.6, 1.6 Hz, 1H), 7.33-7.30 (m, 2H), 6.92-6.88 (m, 2H), 5.74 (s, 2H), 3.71 (s, 3H).

Step 2: 4-[[6-Bromo-1-[(4-methoxyphenyl)methyl]indazol-3-yl]methyl]morpholine

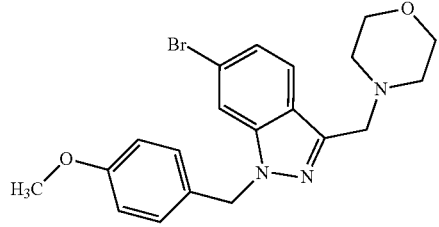 [SMILES: COc1ccc(Cn2nc(CN3CCOCC3)c3ccc(Br)cc32)cc1]

To a solution of 6-bromo-1-[(4-methoxyphenyl)methyl]indazole-3-carbaldehyde (step 1)(600 mg, 1.74 mmol) and AcOH (0.15 mL, 2.61 mmol) in THF (10 mL) was added morpholine (0.30 mL, 3.48 mmol) and sodium triacetoxyborohydride (442 mg, 2.09 mmol) and the reaction mixture was stirred at room temperature for 16 h. The resulting mixture was diluted with EtOAc (80 mL) and saturated sodium bicarbonate solution (80 mL) and the phases were separated. The organic portion was washed with brine (80 mL), dried over Na$_2$SO$_4$ and concentrated in vacuo. Purification of the crude material by chromatography on silica eluting with 0-100% EtOAc in heptane followed by 0-5% MeOH in EtOAc afforded the title compound as a pale orange oil.

LC-MS (Method E): Rt 0.98 mins; MS m/z 416.0, 418.0=[M+H]+

$^1$H NMR (500 MHz, DMSO-d$_6$) δ 8.00 (d, J=1.2 Hz, 1H), 7.83 (d, J=8.5 Hz, 1H), 7.25 (dd, J=8.6, 1.6 Hz, 1H), 7.21-7.16 (m, 2H), 6.88-6.84 (m, 2H), 5.52 (s, 2H), 3.80 (s, 2H), 3.69 (s, 3H), 3.57-3.52 (m, 4H), 2.42-2.37 (m, 4H).

Step 3: 2-[1-[(4-Methoxyphenyl)methyl]-3-(morpholin-4-ium-4-ylmethyl)indazol-6-yl]acetate

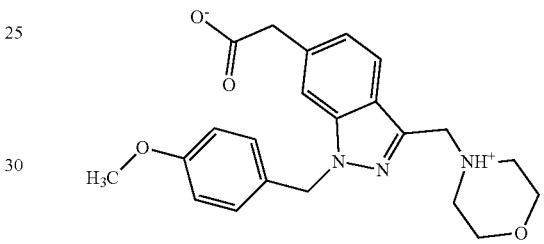

The title compound was prepared from 4-[[6-bromo-1-[(4-methoxyphenyl)methyl]indazol-3-yl]methyl]morpholine (step 2) and potassium 3-ethoxy-3-oxo-propanoate analogously to Example 6 step 2.

LC-MS (Method E): Rt 0.81 mins; MS m/z 396.1=[M+H]+

$^1$H NMR (500 MHz, DMSO-d$_6$) δ 7.65 (d, J=8.3 Hz, 1H), 7.32 (s, 1H), 7.17-7.13 (m, 2H), 7.03 (dd, J=8.4, 1.0 Hz, 1H), 6.87-6.82 (m, 2H), 5.45 (s, 2H), 3.77 (s, 2H), 3.70 (s, 3H), 3.58-3.53 (m, 4H), 3.26 (s, 2H), 2.43-2.38 (m, 4H).

Step 4: Methyl 4-[[2-[1-[(4-methoxyphenyl)methyl]-3-(morpholinomethyl)indazol-6-yl]acetyl]amino]pyridine-2-carboxylate

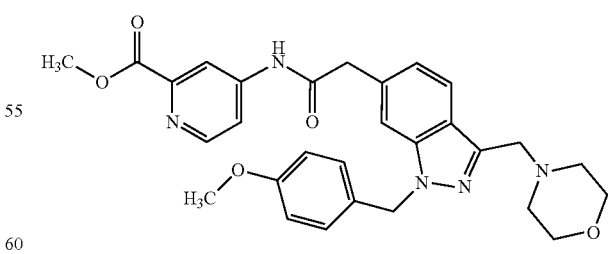

The title compound was prepared from 2-[1-[(4-Methoxyphenyl)methyl]-3-(morpholin-4-ium-4-ylmethyl)indazol-6-yl]acetate and (step 3) and methyl 4-aminopyridine-2-carboxylate analogously to Example 6 step 3.

LC-MS (Method E): Rt 0.88 mins; MS m/z 530.2=[M+H]+

¹H NMR (400 MHz, DMSO-d₆) δ 10.81 (s, 1H), 8.55 (d, J=5.7 Hz, 1H), 8.29 (d, J=1.9 Hz, 1H), 7.82-7.77 (m, 2H), 7.56 (s, 1H), 7.18-7.13 (m, 2H), 7.09 (dd, J=8.4, 1.2 Hz, 1H), 6.84-6.78 (m, 2H), 5.49 (s, 2H), 3.86 (s, 3H), 3.82 (s, 2H), 3.79 (s, 2H), 3.66 (s, 3H), 3.55-3.52 (m, 4H), 2.41-2.38 (m, 4H).

Step 5: 4-[[2-[1-[(4-Methoxyphenyl)methyl]-3-(morpholin-4-ium-4-ylmethyl)indazol-6-yl]acetyl]amino]pyridine-2-carboxylate

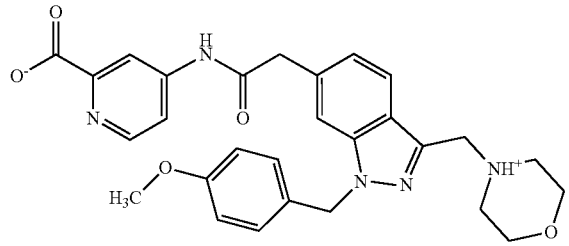 [SMILES: COc1ccc(Cn2nc(C[NH+]3CCOCC3)c3ccc(CC(=O)Nc4ccnc(C(=O)[O-])c4)cc32)cc1]

The title compound was prepared from methyl 4-[[2-[1-[(4-methoxyphenyl)methyl]-3-(morpholinomethyl)indazol-6-yl]acetyl]amino]pyridine-2-carboxylate (step 4) and 1M LiOH analogously to Example 6 step 4.

LC-MS (Method E): Rt 0.80 mins; MS m/z 516.3=[M+H]+

¹H NMR (500 MHz, DMSO-d₆) δ 10.79 (s, 1H), 8.49 (d, J=5.5 Hz, 1H), 8.21 (d, J=1.7 Hz, 1H), 7.80 (d, J=8.4 Hz, 1H), 7.78 (dd, J=5.6, 2.2 Hz, 1H), 7.58 (s, 1H), 7.19-7.13 (m, 2H), 7.09 (dd, J=8.4, 1.1 Hz, 1H), 6.83-6.80 (m, 2H), 5.49 (s, 2H), 3.82 (s, 2H), 3.79 (s, 2H), 3.66 (s, 3H), 3.55-3.53 (m, 4H), 2.41-2.38 (m, 4H).

Step 6: 4-[[2-[3-(Morpholinomethyl)-1H-indazol-6-yl]acetyl]amino]-N-(2,2,2-trifluoro-1,1-dimethylethyl)pyridine-2-carboxamide The title compound was prepared from 4-[[2-[1-[(4-methoxyphenyl)methyl]-3-(morpholin-4-ium-4-ylmethyl)indazol-6-yl]acetyl] amino]pyridine-2-carboxylate (step 5) and 1,1,1-trifluoro-2-methyl-propan-2-amine hydrochloride analogously to Example 6 step 5.

LC-MS (Method A): Rt 1.91 mins; MS m/z 505.2=[M+H]+

¹H NMR (500 MHz, DMSO-d₆) δ 12.78 (s, 1H), 10.84 (s, 1H), 8.49 (d, J=5.6 Hz, 1H), 8.33 (s, 1H), 8.23 (d, J=2.0 Hz, 1H), 7.85 (dd, J=5.6, 2.2 Hz, 1H), 7.80 (d, J=8.3 Hz, 1H), 7.43 (s, 1H), 7.07 (dd, J=8.3, 1.2 Hz, 1H), 3.83 (s, 2H), 3.79 (s, 2H), 3.56-3.52 (m, 4H), 2.42-2.37 (m, 4H), 1.65 (s, 6H).

Example 11

4-[[2-(1H-Indazol-6-yl)acetyl]amino]-N-(3-methyloxetan-3-yl)pyridine-2-carboxamide

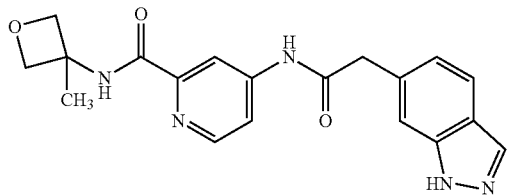 [SMILES: CC1(NC(=O)c2cc(NC(=O)Cc3ccc4cn[nH]c4c3)ccn2)COC1]

Step 1: 4-[[2-(1H-Indazol-6-yl)acetyl]amino]pyridine-2-carboxylic acid

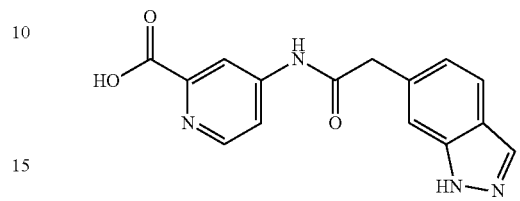

A mixture of 4-[[2-(1-tetrahydropyran-2-ylindazol-6-yl)acetyl]amino]pyridine-2-carboxylic acid and 4-[[2-(2-tetrahydropyran-2-ylindazol-6-yl)acetyl]amino]pyridine-2-carboxylic acid (Example 4 step 2) (50%, 1.9 g, 2.5 mmol) in DCM (100 mL) was treated with TFA (1.91 mL, 24.97 mmol) and the reaction mixture was stirred at room temperature overnight. The resulting mixture was concentrated in vacuo and the crude residue which was suspended in DCM (50 mL). The suspension was sonicated for 10 mins, filtered, washed with DCM (20 mL) and dried to afford the title compound as a beige solid.

LC-MS (Method E): Rt 0.78 mins; MS m/z 297.1=[M+H]+

¹H NMR (500 MHz, DMSO-d₆) δ 13.10 (s, 1H), 11.96 (s, 1H), 8.58 (d, J=6.0 Hz, 1H), 8.50 (s, 1H), 8.08 (d, J=6.3 Hz, 1H), 8.02 (d, J=0.8 Hz, 1H), 7.69 (d, J=8.3 Hz, 1H), 7.56 (s, 1H), 7.13 (dd, J=8.3, 1.0 Hz, 1H), 3.96 (s, 2H).

Step 2: 4-[[2-(1H-Indazol-6-yl)acetyl]amino]-N-(3-methyloxetan-3-yl)pyridine-2-carboxamide HATU (83 mg, 0.22 mmol) was added to a mixture of 4-[[2-(1H-indazol-6-yl)acetyl]amino]pyridine-2-carboxylic acid (step 1) (40%, 125 mg, 0.17 mmol), 3-methyloxetan-3-amine hydrochloride (42 mg, 0.34 mmol) and DIPEA (88 μL, 0.51 mmol) in DMF (1 mL) and the reaction mixture was stirred at room temperature overnight. The resulting mixture was diluted with EtOAc (10 mL) and water (10 mL) and the phases were separated. The aqueous portion was extracted with EtOAc (10 mL) and the combined organic extracts were dried over Na₂SO₄ and concentrated in vacuo. Purification of the crude material by C18 reverse phase chromatography eluting with 10 to 100% MeCN (+0.1% formic acid) in H₂O (+0.1% formic acid) afforded the title compound as an off-white solid.

LC-MS (Method A): Rt 1.90 mins; MS m/z 366.2=[M+H]+

¹H NMR (500 MHz, DMSO-d₆) δ 9.21 (s, 1H), 8.46 (d, J=5.5 Hz, 1H), 8.17 (d, J=2.0 Hz, 1H), 8.02 (s, 1H), 7.83 (dd, J=5.5, 2.1 Hz, 1H), 7.69 (d, J=8.3 Hz, 1H), 7.49 (s, 1H), 7.08 (dd, J=8.3, 1.1 Hz, 1H), 4.72 (d, J=6.5 Hz, 2H), 4.35 (d, J=6.5 Hz, 2H), 3.83 (s, 2H), 1.58 (s, 3H).

Example 11.1

4-[[2-(1H-Indazol-6-yl)acetyl]amino]-N-(2-oxaspiro[3.3]heptan-6-yl)pyridine-2-carboxamide

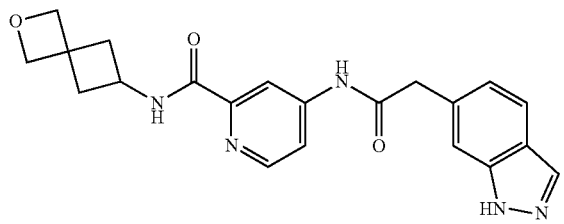 [SMILES: O=C(Cc1ccc2cn[nH]c2c1)Nc1ccnc(C(=O)NC2CC3(COC3)C2)c1]

The title compound was prepared from 4-[[2-(1H-indazol-6-yl)acetyl]amino]pyridine-2-carboxylic acid (Example 11 step 1) and 2-oxaspiro[3.3]heptan-6-amine hydrochloride analogously to Example 11 step 2.

LC-MS (Method A): Rt 2.01 mins; MS m/z 392.3=[M+H]+

$^1$H NMR (500 MHz, DMSO-$d_6$) δ 8.88 (d, J=8.3 Hz, 1H), 8.46 (d, J=5.5 Hz, 1H), 8.18 (d, J=1.9 Hz, 1H), 8.02 (s, 1H), 7.82 (dd, J=5.5, 2.1 Hz, 1H), 7.69 (d, J=8.3 Hz, 1H), 7.49 (s, 1H), 7.08 (dd, J=8.3, 1.1 Hz, 1H), 4.62 (s, 2H), 4.48 (s, 2H), 4.25 (1H, J=8.3 Hz, 1H), 3.83 (s, 2H), 2.57-2.50 (m, 2H), 2.38-2.30 (m, 2H).

Example 11.2

4-[[2-(1H-Indazol-6-yl)acetyl]amino]-N-[4-(trifluoromethyl)tetrahydropyran-4-yl]pyridine-2-carboxamide

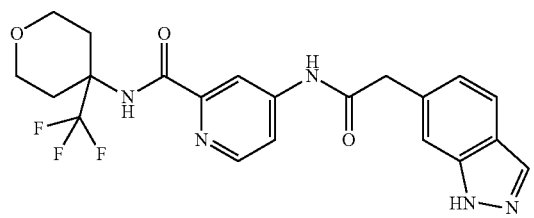 [SMILES: O=C(Cc1ccc2cn[nH]c2c1)Nc1ccnc(C(=O)NC2(C(F)(F)F)CCOCC2)c1]

The title compound was prepared from 4-[[2-(1H-indazol-6-yl)acetyl]amino]pyridine-2-carboxylic acid (Example 11 step 1) and 4-(trifluoromethyl)tetrahydropyran-4-amine hydrochloride analogously to Example 11 step 2.

LC-MS (Method A): Rt 2.72 mins; MS m/z 448.3=[M+H]+

$^1$H NMR (500 MHz, DMSO-$d_6$) δ 13.03 (s, 1H), 10.89 (s, 1H), 8.52 (d, J=5.5 Hz, 1H), 8.44 (s, 1H), 8.25 (d, J=2.0 Hz, 1H), 8.03 (s, 1H), 7.86 (dd, J=5.5, 2.2 Hz, 1H), 7.70 (d, J=8.3 Hz, 1H), 7.49 (s, 1H), 7.08 (dd, J=8.3, 1.2 Hz, 1H), 3.88-3.81 (m, 4H), 3.45-3.39 (m, 2H), 2.71 (d, J=13.1 Hz, 2H), 1.79 (td, J=12.9, 4.5 Hz, 2H).

Example 11.3

4-[[2-(1H-Indazol-6-yl)acetyl]amino]-N-[3-(trifluoromethyl)oxetan-3-yl]pyridine-2-carboxamide

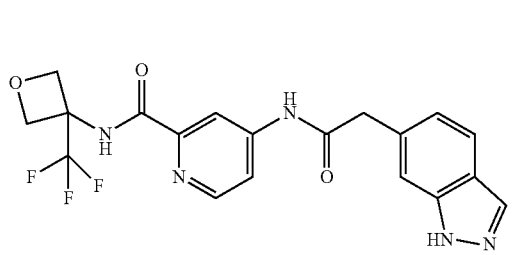 [SMILES: O=C(Cc1ccc2cn[nH]c2c1)Nc1ccnc(C(=O)NC2(C(F)(F)F)COC2)c1]

The title compound was prepared from 4-[[2-(1H-indazol-6-yl)acetyl]amino]pyridine-2-carboxylic acid (Example 11 step 1) and 3-(trifluoromethyl)oxetan-3-amine hydrochloride analogously to Example 11 step 2.

LC-MS (Method A): Rt 2.38 mins; MS m/z 420.2=[M+H]+

1H NMR (500 MHz, DMSO-$d_6$) δ 13.00 (s, 1H), 10.84 (s, 1H), 9.88 (s, 1H), 8.53 (d, J=5.5 Hz, 1H), 8.22 (d, J=2.0 Hz, 1H), 8.02 (s, 1H), 7.88 (dd, J=5.5, 2.2 Hz, 1H), 7.70 (d, J=8.3 Hz, 1H), 7.49 (s, 1H), 7.08 (dd, J=8.3, 1.2 Hz, 1H), 4.92 (d, J=8.0 Hz, 2H), 4.72 (d, J=8.4 Hz, 2H), 3.84 (s, 2H).

Example 11.4

N-[1-(Difluoromethyl)cyclopropyl]-4-[[2-(1H-indazol-6-yl)acetyl]amino] pyridine-2-carboxamide

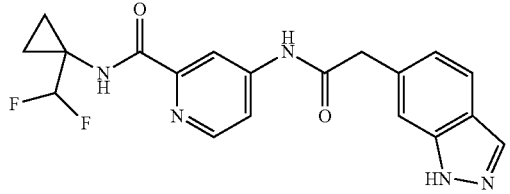 [SMILES: O=C(Cc1ccc2cn[nH]c2c1)Nc1ccnc(C(=O)NC2(C(F)F)CC2)c1]

The title compound was prepared from 4-[[2-(1H-indazol-6-yl)acetyl]amino]pyridine-2-carboxylic acid (Example 11 step 1) and 1-(difluoromethyl)cyclopropanamine hydrochloride analogously to Example 11 step 2.

LC-MS (Method A): Rt 2.41 mins; MS m/z 386.2=[M+H]+

1H NMR (500 MHz, DMSO-$d_6$) δ 13.00 (s, 1H), 10.82 (s, 1H), 9.09 (s, 1H), 8.48 (d, J=5.5 Hz, 1H), 8.21 (d, J=2.0 Hz, 1H), 8.02 (s, 1H), 7.85 (dd, J=5.5, 2.2 Hz, 1H), 7.70 (d, J=8.3 Hz, 1H), 7.49 (s, 1H), 7.08 (dd, J=8.3, 1.2 Hz, 1H), 6.07 (t, J=57.1 Hz, 1H), 3.84 (s, 2H), 1.11-1.04 (m, 2H), 1.06-0.97 (m, 2H).

Example 11.5

N-(3-Fluoro-1-bicyclo[1.1.1]pentanyl)-4-[[2-(1H-indazol-6-yl)acetyl]amino]pyridine-2-carboxamide

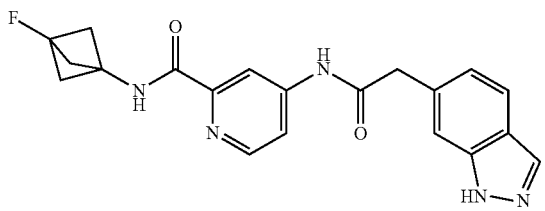 [SMILES: O=C(Cc1ccc2cn[nH]c2c1)Nc1ccnc(C(=O)NC23CC(F)(C2)C3)c1]

The title compound was prepared from 4-[[2-(1H-indazol-6-yl)acetyl]amino]pyridine-2-carboxylic acid (Example 11 step 1) and 3-fluorobicyclo[1.1.1]pentan-1-amine hydrochloride analogously to Example 11 step 2.

LC-MS (Method A): Rt 2.56 mins; MS m/z 380.2=[M+H]+

1H NMR (500 MHz, DMSO-$d_6$) δ 13.00 (s, 1H), 10.83 (s, 1H), 9.37 (s, 1H), 8.47 (d, J=5.5 Hz, 1H), 8.16 (d, J=2.0 Hz, 1H), 8.02 (s, 1H), 7.85 (dd, J=5.5, 2.2 Hz, 1H), 7.70 (d, J=8.3 Hz, 1H), 7.49 (s, 1H), 7.08 (dd, J=8.3, 1.2 Hz, 1H), 3.84 (s, 2H), 2.41 (d, J=2.2 Hz, 6H).

Example 12

4-[[2-[3-(2,2,2-Trifluoro-1-hydroxy-1-methyl-ethyl)-1H-indazol-6-yl]acetyl]amino]-N-[1-(trifluoromethyl)cyclopropyl]pyridine-2-carboxamide

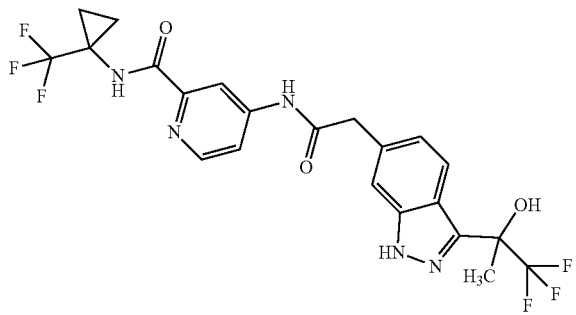 [SMILES: CC(O)(c1n[nH]c2cc(CC(=O)Nc3ccnc(C(=O)NC4(C(F)(F)F)CC4)c3)ccc12)C(F)(F)F]

Step 1: 6-Bromo-1-[(4-methoxyphenyl)methyl]indazole-3-carbaldehyde

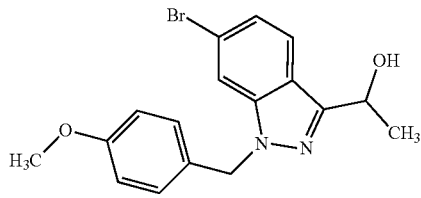 [SMILES: COc1ccc(Cn2nc(C(C)O)c3ccc(Br)cc32)cc1]

4-Methoxybenzyl chloride (1.45 mL, 10.75 mmol) was added to a mixture of 6-bromo-1H-indazole-3-carbaldehyde (2.2 g, 9.78 mmol) and $Cs_2CO_3$ (4.78 g, 14.66 mmol) in DMF (44.4 mL) and the reaction mixture was stirred at room temperature for 2 hours. The resulting mixture was diluted with EtOAc (100 mL) and water (100 mL) and the phases were separated. The organics were washed with water (100 mL), brine (100 mL), dried over $Na_2SO_4$ and concentrated in vacuo. Purification by chromatography on silica eluting with 0-100% EtOAc in heptane afforded the title compound as a red solid.

LC-MS (Method E): Rt 1.31 mins; MS m/z 344.9, 347.0=[M+H]+

1H NMR (400 MHz, DMSO-$d_6$) δ 10.15 (s, 1H), 8.32 (d, J=1.0 Hz, 1H), 8.07 (d, J=8.5 Hz, 1H), 7.53 (dd, J=8.6, 1.6 Hz, 1H), 7.36-7.29 (m, 2H), 6.94-6.88 (m, 2H), 5.75 (s, 2H), 3.71 (s, 3H).

Step 2: 1-[6-Bromo-1-[(4-methoxyphenyl)methyl]indazol-3-yl]ethanol

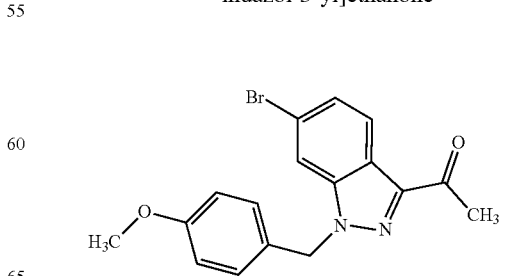

6-Bromo-1-[(4-methoxyphenyl)methyl]indazole-3-carbaldehyde (step 1) (73%, 3.06 g, 6.48 mmol) in THF (64.76 mL) was cooled to −78° C. and treated dropwise with 3M bromo(methyl)magnesium in diethyl ether (2.37 mL, 7.12 mmol). The mixture was allowed to warm to room temperature and stirred for 4 hours. The reaction was quenched with saturated ammonium chloride (50 mL) and the volatile solvents were removed in vacuo. The resulting suspension was diluted with EtOAc (50 mL) and the phases separated. The aqueous phase was extracted with EtOAc (3×50 mL) and the combined organic extracts were dried over $Na_2SO_4$, filtered and concentrated in vacuo. Purification by chromatography on silica eluting with 0-100% EtOAc in heptane afforded the title compound as an orange oil.

LC-MS (Method E): Rt 1.24 mins; MS m/z 360.9, 363.0=[M+H]+

1H NMR (400 MHz, DMSO-$d_6$) δ 8.00-7.96 (m, 1H), 7.88-7.84 (m, 1H), 7.24-7.18 (m, 3H), 6.89-6.84 (m, 2H), 5.52 (d, J=15.5 Hz, 1H), 5.47 (d, J=15.5 Hz, 1H), 5.41 (d, J=4.8 Hz, 1H), 5.08 (qd, J=6.5, 4.9 Hz, 1H), 3.70 (s, 3H), 1.51 (d, J=6.5 Hz, 3H).

Step 3: 1-[6-Bromo-1-[(4-methoxyphenyl)methyl]indazol-3-yl]ethanone

A mixture of 1-[6-Bromo-1-[(4-methoxyphenyl)methyl]indazol-3-yl]ethanol (step 2) (87%, 2.45 g, 5.9 mmol) in DCM (28 mL) at 0° C. was treated with Dess-Martin Periodinane (3.0 g, 7.08 mmol). The mixture was allowed to warm to room temperature and stirred for 18 hours. Saturated aqueous sodium sulfite (20 mL) was added and the phases were separated. The organic layer was washed with saturated aqueous sodium bicarbonate (2×20 mL) and the combined aqueous washes were re-extracted with DCM (2×30 mL). The combined organic extracts were dried over $Na_2SO_4$, filtered and concentrated in vacuo. Purification by chromatography on silica eluting with 0-100% EtOAc in heptane afforded the title compound as an orange solid.

LC-MS (Method E): Rt 1.36 mins; MS m/z 358.8, 360.8=[M+H]+

1H NMR (500 MHz, DMSO-$d_6$) δ 8.23 (d, J=1.3 Hz, 1H), 8.09 (d, J=8.6 Hz, 1H), 7.47 (dd, J=8.6, 1.6 Hz, 1H), 7.32-7.26 (m, 2H), 6.92-6.87 (m, 2H), 5.71 (s, 2H), 3.70 (s, 3H), 2.63 (s, 3H).

Step 4: 2-[6-Bromo-1-[(4-methoxyphenyl)methyl]indazol-3-yl]-1,1,1-trifluoro-propan-2-ol

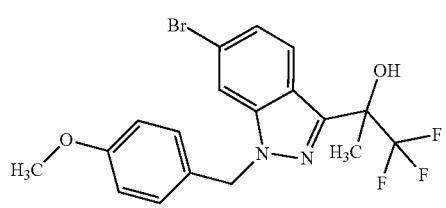 [SMILES: COc1ccc(Cn2nc(C(C)(O)C(F)(F)F)c3ccc(Br)cc32)cc1]

1-[6-Bromo-1-[(4-methoxyphenyl)methyl]indazol-3-yl]ethenone (step 3) (500 mg, 1.39 mmol) in THF (10 mL) at −78° C. was treated with trimethyl(trifluoromethyl)silane (411 μL, 2.78 mmol) followed by 1M TBAF in THF (14 μL, 0.014 mmol) and the stirred for 30 mins. The mixture was allowed to warm to room temperature and stirred for 2 hours. 1M TBAF in THF (2.78 mL, 2.78 mmol) was added and stirring continued for a further 2 hours. The resulting mixture was concentrated in vacuo and the residue was dissolved in EtOAc (10 mL) and washed with saturated aqueous sodium bicarbonate (2×10 mL). The combined aqueous washes were extracted with EtOAc (2×10 mL) and the combined organic extracts were dried over $Na_2SO_4$ and concentrated in vacuo to afford the title compound as a brown oil.

LC-MS (Method E): Rt 1.37 mins; MS m/z 429.0, 431.0=[M+H]+

1H NMR (400 MHz, DMSO-$d_6$) δ 8.04 (d, J=1.2 Hz, 1H), 7.89 (d, J=8.7 Hz, 1H), 7.28 (dd, J=8.7, 1.6 Hz, 1H), 7.22-7.17 (m, 2H), 6.98-6.89 (m, 1H), 6.89-6.85 (m, 2H), 5.60 (d, J=15.6 Hz, 1H), 5.56 (d, J=15.6 Hz, 1H), 3.70 (s, 3H), 1.83 (s, 3H).

Step 5: 3-(1-Benzyloxy-2,2,2-trifluoro-1-methyl-ethyl)-6-bromo-1-[(4-methoxyphenyl) methyl]indazole

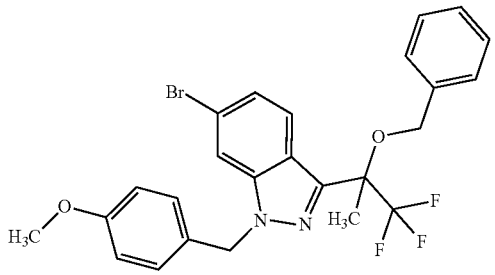 [SMILES: COc1ccc(Cn2nc(C(C)(OCc3ccccc3)C(F)(F)F)c3ccc(Br)cc32)cc1]

2-[6-Bromo-1-[(4-methoxyphenyl)methyl]indazol-3-yl]-1,1,1-trifluoro-propan-2-ol (step 4)(658 mg, 1.53 mmol) in DMF (15.3 mL) was treated with NaH 60% dispersion in mineral oil (123 mg, 3.07 mmol) and bromomethylbenzene (0.36 mL, 3.07 mmol) and stirred for 18 hours. The reaction was quenched with brine (20 mL) and the mixture was extracted with EtOAc (3×20 mL). The combined organic extracts were dried over $Na_2SO_4$ and concentrated in vacuo. Purification by chromatography on silica eluting with 0-35% EtOAc in heptane afforded the title compound as a colourless oil.

LC-MS (Method E): Rt 1.64 mins; MS m/z 519.1, 521.1=[M+H]+

1H NMR (500 MHz, DMSO-$d_6$) δ 8.12 (d, J=1.4 Hz, 1H), 7.73 (d, J=8.7 Hz, 1H), 7.36-7.27 (m, 6H), 7.24-7.20 (m, 2H), 6.91-6.86 (m, 2H), 5.67 (d, J=15.6 Hz, 1H), 5.63 (d, J=15.6 Hz, 1H), 4.58 (d, J=11.2 Hz, 1H), 4.14 (d, J=11.2 Hz, 1H), 3.70 (s, 3H), 2.01 (s, 3H).

Step 6: 2-[3-(1-Benzyloxy-2,2,2-trifluoro-1-methyl-ethyl)-1-[(4-methoxyphenyl)methyl]indazol-6-yl]acetic acid

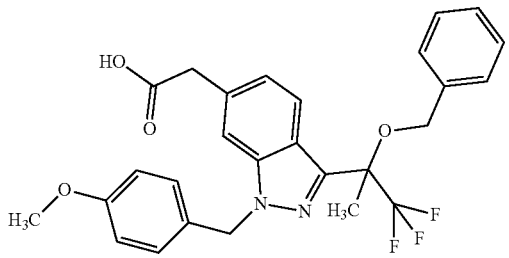 [SMILES: COc1ccc(Cn2nc(C(C)(OCc3ccccc3)C(F)(F)F)c3ccc(CC(=O)O)cc32)cc1]

3-(1-Benzyloxy-2,2,2-trifluoro-1-methyl-ethyl)-6-bromo-1-[(4-methoxyphenyl) methyl]indazole (step 5)(632 mg, 1.22 mmol), potassium 3-ethoxy-3-oxo-propanoate (414 mg, 2.43 mmol), DMAP (15 mg, 0.12 mmol), BINAP (76 mg, 0.12 mmol) and diallyldipalladium dichloride (22 mg, 0.06 mmol) were added to a sealed tube and placed under a nitrogen atmosphere. Toluene (6.1 mL) was added, the mixture was sparged with nitrogen for 10 minutes and then stirred at 140° C. for 20 hours. The resulting mixture was purified by chromatography on silica eluting with 0-100% EtOAc in heptane to afford the ester intermediate. The intermediate was dissolved in a 1:1 mixture of MeOH and 2 M LiOH (12 mL) and stirred for 18 hours. The volatile solvents were removed in vacuo and the aqueous mixture was acidified to pH 1 with 3 M HCl. The aqueous suspension was extracted with EtOAc (3×50 mL) and the combined organic extracts were dried over $Na_2SO_4$ and concentrated in vacuo to afford the title compound as a pale yellow gum.

LC-MS (Method E): Rt 1.40 mins; MS m/z 499.2=[M+H]+

1H NMR (400 MHz, DMSO-$d_6$) δ 7.75 (d, J=8.4 Hz, 1H), 7.39-7.26 (m, 6H), 7.24-7.15 (m, 2H), 7.07 (dd, J=8.5, 1.2 Hz, 1H), 6.91-6.83 (m, 2H), 5.61 (s, 2H), 4.56 (d, J=11.3 Hz, 1H), 4.17 (d, J=11.3 Hz, 1H), 3.71-3.65 (m, 5H), 2.01 (s, 3H).

Step 7: 4-[[2-[3-(2,2,2trifluoro-1-hydroxy-1-methyl-ethyl)-1H-indazol-6-yl]acetyl]amino]-N-[1-(trifluoromethyl)cyclopropyl]pyridine-2-carboxamide A mixture of 2-[3-(1-Benzyloxy-2,2,2-trifluoro-1-methyl-ethyl)-1-[(4-methoxyphenyl)methyl] indazol-6-yl]acetic acid (step 6) (85%, 312 mg, 0.53 mmol) and 4-amino-N-[1-(trifluoromethyl)cyclopropyl]pyridine-2-carboxamide (Intermediate AD) (143 mg, 0.58 mmol) in 1,4-dioxane (5.3 mL) was treated with DIPEA (0.19 mL, 1.06 mmol) and a 50% solution of T3P® in EtOAc (1.27 mL, 1.06 mmol) and the reaction mixture was stirred for 2 hours. The resulting mixture was diluted with EtOAc (15 mL) and washed with saturated aqueous sodium bicarbonate (15 mL). The organic layer was dried over $Na_2SO_4$ and concentrated in vacuo. The residue was dissolved in DCE (5.3 mL), treated with TFA (2.5 mL, 32.67 mmol) and the reaction mixture was heated at 75° C. for 18 hours. The resulting mixture was concentrated in vacuo and the residue dissolved in EtOAc (20 mL) and washed with saturated aqueous sodium bicarbonate (20 mL). The aqueous was extracted with EtOAc (2×20 mL) and the combined organic extracts were dried over $Na_2SO_4$, filtered through a plug of silica and concentrated in vacuo. Purification by preparative HPLC (acidic pH, early elution method) afforded the title compound as a colourless solid.

LC-MS (Method A): Rt 2.97 mins; MS m/z 516.3=[M+H]+

1H NMR (500 MHz, DMSO-$d_6$) δ 13.04 (s, 1H), 10.81 (s, 1H), 9.38 (s, 1H), 8.49 (d, J=5.5 Hz, 1H), 8.21 (d, J=2.0 Hz, 1H), 7.89 (d, J=8.4 Hz, 1H), 7.85 (dd, J=5.5, 2.2 Hz, 1H), 7.46 (s, 1H), 7.09 (dd, J=8.5, 1.3 Hz, 1H), 6.74 (s, 1H), 3.83 (s, 2H), 1.82 (s, 3H), 1.32-1.27 (m, 2H), 1.21-1.15 (m, 2H).

Example 13

4-[[2-(1H-Indol-6-yl)acetyl]amino]-N-(2,2,2-trifluoro-1,1-dimethyl-ethyl) pyridine-2-carboxamide

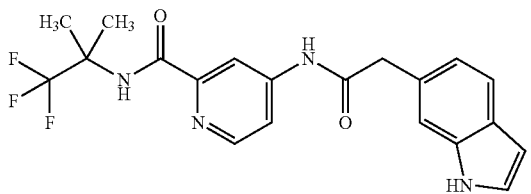 [SMILES: CC(C)(NC(=O)c1cc(NC(=O)Cc2ccc3cc[nH]c3c2)ccn1)C(F)(F)F]

Step 1: 4-[[2-(1H-Indol-6-yl)acetyl]amino]pyridine-2-carboxylic acid

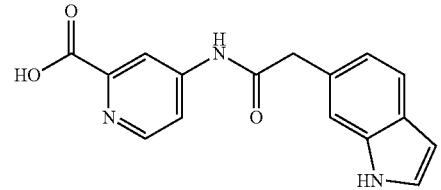 [SMILES: O=C(Cc1ccc2cc[nH]c2c1)Nc1ccnc(C(=O)O)c1]

A solution of methyl 4-aminopyridine-2-carboxylate (751 mg, 4.93 mmol) and 2-(1H-indol-6-yl)acetic acid (786 mg, 4.48 mmol) in 1,4-dioxane (5 mL) was treated with DIPEA (1.57 mL, 8.97 mmol) and a 50% solution of T3P® in EtOAc (5.33 mL, 8.97 mmol) and the reaction mixture was stirred at room temperature for 90 minutes. The reaction mixture was concentrated in vacuo and the resulting residue was dissolved in EtOAc (50 mL) and washed with saturated aqueous sodium bicarbonate (2×50 mL). The organic layer was dried over $Na_2SO_4$ and concentrated in vacuo. The residue was dissolved in 1,4-dioxane (10 mL) and 1M LiOH (10 mL) and stirred for 2 hours. The volatile solvents were removed in vacuo and the resulting aqueous solution was acidified with 3M HCl to pH ~3. The resulting precipitate was collected by filtration to afford the title compound as an orange solid.

LC-MS (Method E): Rt 0.86 mins; MS m/z 296.1=[M+H]+

1H NMR (500 MHz, DMSO-$d_6$) δ 11.04 (s, 1H), 10.74 (s, 1H), 8.47 (d, J=5.5 Hz, 1H), 8.23 (s, 1H), 7.80 (dd, J=5.6, 2.1 Hz, 1H), 7.47 (d, J=8.1 Hz, 1H), 7.36 (s, 1H), 7.32-7.29 (m, 1H), 6.97 (dd, J=8.1, 1.4 Hz, 1H), 6.40-6.37 (m, 1H), 3.75 (s, 2H). The signal for COOH was not observed.

Step 2: 4-[[2-(1H-Indol-6-yl)acetyl]amino]-N-(2,2,2-trifluoro-1,1-dimethyl-ethyl) pyridine-2-carboxamide 4-[[2-(1H-Indol-6-yl)acetyl]amino]pyridine-2-carboxylic acid (step 1) (79%, 100 mg, 0.27 mmol) and 1,1,1-trifluoro-2-methyl-propan-2-amine hydrochloride (48 mg, 0.29 mmol) in DMF (3 mL) were treated with DIPEA (0.094 mL, 0.54 mmol) and HATU (112 mg, 0.29 mmol) and the reaction mixture was stirred at room temperature for 2 hours. The resulting mixture was diluted with EtOAc (10 mL) and washed with saturated aqueous sodium hydrogen carbonate (2×10 mL). The organic layer was dried over $Na_2SO_4$ and concentrated in vacuo. Purification by preparative HPLC (acidic pH, early elution method) afforded the title compound as an off-white solid.

LC-MS (Method A): Rt 3.46 mins; MS m/z 405.4=[M+H]+

1H NMR (500 MHz, DMSO-$d_6$) δ 11.04 (s, 1H), 10.79 (s, 1H), 8.48 (d, J=5.5 Hz, 1H), 8.33 (s, 1H), 8.24 (d, J=2.0 Hz, 1H), 7.85 (dd, J=5.6, 2.2 Hz, 1H), 7.47 (d, J=8.1 Hz, 1H), 7.36 (s, 1H), 7.32-7.27 (m, 1H), 6.97 (dd, J=8.1, 1.4 Hz, 1H), 6.40-6.35 (m, 1H), 3.75 (s, 2H), 1.64 (s, 6H).

Example 13.1

N-(3,3-Difluoro-1-methyl-cyclobutyl)-4-[[2-(1H-indol-6-yl)acetyl]amino] pyridine-2-carboxamide

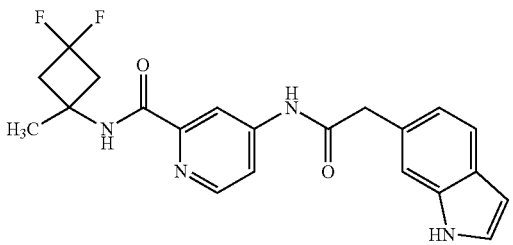 [SMILES: CC1(NC(=O)c2cc(NC(=O)Cc3ccc4cc[nH]c4c3)ccn2)CC(F)(F)C1]

The title compound was prepared from 4-[[2-(1H-indol-6-yl)acetyl]amino]pyridine-2-carboxylic acid (Example 13, step 1) and 3,3-difluoro-1-methyl-cyclobutanamine hydrochloride analogously to Example 13 step 2.

LC-MS (Method A): Rt 3.12 mins; MS m/z 399.4=[M+H]+

1H NMR (500 MHz, DMSO-$d_6$) δ 11.03 (s, 1H), 10.74 (s, 1H), 9.02 (s, 1H), 8.47 (d, J=5.5 Hz, 1H), 8.19 (d, J=2.0 Hz, 1H), 7.84 (dd, J=5.5, 2.2 Hz, 1H), 7.47 (d, J=8.1 Hz, 1H), 7.36 (s, 1H), 7.33-7.28 (m, 1H), 6.97 (dd, J=8.1, 1.4 Hz, 1H), 6.40-6.35 (m, 1H), 3.75 (s, 2H), 3.11-2.98 (m, 2H), 2.73-2.62 (m, 2H), 1.51 (s, 3H).

Example 13.2

N-(4-Cyanotetrahydropyran-4-yl)-4-[[2-(1H-indol-6-yl)acetyl]amino] pyridine-2-carboxamide

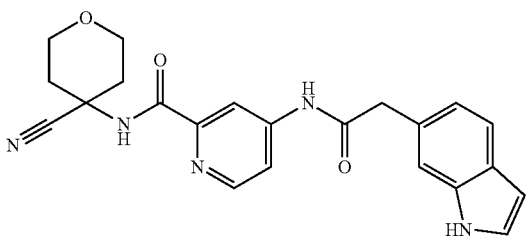 [SMILES: N#CC1(NC(=O)c2cc(NC(=O)Cc3ccc4cc[nH]c4c3)ccn2)CCOCC1]

The title compound was prepared from 4-[[2-(1H-indol-6-yl)acetyl]amino]pyridine-2-carboxylic acid (Example 13, step 1) and 4-aminotetrahydropyran-4-carbonitrile hydrochloride analogously to Example 13 step 2.

LC-MS (Method A): Rt 2.61 mins; MS m/z 404.4=[M+H]+

1H NMR (500 MHz, DMSO-$d_6$) δ 11.04 (s, 1H), 10.79 (s, 1H), 9.01 (s, 1H), 8.52 (d, J=5.5 Hz, 1H), 8.25 (d, J=2.0 Hz, 1H), 7.88 (dd, J=5.6, 2.2 Hz, 1H), 7.47 (d, J=8.1 Hz, 1H), 7.37 (s, 1H), 7.32-7.27 (m, 1H), 6.97 (dd, J=8.1, 1.4 Hz, 1H), 6.41-6.35 (m, 1H), 3.86 (dt, J=12.3, 3.8 Hz, 2H), 3.76 (s, 2H), 3.62-3.54 (m, 2H), 2.40-2.31 (m, 2H), 2.06 (ddd, J=13.8, 12.0, 3.9 Hz, 2H).

Preparation of Intermediates

Intermediate A

4-Amino-N-(1,1-dimethylprop-2-ynyl)pyridine-2-carboxamide

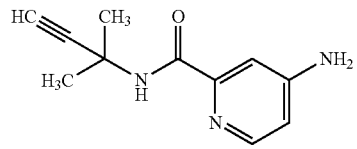

To a mixture of 4-aminopyridine-2-carboxylic acid (2 g, 14.48 mmol), TBTU (5.58 g, 17.38 mmol) and TEA (2.42 mL, 17.38 mmol) in DMF (36 mL) was added 2-methylbut-3-yn-2-amine (22.82 mL, 17.38 mmol) and the mixture was stirred at room temperature for 3 days. The reaction mixture was filtered and the filtrate concentrated in vacuo. The crude residue was dissolved in EtOAc (40 mL) and washed with sat. NaHCO$_3$ solution (40 mL). The aqueous was further extracted with EtOAc (40 mL) and the combined organic portions were washed with brine (2×40 mL), dried over Na$_2$SO$_4$ and concentrated in vacuo. The crude material was triturated with a minimum volume of ether at 0° C. to afford the titled compound as an off-white crystalline solid.

LC-MS (Method F): Rt 1.28 mins; MS m/z 204.3=[M+H]+

$^1$H NMR (500 MHz, DMSO-$d_6$) δ 8.23 (s, 1H), 7.99 (d, J=5.6 Hz, 1H), 7.19 (d, J=2.3 Hz, 1H), 6.59 (dd, J=5.6, 2.4 Hz, 1H), 6.36 (s, 2H), 3.19 (s, 1H), 1.62 (s, 6H).

Intermediate AB

4-Amino-N-tert-butyl-pyridine-2-carboxamide

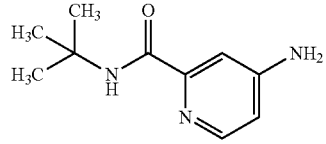

The title compound was prepared from 4-aminopyridine-2-carboxylic acid and 2-methylpropan-2-amine analogously to Intermediate A.

LC-MS (Method E): Rt 0.48 mins; MS m/z 194.0=[M+H]+

$^1$H NMR (500 MHz, DMSO-$d_6$) δ 7.99 (s, 1H), 7.97 (d, J=5.6 Hz, 1H), 7.18 (d, J=2.2 Hz, 1H), 6.56 (dd, J=5.6, 2.4 Hz, 1H), 6.32 (s, 2H), 1.37 (s, 9H).

Intermediate AC

4-Amino-N-(1-cyano-1-methyl-ethyl)pyridine-2-carboxamide

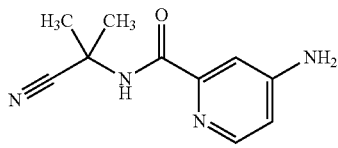

To a mixture of 4-aminopyridine-2-carboxylic acid (15 g, 108.6 mmol), TBTU (41.84 g, 130.32 mmol) and triethylamine (37.84 mL, 271.5 mmol) in DMF (271.52 mL) was added 2-amino-2-methyl-propanenitrile hydrochloride (14.4 g, 119.46 mmol) and the mixture was stirred at room temperature for 3 days. The reaction mixture was filtered and the solid washed with DMF (2×30 mL). The combined filtrate was concentrated in vacuo and the crude residue dissolved in EtOAc (300 mL) and washed with sat. NaHCO$_3$ solution (2×300 mL). The aqueous portion was re-extracted with EtOAc (30 mL) and the organic layers were combined, washed with brine (160 mL×2), dried over anhydrous Na$_2$SO$_4$ and concentrated in vacuo. Purification of the resulting solid by chromatography on silica eluting with 0-100% EtOAc in heptane yielded a solid which was titurated with ice cold TBME:heptane (3:1 mixture) to afford the title compound as a colourless crystalline solid.

$^1$H NMR (400 MHz, DMSO-d$_6$) δ 8.60 (s, 1H), 8.03 (d, J=5.6 Hz, 1H), 7.21 (d, J=2.3 Hz, 1H), 6.62 (dd, J=5.6, 2.4 Hz, 1H), 6.40 (s, 2H), 1.70 (s, 6H).

LCMS (Method E) Rt 0.35 mins; MS m/z 205.0=[M+H]+

Intermediate AD

4-Amino-N-[1-(trifluoromethyl)cyclopropyl]pyridine-2-carboxamide

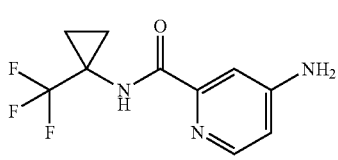 [SMILES: Nc1ccnc(C(=O)NC2(C(F)(F)F)CC2)c1]

4-Aminopyridine-2-carboxylic acid (1 g, 7.24 mmol) in DMF (36.2 mL) was treated with TEA (3.68 mL, 26.43 mmol), 1-(trifluoromethyl)cyclopropanamine hydrochloride (1.29 g, 7.96 mmol) followed by TBTU (3.14 g, 9.77 mmol) and stirred at room temperature for 4 days. The resulting mixture was filtered and the solid washed with DMF (2×30 mL). The filtrate was concentrated in vacuo and the crude residue dissolved in EtOAc (300 mL) and washed with sat. NaHCO$_3$ solution (2×300 mL). The aqueous portion was re-extracted with EtOAc (30 mL) and the combined organic extracts were washed with brine (2×160 mL), dried over Na$_2$SO$_4$ and concentrated in vacuo. Purification by C18 reverse column chromatography eluting with 10-100% MeCN in water afforded the title compound as an off-white solid.

LC-MS (Method F): Rt 1.31 mins; MS m/z 246.1=[M+H]+

$^1$H NMR (500 MHz, DMSO-d$_6$) δ 9.13 (s, 1H), 8.02 (d, J=5.6 Hz, 1H), 7.20 (d, J=2.3 Hz, 1H), 6.61 (dd, J=5.6, 2.4 Hz, 1H), 6.36 (s, 2H), 1.33-1.20 (m, 2H), 1.19-1.06 (m, 2H).

Intermediate B

2-(1-Tetrahydropyran-2-ylindazol-6-yl)acetic acid

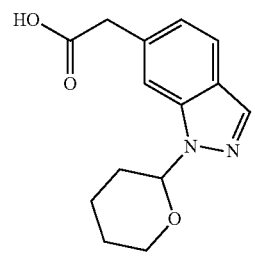 [SMILES: O=C(O)Cc1ccc2cnn(C3CCCCO3)c2c1]

To a solution of 2-(1H-indazol-6-yl)acetic acid (750 mg, 4.26 mmol) and 3,4-dihydro-2H-pyran (1.17 mL, 12.77 mmol) in DCE (14.2 mL) was added pyridinium p-toluenesulfonate (1.18 g, 4.68 mmol) and the mixture stirred at room temperature for 16 h. Additional 3,4-dihydro-2H-pyran (1.17 mL, 12.77 mmol) and pyridinium p-toluenesulfonate (1.18 g, 4.68 mmol) were added and stirring continued for a further 8 h. The resulting mixture was diluted with DCM (10 mL) and washed with water and brine. The organic portion was separated, dried over Na$_2$SO$_4$ and concentrated in vacuo. The crude mixture was dissolved in THF (10 mL) and treated with 1M LiOH (10 mL). After stirring at room temperature for 1 h, the pH was adjusted to pH 5 with 1M HCl (2.5 mL). The mixture was diluted with water (30 mL) and extracted with EtOAc (30 mL). The organic extracts were dried over Na$_2$SO$_4$ and concentrated in vacuo to afford the title compound as a yellow viscous oil.

LC-MS (Method E): Rt 0.94 mins; MS m/z 261.1=[M+H]+

$^1$H NMR (400 MHz, DMF-d$_7$) δ 12.28 (s, 1H), 8.06 (s, 1H), 7.69 (d, J=8.3 Hz, 1H), 7.59 (s, 1H), 7.08 (dd, J=8.3, 1.2 Hz, 1H), 5.80 (dd, J=9.7, 2.5 Hz, 1H), 3.95-3.84 (m, 1H), 3.78-3.68 (m, 3H), 2.47-2.36 (m, 1H), 2.09-2.00 (m, 1H), 1.98-1.91 (m, 1H), 1.80-1.69 (m, 1H), 1.62-1.53 (m, 2H).

Intermediate B1

A mixture of 2-(1-tetrahydropyran-2-ylindazol-6-yl)acetic acid and 2-(2-tetrahydropyran-2-ylindazol-6-yl)acetic acid

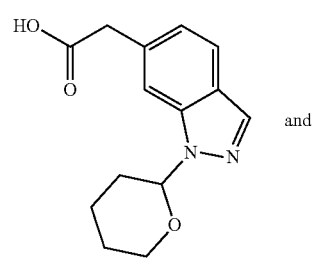

-continued

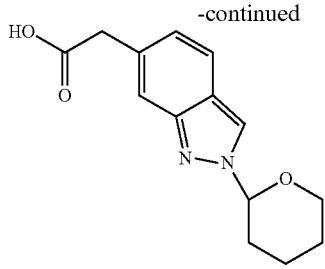

To a solution of 2-(1H-indazol-6-yl)acetic acid (1.2 g, 6.81 mmol) and 3,4-dihydro-2H-pyran (1864 uL, 20.43 mmol) in DCE (35 mL) was added pyridinium p-toluenesulfonate (1.88 g, 7.49 mmol) and the mixture stirred at room temperature for 1 h. The resulting mixture was diluted with DCM (80 mL) and washed with water (80 mL) and brine (80 mL). The organics were dried over $Na_2SO_4$ and concentrated in vacuo. The crude mixture was dissolved in THF (35 mL) and 2M LiOH (3.4 mL) was added and the mixture stirred at room temperature for 1 h. The resulting mixture was acidified to pH 5 using 1M HCl and then diluted with water (100 mL) and extracted with EtOAc (100 mL). The organics were separated, dried over $Na_2SO_4$ and concentrated in vacuo to afford the title compounds as a yellow viscous oil.

LC-MS (Method E): Rt 0.94, 0.97 mins; MS m/z 261.00=[M+H]+

Intermediate C 2-(3-Iodo-1H-indazol-6-yl)acetic acid

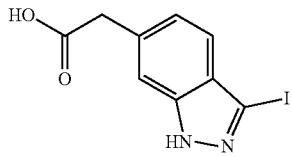 [SMILES: O=C(O)Cc1ccc2c(I)n[nH]c2c1]

This compound was prepared according to the procedure of J. Org. Chem. 2018, 83, 2, 930-938.

LC-MS (Method E): Rt 0.94 mins; MS m/z 302.9=[M+H]+

1H NMR (400 MHz, DMSO-$d_6$) δ 13.44 (s, 1H), 12.39 (s, 1H), 7.44 (s, 1H), 7.35 (d, J=8.3 Hz, 1H), 7.09 (d, J=8.4 Hz, 1H), 3.72 (s, 2H).

BIOLOGICAL EXAMPLES

In the Examples below, the compounds of the invention are compared with Examples 79.2 and 79.3 of our earlier application WO2019/145726 (designated Compounds A and B respectively). These compounds are as follows:
Compound A (Example 79.2 of WO2019/145726):

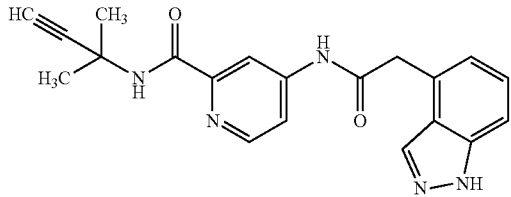 [SMILES: C#CC(C)(C)NC(=O)c1cc(NC(=O)Cc2cccc3[nH]ncc23)ccn1]

Compound B (Example 79.3 of WO2019/145726)

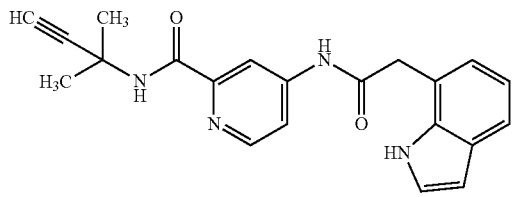 [SMILES: C#CC(C)(C)NC(=O)c1cc(NC(=O)Cc2cccc3cc[nH]c23)ccn1]

Example 14—Automated Whole-Cell Patch Clamp Assay to Detect TMEM16A Activity in Recombinant Cells Cell Culture and Preparation Fisher rat thyroid (FRT) cells stably expressing human TMEM16A (TMEM16Aabc variant; Dr Luis Galietta, Insituto Giannina, Italy) were cultured in T-75 flasks in Hams F-12 media with Coon's modification (Sigma) supplemented with 10% (v/v) foetal bovine serum, penicillin-streptomycin (10,000 U/mL/10000 μg/mL), G-418 (750 μg/mL), L-glutamine (2 mM) and sodium bicarbonate solution (7.5% v/v). At ~90% confluence cells were harvested for experiments by detachment with a 2:1 (v/v) mixture of Detachin (BMS Biotechnology) and 0.25% (w/v) trypsin-EDTA. Cells were diluted to a density of $3.5-4.5 \times 10^6$ cells/mL with media consisting of CHO-S-SFM II (Sigma), 25 mM HEPES (Sigma) and Soy bean trypsin inhibitor (Sigma).

Whole-Cell Patch Clamp Recording

FRT-TMEM16A cells were whole-cell patch clamped using an automated planar patch clamp system (Qpatch, Sophion). Briefly, once high resistance (GOhm) seals were established between the cells and the planar recording array the patch was ruptured using suction pulses to establish the whole-cell recording configuration of the patch clamp technique. The assay employed the following solutions (all reagents Sigma): Intracellular solution (mM): N-methyl-D-glucamine 130, $CaCl_2$ 18.2, $MgCl_2$ 1, HEPES 10, EGTA 10, BAPTA 20, Mg-ATP 2, pH 7.25, 325 mOsm with sucrose.

Extracellular solution (mM): N-methyl-D-glucamine 130, $CaCl_2$ 2, $MgCl_2$ 1, HEPES 10, pH 7.3, 320 mOsm with sucrose.

The intracellular solution buffers intracellular calcium at levels required to give ~20% activation of the maximal TMEM16A mediated current ($EC_{20}$ for calcium ions). Cells were voltage clamped at a holding potential of −70 mV and a combined voltage step (to +70 mV)/ramp (−90 my to +90 mV) was applied at 0.05 Hz. After a period of current stabilisation test compounds, solubilised in 100% (v/v) DMSO and subsequently diluted into extracellular solution, were applied to generate a cumulative concentration response curve. Each concentration of test compound was incubated for 5 minutes before addition of the next concentration. After the final concentration was tested a supramaximal concentration of either a known active positive modulator or the TMEM16A inhibitor, CaCCinhA01 (Del La Fuente et al, 2008) was added to define the upper and lower limits of the assay.

Compound activity was quantified by measuring the increase in current upon compound addition and expressing this as a percentage increase of baseline TMEM16A current level. Percentage increases in current were determined for each concentration and the data plotted as a function of concentration using either the Qpatch software or Graphpad Prism v6.05 providing the concentration which gave 50% of its maximal effect ($EC_{50}$) and maximum efficacy (percentage of baseline increase).

The method of calculating the results is illustrated in FIG. 1, which shows an example trace from the Qpatch TMEM16A assay. In FIG. 1, $I_{BL}$ equals baseline current, $I_{[\#1]}$ equals the peak current during test compound concentration 1 incubation period and so on.

Peak TMEM16A current at +70 mV was plotted as a function of time over the assay period. Baseline current ($I_{BL}$) was measured after a period of stabilisation. The increase in current for each compound addition was determined by taking the peak current during the incubation period and subtracting the current from the previous recording period and then expressing this as a percentage of the baseline current (% potentiation). For test compound concentration 1 in FIG. 1 this is:

$$(I_{[\#1]}-I_{BL}/I_{BL})\times 100$$

For each additional concentration tested the increase in current was determined by subtracting the current from the previous incubation period and normalising the baseline value—for test concentration 2 in FIG. 1 this is:

$$(I_{[\#2]}-I_{[\#1]})/I_{BL}\times 100$$

The values for each test concentration were plotted as a cumulative function of concentration eg. for test concentration two this would be the sum of the peak changes measured during concentration one plus concentration two.

The results obtained for the example compounds are shown in Table 3, from which it can be seen that the compounds of the present invention are capable of significantly increasing the TMEM16A current level.

TABLE 3

| | QPatch TMEM16A $EC_{50}$ | | |
|---|---|---|---|
| Example | QPatch TMEM16A EC50 (μM) | QPatch TMEM16A % Potentiation @ 370 nM | QPatch TMEM16A % Potentiation @ 3.3 μM |
| A | 1.93 | 43 | 223 |
| B | 0.24 | 42 | 64 |
| 1 | 0.02 | 50 | 38 |
| 2 | 0.18 | 87 | 131 |
| 3 | 0.02 | 68 | 96 |
| 4 | 0.01 | 96 | 237 |
| 5 | 0.11 | 80 | 104 |
| 4.1 | 0.09 | 96 | 118 |
| 4.2 | 0.10 | 112 | 155 |
| 5.1 | 0.15 | 76 | 110 |
| 4.3 | 0.05 | 173 | 226 |
| 5.3 | 0.25 | 69 | 113 |
| 6 | 0.23 | 91 | 164 |
| 6.1 | 0.14 | 107 | 153 |
| 6.2 | 0.31 | 46 | 70 |
| 7 | 0.07 | 88 | 95 |
| 7.1 | 0.27 | 47 | 82 |
| 7.2 | 0.14 | 102 | 142 |
| 6.3 | 0.11 | 172 | 220 |
| 6.4 | 0.02 | 55 | 78 |
| 8 | 0.21 | 65 | 98 |
| 8.1 | 0.60 | 97 | 267 |
| 9 | 0.28 | 113 | 200 |
| 11.5 | 0.14 | 41 | 61 |
| 11.4 | 0.21 | 85 | 132 |
| 11.3 | 0.22 | 117 | 180 |
| 12 | 0.24 | 204 | 338 |
| 1.1 | 0.07 | 145 | 173 |
| 13 | 0.41 | 47 | 93 |
| 13.1 | 0.05 | 113 | 115 |
| 13.2 | 0.13 | 98 | 134 |

The results presented in Table 3 demonstrate that the compounds of the invention have excellent $EC_{50}$ values similar to those of Compound A and better than compound B.

In comparison to the compound B (the more potent of the comparator compounds), many of the compounds of the invention have significantly improved maximum potentiation of TMEM16A, for example as shown at the 3.3 mM concentration.

Compounds 1, 1.1, 13, 13.1 and 13.2 are indoles and may therefore be compared with Compound B. It can be seen that Compounds 1, 2.2, 13.1 and 13.2 have lower $EC_{50}$ values than Compound B and Compounds 1.1, 13.1 and 13.2 have improved maximum potentiation of TMEM16A.

The remaining example compounds are indazoles and may therefore be compared with Compound A. All of the indazole example compounds have significantly lower $EC_{50}$ than Compound A and all also have similar or improved maximum potentiation of TMEM16A, particularly at the 370 nM concentration.

Example 15—Physicochemical Assays

Log D (pH 7.4 Shake Flask)

All compounds were tested in a 'cassette' containing a mixture of 4 test compounds each initially dissolved in DMSO at 5 mMolar. Phosphate buffer (1 M) was diluted to 20 mM with deionised water and adjusted to pH 7.4 with phosphoric acid or sodium hydroxide. 1-octanol and phosphate buffer (20 mM) were saturated overnight by tumbling. The two phases were separated using a separation funnel. 5 μL of 5 mM compound cassette was added to 495 μL of octanol-saturated buffer and 495 μL buffer saturated octanol in a 96-well plate (top concentration 50 μM). Plate was shaken for 1 h and centrifuged at 25° C. for 5 min. 200 μL of each phase was transferred to a separate plate. The octanol layer was sampled first to avoid cross contamination. 5 μL of the solutions were transferred to 495 μL of quench solution* (max concentration 0.5 μM). In addition, 40 μL of buffer solution was added to 360 μL of quench solvent (max concentration 5 μM). Samples were analysed by LC-MS/MS. Benchmarking against a calibration curve for each compound and with reference to the control compounds sulpride, diclofenac, chlorpromazine and tamoxifen.
*Quench solution was a 1:3:1 mixture (v/v/v) of Acetonitrile containing 0.1% formic acid and imipramine/labetalol, 200 nM:Acetonitrile:Water.

The results for the Log D assay are shown in Table 4. Compounds which have an mLog D value at pH 7.4 of 5 or less are generally sufficiently soluble for pharmaceutical formulation and it is preferred that the mLog D value is 4.2 or less. All of the example compounds fall within this range.

TABLE 4

Log D Data

| Example | mLogD (pH 7.4) |
|---|---|
| 1 | 3.4 |
| 1.1 | 3.1 |
| 2 | 3.5 |
| 2.1 | 2.2 |
| 3 | 3.1 |
| 4 | 3.5 |
| 4.1 | 3.5 |
| 4.2 | 2.7 |
| 4.3 | 3.1 |
| 5 | 3.6 |
| 5.1 | 3.7 |
| 5.2 | 3.1 |
| 5.3 | 2.9 |
| 5.4 | 2.0 |
| 6 | 3.4 |
| 6.1 | 2.7 |
| 6.2 | 2.9 |
| 6.3 | 3.7 |
| 6.4 | 4.5 |
| 7 | 3.6 |
| 7.1 | 3.8 |
| 7.2 | 4.2 |
| 8 | 4.0 |
| 8.1 | 4.5 |
| 9 | 4.2 |
| 9.1 | 2.9 |
| 10 | 3.5 |
| 11 | 2.1 |
| 11.1 | 2.0 |
| 11.2 | 3.0 |
| 11.3 | 2.4 |
| 11.4 | 2.6 |
| 11.5 | 3.2 |
| 12 | 3.4 |
| 13 | 4.1 |
| 13.2 | 3.1 |

Example 16—Microsomal Stability

Microsomes (human) were obtained from Bioreclamation.

All Test and reference control compounds (raloxifene, diclofenac, terfenadine, propranolol, dextromethorphan and metoprolol) were dissolved to create a 100 µM stock (final concentrations; 91.5% Acetonitrile: 8.5% DMSO). Final test compound concentration in incubation was 1 µM (<0.1% DMSO).

The assay buffer is prepared from Potassium phosphate solutions 1 and 2 by combination to form a pH 7.42 solution at 37° C. Solution 1: 17.4 g potassium phosphate dibasic anhydrous ($K_2HPO_4$, 0.1 M) dissolved in 1 L deionised water. Solution 2: 13.6 g potassium phosphate monobasic anhydrous ($KH_2PO_4$, 0.1 M) dissolved in 1 L deionised water. pH7.4 with 2 mM magnesium chloride. NADPH (10 mM) is prepared in deionised water. Microsomes (all species) were removed from the −80° C. thawed at 37° C. Microsomes were diluted in assay buffer to achieve a final protein concentration of 0.5 mg/mL and 1 mM NADPH.

The following procedure was completed on a Perkin Elmer Janus robotic platform in 96 well format: The microsomal incubation plate was transferred to a heater shaker at 300 rpm and solution heated to 37° C. for 10 min pre-warm. A no co-factor control at 0 and 45 min and one replicates of each test compound was included in every assay. Microsomes were incubated at 37° C., on a shaker set at 300 rpm throughout the assay. At each timepoint (0, 5, 15, 30, 45 min) 50 µL of sample was removed from the 96-well and added to 200 µL of quench solution (Acetonitrile containing 0.1% formic acid and imipramine/labetalol, 200 nM). Samples were diluted 1:1 with water using the Janus Robot and analysed by LC-MS/MS. The results obtained were quantified against a standard calibration curve prepared for each test sample and the results controlled by analysis of the reference control compounds.

Microsomal clearance data are shown in Table 5.

TABLE 5

Microsome clearance data

| Example | Human Microsome $Cl_{int}$ (µL/min/mg) |
|---|---|
| B | 46 |
| 1 | 37 |
| 1.1 | 55 |
| 2 | 28 |
| 2.1 | 14 |
| 3 | <10.0 |
| 4 | 175 |
| 4.1 | 13 |
| 4.2 | <10.0 |
| 4.3 | 14 |
| 5 | 20 |
| 5.1 | 36 |
| 5.2 | 12 |
| 5.3 | <10.0 |
| 5.4 | 10 |
| 6 | 26 |
| 6.1 | 10 |
| 6.2 | 21 |
| 6.3 | 15 |
| 6.4 | 81 |
| 7 | 23 |
| 7.1 | 38 |
| 7.2 | 19 |
| 8 | <10.0 |
| 8.1 | <10.0 |
| 9 | 48 |
| 9.1 | 45 |
| 10 | 341 |
| 11 | 12 |
| 11.1 | 13 |
| 11.2 | 86 |
| 11.3 | 12 |
| 11.4 | <10.0 |
| 11.5 | 18 |
| 12 | <10.0 |
| 13 | 294 |
| 13.1 | 199 |
| 13.2 | 27 |

Although it is not essential, it is preferred that compounds which are intended for oral administration have a low microsomal clearance rate. The target value for $Cl_{int}$ for such compounds in the microsomal stability assay is less than 30 µL/min/mg, preferably less than 20 µL/min/mg and particularly preferably less than 10 µL/min/mg.

Compounds with a clearance rate in this range are particularly suitable for oral administration since they have a lower propensity for metabolism leading to reduced first pass clearance leading to higher systemic exposure and increased oral bioavailability also resulting in lower dose for a given pharmacological effect.

Although it is not essential, it is preferred that compounds administration by inhalation have a high clearance rate. The target value for $Cl_{int}$ for such compounds in the microsomal stability assay is greater than 35 µL/min/mg, preferably greater than 40 µL/min/mg and particularly preferably greater than 50 µL/min/mg.

The high microsomal clearance rate, corresponding to low in vivo half-life after absorption into the systemic circulation, ensures that compounds administered directly to the lungs will have a reduced chance of interacting with TMEM16A at other locations in the body, and potential side effects will therefore be minimised.

REFERENCES

Accurso F J, Moss R B, Wilmott R W, Anbar R D, Schaberg A E, Durham T A, Ramsay B W; TIGER-1 Investigator Study Group (2011) Denufosol tetrasodium in patients with cystic fibrosis and normal to mildly impaired lung function. Am J Respir Crit Care Med, 183(5):627-634.

Boucher R C (2007) Evidence for airway surface dehydration as the initiating event in CF airway disease. J Intern Med., 261(1):5-16.

Caputo A, Caci E, Ferrera L, Pedemonte N, Barsanti C, Sondo E, Pfeffer U, Ravazzolo R, Zegarra-Moran O & Galietta L J (2008) TMEM16A, a membrane protein associated with calcium-dependent chloride channel activity. Science, 322(5901):590-594.

Del La Fuente R, Namkung W, Mills A & Verkman A S (2008) Small molecule screen identifies inhibitors of a human intestinal calcium-activated chloride channel. Mol Pharmacol, 73(3):758-768.

Gupta D, Bhatia D, Dave V, Sutariya V & Gupta S V (2018) Salts of Therapeutic Agents: Chemical, Physicochemical, and Biological Considerations. Molecules, 23, 1719.

Kellerman D, Rossi Mospan A, Engels J, Schaberg A, Gorden J & Smiley L (2008) Denufosol: a review of studies with inhaled P2Y(2) agonists that led to Phase 2. Pulm Pharmacol Ther, 21(4):600-607.

Kunzelmann K & Mall M (2003) Pharmacotherapy of the ion transport defect in cystic fibrosis: role of purinergic receptor agonists and other potential therapeutics. Am J Respir Med, 2(4):299-309.

Matsui H, Grubb B R, Tarran R, Randell S H, Gatzy J T, Davis C W and Boucher R C (1998) Evidence for periciliary liquid layer depletion, not abnormal ion composition, in the pathogenesis of cystic fibrosis airways disease. Cell, 95(7):1005-15.

Moss R B (2013) Pitfalls of drug development: lessons learned from trials of denufosol in cystic fibrosis. J Pediatr, 162(4):676-680.

Pedemonte N & Galietta L J (2014) Structure and function of TMEM16 proteins (anoctamins). Physiol Rev, 94(2): 419-459.

Pezzulo A A, Tang X X, Hoegger M J, Abou Alaiwa M H, Ramachandran S, Moninger T O, Karp P H, Wohlford-Lenan C L, Haagsman H P, van Eijk M, Banfi B, Horswill A R, Stoltz D A, McCray P B Jr, Welsh M J & Zabner J (2012) reduced airway surface pH impairs bacterial killing in the porcine cystic fibrosis lung. Nature, 487(7405): 109-113.

Tang R-J, Milcent T, Crousse B (2018) Regioselective Halogenation of Arenes and Heterocycles in Hexafluoroisopropanol. J. Org. Chem. 2018, 83(2), 930-938.

Yang Y D, Cho H, Koo J Y, Tak M H, Cho Y, Shim W S, Park S P, Lee J, Lee B, Kim B M, Raouf R, Shin Y K & Oh U (2008) TMEM16 confers receptor-activated calcium-dependent chloride conductance. Nature, 455(7217):1210-1215.

The invention claimed is:
1. A compound selected from:
4-[[2-(1H-indol-6-yl) acetyl]amino]-N-[1-(trifluoromethyl)cyclopropyl]pyridine-2-carboxamide (Compound 1.1)

N-tert-Butyl-4-[[2-(1H-indazol-6-yl) acetyl]amino]pyridine-2-carboxamide (Compound 2);

N-(1-Cyano-1-methyl-ethyl)-4-[[2-(1H-indazol-6-yl) acetyl]amino]pyridine-2-carboxamide (Compound 2.1);

N-(1-Ethynylcyclopentyl)-4-[[2-(1H-indazol-6-yl) acetyl]amino]pyridine-2-carboxamide (Compound 4);

4-[[2-(1H-Indazol-6-yl) acetyl]amino]-N-(2,2,2-trifluoro-1,1-dimethyl-ethyl)pyridine-2-carboxamide (Compound 4.1);

4-[[2-(1H-Indazol-6-yl) acetyl]amino]-N-[1-(trifluoromethyl)cyclopropyl]pyridine-2-carboxamide (Compound 4.2);

N-(3,3-Difluoro-1-methyl-cyclobutyl)-4-[[2-(1H-indazol-6-yl) acetyl]amino]pyridine-2-carboxamide (Compound 4.3);

N-(2,2-Difluoro-1,1-dimethyl-ethyl)-4-[[2-(1H-indazol-6-yl) acetyl]amino]pyridine-2-carboxamide (Compound 5);

4-[[2-(1H-Indazol-6-yl) acetyl]amino]-N-[1-(trifluoromethyl)cyclobutyl]pyridine-2-carboxamide (Compound 5.1);

N-(3-Fluoro-3-methyl-cyclobutyl)-4-[[2-(1H-indazol-6-yl) acetyl]amino]pyridine-2-carboxamide (Compound 5.2);

N-(2,2-Difluorocyclopentyl)-4-[[2-(1H-indazol-6-yl) acetyl]amino]pyridine-2-carboxamide (Compound 5.3);

N-(4-Cyanotetrahydropyran-4-yl)-4-[[2-(1H-indazol-6-yl) acetyl]amino]pyridine-2-carboxamide (Compound 5.4);

N-tert-Butyl-4-[[2-(5-fluoro-1H-indazol-6-yl) acetyl]amino]pyridine-2-carboxamide (Compound 6);

4-[[2-(5-Fluoro-1H-indazol-6-yl) acetyl]amino]-N-[1-(trifluoromethyl)cyclopropyl]pyridine-2-carboxamide (Compound 6.1);

N-(2,2-Difluorocyclopentyl)-4-[[2-(5-fluoro-1H-indazol-6-yl) acetyl]amino]pyridine-2-carboxamide (Compound 6.2);

4-[[2-(4-Chloro-1H-indazol-6-yl) acetyl]amino]-N-[1-(trifluoromethyl)cyclopropyl]pyridine-2-carboxamide (Compound 6.3);

4-[[2-(4-Chloro-1H-indazol-6-yl) acetyl]amino]-N-(1-ethynylcyclopentyl)pyridine-2-carboxamide (Compound 6.4);

N-tert-Butyl-4-[[2-(4-fluoro-1H-indazol-6-yl) acetyl]amino]pyridine-2-carboxamide (Compound 7);

N-tert-Butyl-4-[[2-(5-chloro-1H-indazol-6-yl) acetyl]amino]pyridine-2-carboxamide (Compound 7.1);

N-tert-Butyl-4-[[2-(4-chloro-1H-indazol-6-yl) acetyl]amino]pyridine-2-carboxamide (Compound 7.2);

N-tert-Butyl-4-[[2-[3-(trifluoromethyl)-1H-indazol-6-yl] acetyl]amino]pyridine-2-carboxamide (Compound 8);

N-[1-(Trifluoromethyl)cyclopropyl]-4-[[2-[3-(trifluoromethyl)-1H-indazol-6-yl]acetyl]amino]pyridine-2-carboxamide (Compound 8.1);

N-tert-Butyl-4-[[2-(3-isopropyl-1H-indazol-6-yl) acetyl]amino]pyridine-2-carboxamide (Compound 9);

4-[[2-(3-Tetrahydrofuran-2-yl-1H-indazol-6-yl) acetyl]amino]-N-[1-(trifluoromethyl)cyclopropyl]pyridine-2-carboxamide (Compound 9.1);

4-[[2-[3-(Morpholinomethyl)-1H-indazol-6-yl]acetyl]amino]-N-(2,2,2-trifluoro-1,1-dimethyl-ethyl)pyridine-2-carboxamide (Compound 10);

4-[[2-(1H-Indazol-6-yl) acetyl]amino]-N-(3-methyloxetan-3-yl)pyridine-2-carboxamide (Compound 11);

4-[[2-(1H-Indazol-6-yl) acetyl]amino]-N-(2-oxaspiro[3.3]heptan-6-yl)pyridine-2-carboxamide (Compound 11.1);

4-[[2-(1H-Indazol-6-yl) acetyl]amino]-N-[4-(trifluoromethyl)tetrahydropyran-4-yl]pyridine-2-carboxamide (Compound 11.2);

4-[[2-(1H-Indazol-6-yl) acetyl]amino]-N-[3-(trifluoromethyl) oxetan-3-yl]pyridine-2-carboxamide (Compound 11.3);

N-[1-(Difluoromethyl)cyclopropyl]-4-[[2-(1H-indazol-6-yl) acetyl]amino]pyridine-2-carboxamide (Compound 11.4);

N-(3-Fluoro-1-bicyclo[1.1.1]pentanyl)-4-[[2-(1H-indazol-6-yl) acetyl]amino]pyridine-2-carboxamide; (Compound 11.5);

4-[[2-[3-(2,2,2-Trifluoro-1-hydroxy-1-methyl-ethyl)-1H-indazol-6-yl]acetyl]amino]-N-[1-(trifluoromethyl)cyclopropyl]pyridine-2-carboxamide; (Compound 12)

4-[[2-(1H-Indol-6-yl) acetyl]amino]-N-(2,2,2-trifluoro-1,1-dimethyl-ethyl)pyridine-2-carboxamide; (Compound 13);

N-(3,3-Difluoro-1-methyl-cyclobutyl)-4-[[2-(1H-indol-6-yl) acetyl]amino]pyridine-2-carboxamide (Compound 13.1);

N-(4-Cyanotetrahydropyran-4-yl)-4-[[2-(1H-indol-6-yl) acetyl]amino]pyridine-2-carboxamide (Compound 13.2);

and salts and solvates of the above.

\* \* \* \* \*